(12) United States Patent
Fleisig

(10) Patent No.: US 11,614,784 B2
(45) Date of Patent: *Mar. 28, 2023

(54) ELECTRICAL POWER SUPPLYING AND CORD MANAGEMENT STATION WITH DOCKABLE MODULE SUPPORTING MULTIPLE MODES OF OPERATION

(71) Applicant: PUCLINE, LLC, Venice, CA (US)

(72) Inventor: Jeffrey Fleisig, New York, NY (US)

(73) Assignee: PUCLINE, LLC, New York, NY (US)

( * ) Notice: Subject to any disclaimer, the term of this patent is extended or adjusted under 35 U.S.C. 154(b) by 7 days.

This patent is subject to a terminal disclaimer.

(21) Appl. No.: 17/331,615

(22) Filed: May 26, 2021

(65) Prior Publication Data

US 2021/0389813 A1 Dec. 16, 2021

Related U.S. Application Data

(63) Continuation of application No. 15/921,660, filed on Mar. 15, 2018, now Pat. No. 11,150,697, and a
(Continued)

(51) Int. Cl.
*H02J 3/02* (2006.01)
*G06F 1/26* (2006.01)
(Continued)

(52) U.S. Cl.
CPC ............ *G06F 1/266* (2013.01); *G06F 1/1632* (2013.01); *G06F 1/26* (2013.01); *G06F 13/4081* (2013.01);
(Continued)

(58) Field of Classification Search
CPC ............................... G06F 1/266; G06F 1/1632
(Continued)

(56) References Cited

U.S. PATENT DOCUMENTS 2,364,262 A 12/1944 Wehringer
2,587,707 A 3/1952 Dever
(Continued)

FOREIGN PATENT DOCUMENTS

EP 1653572 A1 5/2006
EP 2270950 A2 1/2011
(Continued)

OTHER PUBLICATIONS

Donut Power Strip; www.yankodesign.com/2008/10/28/donut-power-strip, 4 pages, Oct. 28, 2008.
(Continued)

*Primary Examiner* — Daniel Kessie
*Assistant Examiner* — Dru Parries
(74) *Attorney, Agent, or Firm* — Thomas J. Perkowski, Esq., PC

(57) ABSTRACT

An electrical power supplying and cord management system including: a module docking station having a module docking receptacle and base station portion having integrated external power cord storage compartments for power cord management; and a multi-function dockable module dockable in the module docking receptacle and manually removable and useable locally as well as at remote locations. The dockable module supports (i) an emergency-light illumination subsystem including a LED array for producing, during an emergency-light illumination mode, illumination in response to automatic detection of changes in line voltage supplied to the portable electrical power supplying system; a night-light illumination subsystem including the LED array for producing, during a night-light illumination mode, illumination in response to automatic detection of changes in the light level of the ambient environment; and a battery power storage subsystem containing a rechargeable battery storage module for storing DC electrical power for driving
(Continued)

the LED array during various modes, and recharging a DC power electronic device such a mobile phone.

15 Claims, 62 Drawing Sheets

Related U.S. Application Data continuation of application No. 14/957,510, filed on Dec. 2, 2015, now Pat. No. 9,927,837, said application No. 15/921,660 is a continuation of application No. 14/957,510, filed on Dec. 2, 2015, now Pat. No. 9,927,837, which is a continuation-in-part of application No. 13/934,606, filed on Jul. 3, 2013, now Pat. No. 9,513,682.

(51) Int. Cl.
  G06F 1/16 (2006.01)
  G06F 13/40 (2006.01)
  H05B 45/20 (2020.01)
  H05B 45/10 (2020.01)
  H02J 7/00 (2006.01)
  B60L 53/30 (2019.01)

(52) U.S. Cl.
  CPC ............ *H05B 45/10* (2020.01); *H05B 45/20* (2020.01); *B60L 53/30* (2019.02); *H02J 7/00* (2013.01); *H02J 7/0042* (2013.01); *Y02D 10/00* (2018.01)

(58) Field of Classification Search
  USPC .......................................................... 307/22
  See application file for complete search history.

(56) References Cited

U.S. PATENT DOCUMENTS

| | | |
|---|---|---|
| 3,013,105 A | 12/1961 | Craig |
| 3,495,799 A | 2/1970 | Murgas |
| 3,821,496 A | 6/1974 | Malone |
| 3,924,819 A | 12/1975 | Lapinskas |
| 4,107,399 A | 8/1978 | Claxton |
| 4,124,261 A | 11/1978 | Klaus |
| 4,163,592 A | 8/1979 | Nelson |
| 4,177,961 A | 12/1979 | Enewald |
| 4,373,761 A | 2/1983 | Hansberry |
| 4,384,758 A | 5/1983 | Lee |
| 4,427,252 A | 1/1984 | Lee |
| 4,468,083 A | 8/1984 | Lee |
| 4,470,539 A | 9/1984 | Skillen |
| 4,566,925 A | 1/1986 | Schnabel |
| 4,585,194 A | 4/1986 | Schwob |
| D288,920 S | 3/1987 | Oesterheld |
| D290,598 S | 6/1987 | Jaffe |
| 4,677,552 A | 6/1987 | Sibley |
| D290,836 S | 7/1987 | Oesterheld |
| 4,705,484 A | 11/1987 | Lerner |
| 4,731,029 A | 3/1988 | Lerner |
| 4,899,268 A | 2/1990 | Hollinger |
| 4,908,744 A | 3/1990 | Hollinger |
| 4,924,892 A | 5/1990 | Kiba |
| 4,944,694 A | 7/1990 | Dorn |
| 5,016,241 A | 5/1991 | Lee |
| 5,029,704 A | 7/1991 | Stillinger |
| 5,083,935 A | 1/1992 | Herman |
| D323,643 S | 2/1992 | Lee |
| 5,100,348 A | 3/1992 | Herman |
| D326,257 S | 5/1992 | Lee |
| D328,249 S | 7/1992 | Lee |
| D328,280 S | 7/1992 | Lee |
| D328,452 S | 8/1992 | Lee |
| D329,223 S | 9/1992 | Lee |
| 5,150,963 A | 9/1992 | Hill |
| D332,216 S | 1/1993 | Lee |
| D332,398 S | 1/1993 | Lee |
| 5,266,057 A | 11/1993 | Angel |
| D342,937 S | 1/1994 | Angel, Jr. |
| 5,285,383 A | 2/1994 | Lindsey |
| D347,825 S | 6/1994 | Zarnowitz |
| 5,318,158 A | 6/1994 | Seasholtz |
| D349,594 S | 8/1994 | Bonazza |
| D351,342 S | 10/1994 | Lee |
| 5,382,172 A | 1/1995 | Klier |
| D356,297 S | 3/1995 | Carl |
| D360,191 S | 7/1995 | Carl |
| D360,400 S | 7/1995 | Pitcher |
| 5,457,600 A | 10/1995 | Campbell |
| 5,460,542 A | 10/1995 | Castellani |
| D366,862 S | 2/1996 | Lee |
| D366,863 S | 2/1996 | Lee |
| D366,864 S | 2/1996 | Lee |
| D367,036 S | 2/1996 | Lee |
| 5,529,513 A | 6/1996 | Lee |
| D371,762 S | 7/1996 | Lee |
| D372,193 S | 7/1996 | Lee |
| 5,531,333 A | 7/1996 | Vara |
| 5,538,385 A | 7/1996 | Bacchi |
| D374,655 S | 10/1996 | Carl |
| D374,862 S | 10/1996 | Lee |
| 5,564,942 A | 10/1996 | Lee |
| D376,580 S | 12/1996 | Lee |
| 5,589,718 A | 12/1996 | Lee |
| 5,596,479 A | 1/1997 | Campbell |
| D380,963 S | 7/1997 | Lee |
| D381,315 S | 7/1997 | Harold |
| 5,655,725 A | 8/1997 | Kroger |
| D384,579 S | 10/1997 | Lee |
| D387,733 S | 12/1997 | Lee |
| D388,765 S | 1/1998 | Pitcher |
| D389,402 S | 1/1998 | Lee |
| D392,942 S | 3/1998 | Lee |
| D392,959 S | 3/1998 | Edwards |
| 5,736,673 A | 4/1998 | Lee |
| 5,741,113 A | 4/1998 | Bacchi |
| D395,407 S | 6/1998 | Dwight |
| 5,765,444 A | 6/1998 | Bacchi |
| D396,632 S | 8/1998 | Lee |
| D396,689 S | 8/1998 | Karten |
| D396,986 S | 8/1998 | Robinson |
| D397,086 S | 8/1998 | Lin |
| 5,792,986 A | 8/1998 | Lee |
| D399,123 S | 10/1998 | Dwight |
| D400,096 S | 10/1998 | Lee |
| D401,136 S | 11/1998 | Derman |
| 5,852,413 A | 12/1998 | Bacchi |
| D404,716 S | 1/1999 | Lee |
| D405,050 S | 2/1999 | Lee |
| D405,056 S | 2/1999 | Lee |
| D405,057 S | 2/1999 | Martin |
| D405,367 S | 2/1999 | Lee |
| D405,368 S | 2/1999 | Lee |
| D405,688 S | 2/1999 | Lee |
| D406,753 S | 3/1999 | Lee |
| D407,378 S | 3/1999 | Lee |
| 5,875,893 A | 3/1999 | Lee |
| 5,901,712 A | 5/1999 | St |
| 5,909,062 A | 6/1999 | Krietzman |
| D412,314 S | 7/1999 | Lee |
| 5,923,147 A | 7/1999 | Martensson |
| 5,924,892 A | 7/1999 | Ferracina |
| 5,944,476 A | 8/1999 | Bacchi |
| D415,101 S | 10/1999 | Martin |
| D415,111 S | 10/1999 | Lee |
| 5,984,717 A | 11/1999 | Lee |
| 5,988,569 A | 11/1999 | Zhang |
| 6,011,221 A | 1/2000 | Lecinski |
| 6,017,228 A | 1/2000 | Verbeek |
| D420,331 S | 2/2000 | Martin |
| 6,039,591 A | 3/2000 | Marsh |
| 6,042,426 A | 3/2000 | Byrne |
| D425,028 S | 5/2000 | Lee |
| D425,487 S | 5/2000 | Lee |

(56) References Cited

U.S. PATENT DOCUMENTS

| | | |
|---|---|---|
| D427,971 S | 7/2000 | Lee |
| D429,217 S | 8/2000 | Lee |
| D429,218 S | 8/2000 | Lee |
| D430,108 S | 8/2000 | Lee |
| 6,098,484 A | 8/2000 | Bacchi |
| 6,100,670 A | 8/2000 | Levesque |
| 6,105,454 A | 8/2000 | Bacchi |
| 6,111,202 A | 8/2000 | Martin |
| D430,541 S | 9/2000 | Lee |
| 6,126,381 A | 10/2000 | Bacchi |
| 6,129,568 A | 10/2000 | Mercurio |
| 6,141,221 A | 10/2000 | Tong |
| D434,009 S | 11/2000 | Lee |
| 6,142,405 A | 11/2000 | Black |
| D435,558 S | 12/2000 | Tong |
| 6,155,768 A | 12/2000 | Bacchi |
| 6,160,265 A | 12/2000 | Bacchi |
| 6,164,582 A | 12/2000 | Vara |
| D436,109 S | 1/2001 | Tong |
| 6,176,716 B1 | 1/2001 | Mercurio |
| D439,242 S | 3/2001 | Brown |
| D440,203 S | 4/2001 | Ewing |
| D440,942 S | 4/2001 | Ewing |
| D441,343 S | 5/2001 | Lee |
| D442,550 S | 5/2001 | Tong |
| D442,916 S | 5/2001 | Tong |
| 6,227,914 B1 | 5/2001 | Lee |
| 6,234,418 B1 | 5/2001 | Donaldson |
| 6,236,576 B1 | 5/2001 | Munk-Nielsen |
| D443,249 S | 6/2001 | Lee |
| D443,250 S | 6/2001 | Lee |
| D443,589 S | 6/2001 | Tong |
| D443,591 S | 6/2001 | Tong |
| D443,858 S | 6/2001 | Treiger |
| D444,450 S | 7/2001 | Lee |
| D444,770 S | 7/2001 | Tong |
| D445,091 S | 7/2001 | Tong |
| D445,400 S | 7/2001 | Tong |
| D445,401 S | 7/2001 | Tong |
| D445,766 S | 7/2001 | Solomon |
| D446,189 S | 8/2001 | Lee |
| D446,503 S | 8/2001 | Lee |
| D446,504 S | 8/2001 | Lee |
| D447,118 S | 8/2001 | Lee |
| D447,119 S | 8/2001 | Lee |
| D447,120 S | 8/2001 | Lee |
| D447,745 S | 9/2001 | Lee |
| D450,296 S | 11/2001 | Lee |
| D450,297 S | 11/2001 | Lee |
| 6,315,604 B1 | 11/2001 | Lee |
| D452,215 S | 12/2001 | Stekelenburg |
| 6,336,105 B1 | 1/2002 | Conklin |
| 6,341,979 B1 | 1/2002 | Yamamoto |
| D453,322 S | 2/2002 | Lee |
| D453,496 S | 2/2002 | Lee |
| D456,009 S | 4/2002 | Tong |
| D456,362 S | 4/2002 | Lee |
| D456,363 S | 4/2002 | Lee |
| 6,369,999 B1 | 4/2002 | Wohlgemuth |
| D456,692 S | 5/2002 | Epstein |
| D457,059 S | 5/2002 | MacRae |
| D458,608 S | 6/2002 | Tong |
| D459,219 S | 6/2002 | Lee |
| 6,406,313 B1 | 6/2002 | Mctor |
| 6,410,855 B1 | 6/2002 | Berkowitz |
| 6,410,994 B1 | 6/2002 | Jones |
| 6,425,165 B2 | 7/2002 | Koppang |
| 6,425,543 B1 | 7/2002 | King |
| D462,890 S | 9/2002 | Brown, III |
| D463,373 S | 9/2002 | Lee |
| 6,456,091 B1 | 9/2002 | Lee |
| 6,462,953 B2 | 10/2002 | Tong |
| 6,473,510 B1 | 10/2002 | Marsh |
| D465,456 S | 11/2002 | Lee |
| 6,483,200 B1 | 11/2002 | Jacobs |
| 6,486,407 B1 | 11/2002 | Hawker |
| D466,405 S | 12/2002 | Lee |
| D467,226 S | 12/2002 | Lee |
| D467,227 S | 12/2002 | Lee |
| D467,246 S | 12/2002 | MacRae |
| D467,552 S | 12/2002 | Mori |
| D467,877 S | 12/2002 | Mori |
| D467,879 S | 12/2002 | Lee |
| 6,493,683 B1 | 12/2002 | David |
| 6,497,382 B2 | 12/2002 | King |
| D468,262 S | 1/2003 | Lee |
| D468,263 S | 1/2003 | Lee |
| D468,689 S | 1/2003 | Lee |
| 6,504,468 B2 | 1/2003 | Lee |
| 6,505,566 B1 | 1/2003 | Foster |
| D470,047 S | 2/2003 | Lee |
| D471,442 S | 3/2003 | Lee |
| D471,870 S | 3/2003 | Lee |
| D473,194 S | 4/2003 | Lee |
| 6,547,599 B2 | 4/2003 | Kinsey |
| 6,554,218 B2 | 4/2003 | Buyce |
| 6,559,893 B1 | 5/2003 | Martin |
| 6,560,102 B1 | 5/2003 | Tong |
| 6,567,277 B1 | 5/2003 | Doherty |
| 6,573,617 B2 | 6/2003 | Jones |
| 6,588,609 B1 | 7/2003 | Richet |
| 6,589,073 B2 | 7/2003 | Lee |
| 6,600,479 B1 | 7/2003 | Smith |
| 6,614,636 B1 | 9/2003 | Marsh |
| 6,637,166 B2 | 10/2003 | Kinsey |
| 6,640,041 B2 | 10/2003 | Ichinari |
| 6,644,993 B2 | 11/2003 | Victor |
| 6,683,770 B1 | 1/2004 | Marsh |
| 6,690,141 B1 | 2/2004 | Yu |
| 6,716,044 B2 | 4/2004 | Bertke |
| D490,779 S | 6/2004 | Lee |
| D492,054 S | 6/2004 | Donegani |
| 6,743,025 B2 | 6/2004 | Howard |
| 6,746,272 B2 | 6/2004 | Bean |
| 6,756,543 B1 | 6/2004 | Kaloustian |
| 6,764,322 B1 | 7/2004 | Yu |
| 6,779,370 B2 | 8/2004 | Bellow, Jr. |
| 6,780,047 B1 | 8/2004 | Laity |
| D496,118 S | 9/2004 | Donegani |
| 6,805,581 B2 | 10/2004 | Love |
| D498,555 S | 11/2004 | Donegani |
| D502,924 S | 3/2005 | Sirichai |
| D503,152 S | 3/2005 | Suckle |
| D503,153 S | 3/2005 | Suckle |
| 6,868,401 B1 | 3/2005 | Carpenter |
| 6,872,086 B2 | 3/2005 | Milan |
| D504,064 S | 4/2005 | Lee |
| D504,112 S | 4/2005 | Suckle |
| D505,390 S | 5/2005 | Lee |
| D505,657 S | 5/2005 | Suckle |
| D506,184 S | 6/2005 | Sirichai |
| D506,726 S | 6/2005 | Suckle |
| 6,902,429 B1 | 6/2005 | Brooks |
| 6,907,402 B1 | 6/2005 | Khaitan |
| 6,907,686 B2 | 6/2005 | Symons |
| D507,540 S | 7/2005 | Suckle |
| 6,916,565 B2 | 7/2005 | Shioya |
| 6,921,284 B2 | 7/2005 | Sirichai |
| D508,232 S | 8/2005 | Suckle |
| D509,185 S | 9/2005 | Suckle |
| D509,727 S | 9/2005 | Suckle |
| D510,091 S | 9/2005 | Mori |
| 6,941,395 B1 | 9/2005 | Galang |
| D510,572 S | 10/2005 | Lee |
| D510,907 S | 10/2005 | Suckle |
| D511,501 S | 11/2005 | Lee |
| 6,966,791 B1 | 11/2005 | Farr |
| D512,381 S | 12/2005 | Sirichai |
| D512,718 S | 12/2005 | Mori |
| 6,971,254 B2 | 12/2005 | Bellow, Jr. |
| D513,408 S | 1/2006 | Suckle |
| D513,409 S | 1/2006 | Suckle |
| D514,523 S | 2/2006 | Lee |
| D514,524 S | 2/2006 | Suckle |

(56) References Cited

U.S. PATENT DOCUMENTS

| | | |
|---|---|---|
| D515,508 S | 2/2006 | Lee |
| D516,032 S | 2/2006 | Suckle |
| 7,001,211 B2 | 2/2006 | Lichtscheidl |
| D517,497 S | 3/2006 | Lee |
| D517,984 S | 3/2006 | Suckle |
| D519,079 S | 4/2006 | Suckle |
| D519,464 S | 4/2006 | Suckle |
| D519,465 S | 4/2006 | Sirichai |
| 7,025,627 B2 | 4/2006 | Rosenthal |
| D519,837 S | 5/2006 | Sturk |
| D519,933 S | 5/2006 | Suckle |
| D519,934 S | 5/2006 | Wada |
| D520,457 S | 5/2006 | Wada |
| D520,458 S | 5/2006 | Wada |
| D520,460 S | 5/2006 | Wadsworth |
| D520,951 S | 5/2006 | Mori |
| D521,452 S | 5/2006 | Mori |
| D521,860 S | 5/2006 | Lee |
| D523,750 S | 6/2006 | Lee |
| 7,062,870 B1 | 6/2006 | You |
| D524,642 S | 7/2006 | Suckle |
| D524,759 S | 7/2006 | Wada |
| 7,077,693 B1 | 7/2006 | Symons |
| 7,080,812 B2 | 7/2006 | Wadsworth |
| 7,083,421 B1 | 8/2006 | Mori |
| 7,097,469 B2 | 8/2006 | Jacobs |
| 7,098,406 B1 | 8/2006 | Hammonds |
| 7,099,836 B2 | 8/2006 | Cichanowicz |
| 7,106,182 B2 | 9/2006 | De Wilde |
| 7,108,533 B2 | 9/2006 | Howard |
| 7,112,097 B1 | 9/2006 | Lam |
| D530,717 S | 10/2006 | Mori |
| 7,140,586 B2 | 11/2006 | Seil |
| D533,063 S | 12/2006 | Lee |
| 7,149,717 B1 | 12/2006 | Kan |
| D535,947 S | 1/2007 | Suckle |
| 7,167,372 B2 | 1/2007 | Mori |
| 7,171,386 B1 | 1/2007 | Raykhman |
| D536,303 S | 2/2007 | Suckle |
| D537,780 S | 3/2007 | Suckle |
| D537,784 S | 3/2007 | Suckle |
| 7,189,107 B1 | 3/2007 | Strayer |
| D539,735 S | 4/2007 | Suckle |
| D542,123 S | 5/2007 | Symons |
| D543,148 S | 5/2007 | Suckle |
| D543,154 S | 5/2007 | Suckle |
| D543,155 S | 5/2007 | Suckle |
| D543,156 S | 5/2007 | Suckle |
| D543,157 S | 5/2007 | Suckle |
| 7,223,122 B2 | 5/2007 | Mori |
| D543,942 S | 6/2007 | Howard |
| D545,179 S | 6/2007 | Mori |
| 7,233,086 B2 | 6/2007 | Borden |
| 7,236,209 B2 | 6/2007 | Martin |
| D546,811 S | 7/2007 | Neu |
| D547,486 S | 7/2007 | Donegani |
| 7,239,892 B2 | 7/2007 | Martin |
| 7,240,111 B2 | 7/2007 | Vanharlingen |
| 7,242,577 B2 | 7/2007 | Sween |
| 7,243,077 B2 | 7/2007 | Broden |
| 7,247,798 B2 | 7/2007 | Pagoto |
| 7,247,799 B2 | 7/2007 | Mori |
| D549,174 S | 8/2007 | Lee |
| D549,210 S | 8/2007 | Neu |
| D549,219 S | 8/2007 | Tan |
| D549,557 S | 8/2007 | Mori |
| D549,662 S | 8/2007 | Lee |
| D553,568 S | 10/2007 | Lee |
| 7,286,046 B2 | 10/2007 | Kinsey |
| D556,019 S | 11/2007 | Symons |
| D556,134 S | 11/2007 | Lee |
| 7,292,881 B2 | 11/2007 | Seil |
| 7,293,651 B2 | 11/2007 | Lee |
| D556,689 S | 12/2007 | Lee |
| D557,495 S | 12/2007 | Chan |
| D560,609 S | 1/2008 | Rosenthal |
| 7,318,567 B2 | 1/2008 | Mori |
| 7,318,750 B1 | 1/2008 | Chacon |
| 7,319,984 B2 | 1/2008 | Frankel |
| 7,324,334 B2 | 1/2008 | Sween |
| D561,093 S | 2/2008 | Sween |
| D561,094 S | 2/2008 | Sween |
| D561,687 S | 2/2008 | Sween |
| D561,762 S | 2/2008 | Mori |
| 7,329,152 B2 | 2/2008 | Mori |
| 7,335,053 B2 | 2/2008 | Avevor |
| D563,872 S | 3/2008 | Lee |
| D563,897 S | 3/2008 | Lee |
| D563,898 S | 3/2008 | Lee |
| D563,899 S | 3/2008 | Goetz |
| D564,447 S | 3/2008 | Lee |
| 7,361,050 B2 | 4/2008 | Mori |
| D570,598 S | 6/2008 | Chan |
| D570,788 S | 6/2008 | Lee |
| D570,789 S | 6/2008 | Lee |
| D571,733 S | 6/2008 | Seil |
| 7,381,095 B2 | 6/2008 | Freeman |
| 7,385,403 B2 | 6/2008 | Ferrer |
| D572,230 S | 7/2008 | Neu |
| D573,103 S | 7/2008 | Lee |
| 7,397,654 B2 | 7/2008 | Mori |
| 7,399,199 B2 | 7/2008 | Symons |
| 7,399,200 B1 | 7/2008 | Eliseo |
| 7,399,201 B1 | 7/2008 | Khorsand |
| 7,413,155 B2 | 8/2008 | Seil |
| 7,417,850 B1 | 8/2008 | Pulido |
| D576,030 S | 9/2008 | Lee |
| D576,166 S | 9/2008 | Mori |
| D576,553 S | 9/2008 | Lee |
| D577,577 S | 9/2008 | Lee |
| 7,429,197 B2 | 9/2008 | Weis |
| 7,432,619 B2 | 10/2008 | Voll |
| 7,433,839 B2 | 10/2008 | Bodurtha |
| 7,435,901 B2 | 10/2008 | Mori |
| 7,436,087 B2 | 10/2008 | Borden |
| 7,438,567 B2 | 10/2008 | Nalwad |
| 7,440,913 B2 | 10/2008 | Nozaki |
| 7,442,090 B2 | 10/2008 | Mori |
| D580,441 S | 11/2008 | Mori |
| 7,447,922 B1 | 11/2008 | Asbury |
| D581,669 S | 12/2008 | Sween |
| 7,461,941 B2 | 12/2008 | Martin |
| D584,225 S | 1/2009 | Lee |
| D585,836 S | 2/2009 | Lee |
| D587,246 S | 2/2009 | Neu |
| 7,484,990 B1 | 2/2009 | Lee |
| D588,000 S | 3/2009 | Goetz |
| D588,065 S | 3/2009 | Wadsworth |
| D588,442 S | 3/2009 | Chong |
| D588,546 S | 3/2009 | Lee |
| D588,547 S | 3/2009 | Lee |
| D588,549 S | 3/2009 | Lee |
| D588,904 S | 3/2009 | Chong |
| D589,456 S | 3/2009 | Puluc |
| 7,498,687 B2 | 3/2009 | Kinsey |
| 7,501,580 B2 | 3/2009 | Pagoto |
| 7,510,420 B2 | 3/2009 | Mori |
| 7,518,265 B2 | 4/2009 | Roepke |
| D593,034 S | 5/2009 | Mori |
| D593,954 S | 6/2009 | Lee |
| RE41,060 E | 12/2009 | Yu |
| 7,626,356 B2 | 12/2009 | Elgie |
| 7,656,120 B2 | 2/2010 | Neu |
| 7,659,696 B2 | 2/2010 | Zeiler |
| 7,663,866 B2 | 2/2010 | Lee |
| 7,689,500 B2 | 3/2010 | Cottrell |
| 7,707,086 B2 | 4/2010 | Burns |
| 7,742,979 B2 | 6/2010 | Reding |
| 7,813,984 B2 | 10/2010 | Korzinin |
| 7,827,083 B2 | 11/2010 | Beurskens |
| 7,831,502 B2 | 11/2010 | Cummings |
| 7,876,066 B2 | 1/2011 | Mori |
| 7,904,373 B2 | 3/2011 | Kimle |
| 7,912,781 B2 | 3/2011 | Rosenthal |

(56) References Cited

U.S. PATENT DOCUMENTS

| | | |
|---|---|---|
| 7,945,505 B2 | 5/2011 | Van Slyke |
| 3,002,586 A1 | 8/2011 | Fleisig |
| 3,002,587 A1 | 8/2011 | Fleisig |
| 7,991,685 B2 | 8/2011 | Tatge |
| 8,015,089 B1 | 9/2011 | Bayaa |
| 8,016,611 B2 | 9/2011 | Fleisig |
| 8,026,633 B2 | 9/2011 | Fleisig |
| 8,036,966 B2 | 10/2011 | Brittan |
| D648,685 S | 11/2011 | Symons |
| 8,055,573 B2 | 11/2011 | Schlecht |
| 8,159,085 B2 | 4/2012 | Fleisig |
| 8,174,147 B2 | 5/2012 | Fleisig |
| 8,180,698 B2 | 5/2012 | Lerner |
| 8,193,658 B2 | 6/2012 | Fleisig |
| 8,195,544 B2 | 6/2012 | Horsfall |
| 8,217,528 B2 | 7/2012 | Fleisig |
| 8,230,995 B2 | 7/2012 | Andrews |
| 8,239,313 B2 | 8/2012 | Jenkins |
| 8,249,975 B1 | 8/2012 | Keith |
| 8,255,296 B2 | 8/2012 | Hardison, III |
| 8,339,101 B2 | 12/2012 | Wu |
| 8,398,408 B1 | 3/2013 | Hansen |
| 8,471,531 B2 | 6/2013 | Roepke |
| 8,547,063 B2 | 10/2013 | Krancher |
| 8,589,261 B2 | 11/2013 | Hardison, III |
| 8,626,626 B2 | 1/2014 | Hardison, III |
| 8,729,731 B2 | 5/2014 | Roepke |
| 8,755,914 B2 | 6/2014 | Bhogal |
| 8,805,551 B2 | 8/2014 | Bhogal |
| 8,975,869 B2 | 3/2015 | Lee |
| 9,054,541 B2 | 6/2015 | Morita |
| 9,152,196 B2 | 10/2015 | Collopy |
| 9,166,422 B2 | 10/2015 | Brotto |
| 9,184,546 B2 | 11/2015 | Fleisig |
| 9,347,790 B2 | 5/2016 | Haukom |
| 9,362,764 B2 | 6/2016 | Farkas |
| 2002/0002593 A1 | 1/2002 | Ewing |
| 2002/0038394 A1 | 3/2002 | Liang |
| 2002/0050807 A1 | 5/2002 | Janik |
| 2002/0099505 A1 | 7/2002 | Thomas |
| 2002/0189848 A1 | 12/2002 | Hawker |
| 2003/0038209 A1 | 2/2003 | Remeczky |
| 2003/0066936 A1 | 4/2003 | Beck |
| 2003/0121742 A1 | 7/2003 | Hardy |
| 2003/0188880 A1 | 10/2003 | McClellan |
| 2004/0108126 A1 | 6/2004 | Kaloustian |
| 2004/0160150 A1 | 8/2004 | Hay |
| 2004/0224638 A1 | 11/2004 | Fadell |
| 2005/0029984 A1 | 2/2005 | Cheng |
| 2005/0052085 A1 | 3/2005 | Chang |
| 2005/0079769 A1 | 4/2005 | Strayer |
| 2005/0093510 A1 | 5/2005 | Seil |
| 2005/0233622 A1 | 10/2005 | Lichtscheidl |
| 2006/0060368 A1 | 3/2006 | Dinh |
| 2006/0061332 A1 | 3/2006 | Neu |
| 2006/0065422 A1 | 3/2006 | Broyles |
| 2006/0196995 A1 | 9/2006 | Mori |
| 2006/0201707 A1 | 9/2006 | Dinh |
| 2006/0258195 A1 | 11/2006 | Schwartz |
| 2006/0276077 A1 | 12/2006 | Mori |
| 2006/0278077 A1 | 12/2006 | Mukaide |
| 2007/0010971 A1 | 1/2007 | Nikolova |
| 2007/0039755 A1 | 2/2007 | Mori |
| 2007/0109710 A1 | 5/2007 | Milan |
| 2007/0111585 A1 | 5/2007 | Mori |
| 2007/0180665 A1 | 8/2007 | Sween |
| 2007/0235222 A1 | 10/2007 | Hubbard |
| 2007/0236181 A1 | 10/2007 | Palladino |
| 2007/0257560 A1 | 11/2007 | Menas |
| 2007/0261874 A1 | 11/2007 | Pagoto |
| 2007/0273325 A1 | 11/2007 | Krieger |
| 2007/0275594 A1 | 11/2007 | Greenberg |
| 2007/0284949 A1 | 12/2007 | Voll |
| 2007/0295529 A1 | 12/2007 | Mori |
| 2008/0104427 A1 | 5/2008 | Yee |
| 2008/0111013 A1 | 5/2008 | Suckle |
| 2008/0112152 A1 | 5/2008 | Figueroa |
| 2008/0113563 A1 | 5/2008 | Roepke |
| 2008/0164757 A1 | 7/2008 | Elgie |
| 2008/0185990 A1 | 8/2008 | Hsu |
| 2008/0194139 A1 | 8/2008 | Chan |
| 2008/0261455 A1 | 10/2008 | Axland |
| 2008/0266783 A1 | 10/2008 | Mills |
| 2008/0302687 A1 | 12/2008 | Sirichai |
| 2008/0315734 A1 | 12/2008 | Birsel |
| 2009/0009936 A1 | 1/2009 | Neu |
| 2009/0014196 A1 | 1/2009 | Peck |
| 2009/0099505 A1 | 4/2009 | Hendrixson |
| 2009/0156061 A1 | 6/2009 | Bernstein |
| 2009/0195970 A1 | 8/2009 | Lee |
| 2009/0276643 A1 | 11/2009 | Saito |
| 2010/0090646 A1 | 4/2010 | Mori |
| 2010/0090654 A1 | 4/2010 | Breiting |
| 2010/0095139 A1 | 4/2010 | Murphy |
| 2010/0104278 A1 | 4/2010 | Livingston |
| 2010/0148983 A1 | 6/2010 | Huxley |
| 2010/0156342 A1 | 6/2010 | Hrabal |
| 2010/0171465 A1 | 7/2010 | Seal |
| 2010/0213892 A1 | 8/2010 | Desanctis |
| 2010/0225268 A1 | 9/2010 | Hui |
| 2010/0231161 A1 | 9/2010 | Brown |
| 2010/0244765 A1 | 9/2010 | Collopy |
| 2010/0246232 A1 | 9/2010 | Chen |
| 2011/0025263 A1 | 2/2011 | Gilbert |
| 2011/0057605 A1 | 3/2011 | Chung |
| 2011/0076874 A1 | 3/2011 | Fleisig |
| 2011/0076875 A1 | 3/2011 | Fleisig |
| 2011/0076876 A1 | 3/2011 | Fleisig |
| 2011/0076877 A1 | 3/2011 | Fleisig |
| 2011/0076878 A1 | 3/2011 | Fleisig |
| 2011/0076879 A1 | 3/2011 | Fleisig |
| 2011/0076880 A1 | 3/2011 | Fleisig |
| 2011/0076882 A1 | 3/2011 | Fleisig |
| 2011/0084872 A1 | 4/2011 | Kishida |
| 2011/0085048 A1 | 4/2011 | Amano |
| 2011/0163600 A1 | 7/2011 | Garb |
| 2011/0193523 A1 | 8/2011 | Law |
| 2011/0227551 A1 | 9/2011 | Black |
| 2011/0266997 A1 | 11/2011 | Krancher |
| 2011/0273906 A1 | 11/2011 | Nichol |
| 2012/0019207 A1 | 1/2012 | Kuo |
| 2012/0187902 A1 | 7/2012 | Wang |
| 2012/0250295 A1 | 10/2012 | Bouffay |
| 2013/0015714 A1 | 1/2013 | Kwok |
| 2013/0234649 A1 | 9/2013 | Sevier |
| 2013/0241489 A1 | 9/2013 | Ting |
| 2013/0278214 A1 | 10/2013 | Saton |
| 2013/0339766 A1 | 12/2013 | Chen |
| 2014/0059264 A1 | 2/2014 | Sudak |
| 2014/0104805 A1 | 4/2014 | Row |
| 2014/0111143 A1 | 4/2014 | Sells |
| 2014/0312691 A1 | 10/2014 | Doljack |
| 2014/0335919 A1 | 11/2014 | Stewart |
| 2014/0367138 A1 | 12/2014 | Godfrey |
| 2015/0008741 A1 | 1/2015 | Fleisig |
| 2015/0159416 A1 | 6/2015 | Tehranchi |
| 2015/0214708 A1 | 7/2015 | Segnit |
| 2015/0263447 A1 | 9/2015 | Liao |
| 2015/0263551 A1 | 9/2015 | Caren |
| 2016/0004286 A1 | 1/2016 | Collopy |
| 2016/0013827 A1 | 1/2016 | Hubinak |
| 2016/0123569 A1 | 5/2016 | Cummings |
| 2016/0187046 A1 | 6/2016 | Chen |

FOREIGN PATENT DOCUMENTS

| | | |
|---|---|---|
| EP | 1641100 B1 | 11/2011 |
| WO | 1999053594 A1 | 10/1999 |
| WO | 2008131486 A1 | 11/2008 |
| WO | 2011038339 A1 | 3/2011 |
| WO | 2012083484 A1 | 6/2012 |
| WO | 2013059262 A1 | 4/2013 |
| WO | 2015120300 A1 | 8/2015 |

(56) References Cited

FOREIGN PATENT DOCUMENTS

OTHER PUBLICATIONS

Donut, Ramei Keum, www.rameikeum.com, 2 pages, 2008.
Power + Trashcann, Greg Fulco Products, one page, 2010.
Powerpod, Steelcase, Inc., two pages, 2010.
Projectors Galore, http://high-tech-360.blogspot.com/2009/05/projectors-galore.html, 3 pages, Jul. 1, 2010.
Sail, Marek Wenglorz, www.coroflot.com, 1 page, 2009.
Spy Box, Marek Wenglorz, www.coroflot.com, 1 page, 2009.
Surge3000 Calamari Edition: Surge Protector, Trident Design, LLC Powersquid.com, two pages, 2009.
Wardrobe valet with surge protector, Comfort House, Inc., one page, 2010.
Corrected Notice of Allowability dated Jan. 2, 2018 for U.S. Appl. No. 15/204,427; (pp. 1-2).
Descriptive Materials on the Punkt ES 01 Extension Socket, by the PunktGroup, published at http://www.punktgroup.com/en/154/gallery.aspx, and launched on Sep. 7, 2012 (7 Pages).
International Search Report (ISR) dated Mar. 31, 2017 issued in International Patent Application No. PCT/US2016/064487 (7 Pages).
International Search Report for International Application No. PCT/US2012/060531 completed Dec. 14, 2012.
Notice of Allowance dated Aug. 23, 2017 for U.S. Appl. No. 15/204,427; (pp. 1-7).
Notice of Allowance dated Dec. 11, 2020 for U.S. Appl. No. 15/921,660 (pp. 1-7).
Notice of Allowance dated Oct. 4, 2017 for U.S. Appl. No. 14/957,510; (pp. 1-7).
Office Action (Final Rejection) Issued in U.S. Appl. No. 13/275,437 dated Jun. 4, 2014 (12 pages).
Office Action dated Oct. 4, 2013 issued in U.S. Appl. No. 13/275,437 by Jeffrey Fleisig (46 Pages).
Office Action dated Jul. 3, 2017 for U.S. Appl. No. 13/653,655; (pp. 1-5).
Office Action dated Sep. 18, 2018 for U.S. Appl. No. 15/921,660 (pp. 1-9).
Online product advertisement entitled 'Cable Management the Easy Way', http://cableorganizer.com/, pp. 1 through 4. 2009.
Online product advertisement entitled 'Hardwood Electrics', http://ihwe.com/cordboxes/, pp. 1 and 2. 2009.
Online product advertisement entitled 'The Sanctuary Power Charger Station and Desk Valet', http://cableorganizer.com/blue-lounge-designs/sanctuary.html, pp. 1 through 10. 2009.
Online product advertisement entitled 'Kangaroom Black Box Cord Organizer', http://kangaroomstorage.com/product/charging-%2B-orga . . . , pp. 1 and 2. 2009.
Online product advertisement entitled 'The Sanctuary Power Charger Station and Desk Valet', http://cableorganizer.com/blue-lounge-designs/sanctuary.html, pp. 1 through 4. 2009.
Response to Office Action dated Mar. 3, 2014 filed in U.S. Appl. No. 13/275,437 (14 pages).
Search Report for PCT Application No. PCT/US2010/050391 completed Jan. 21, 2011. (5 pages).
Written Opinion (WO) dated Mar. 31, 2017, issued in International Patent Application No. PCT/US2016/064487 (11 Pages).
Written Opinion of the International Searching Authority in International Application No. PCT/US2012/060531 dated Jan. 3, 2013. (10 pages).

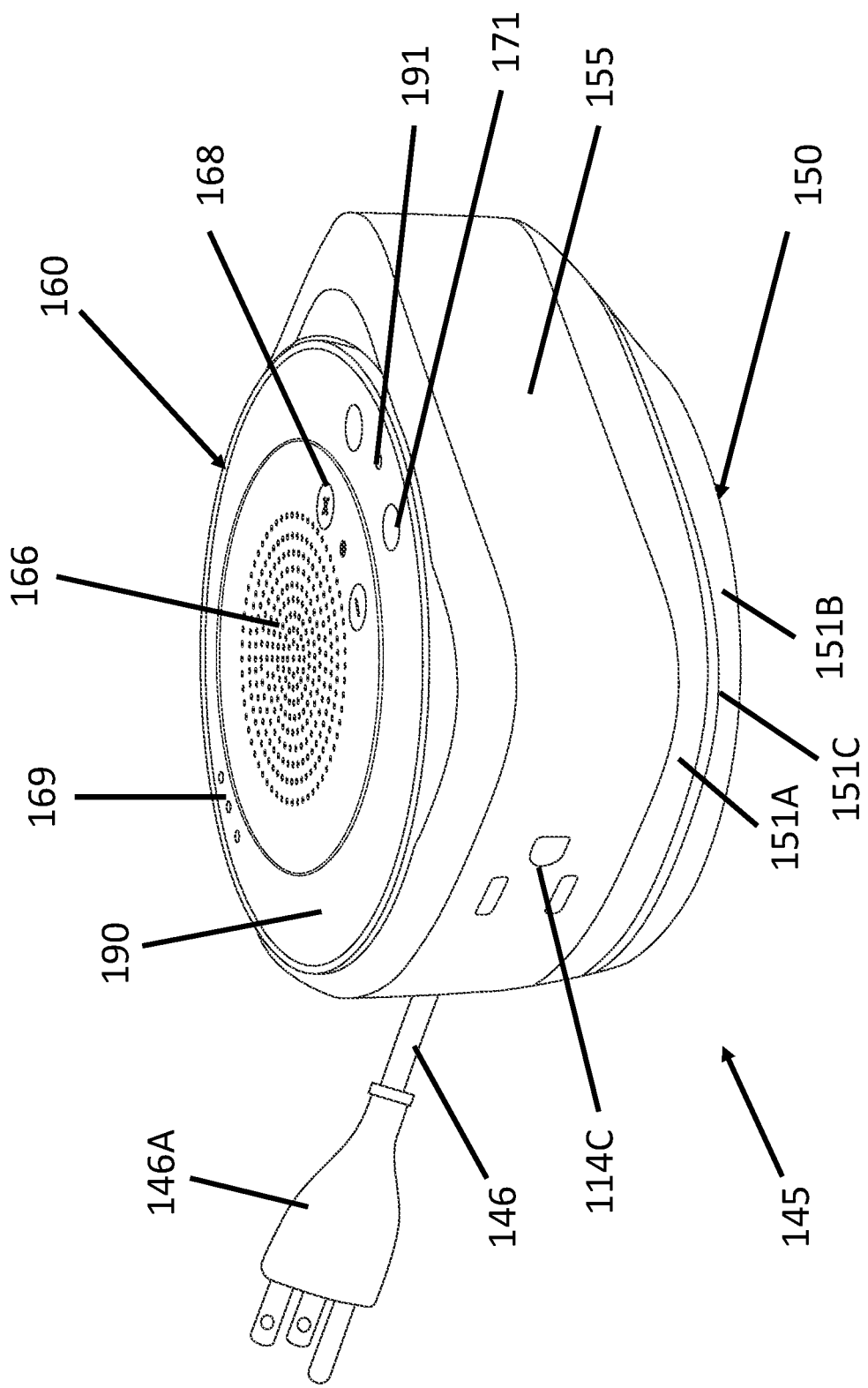

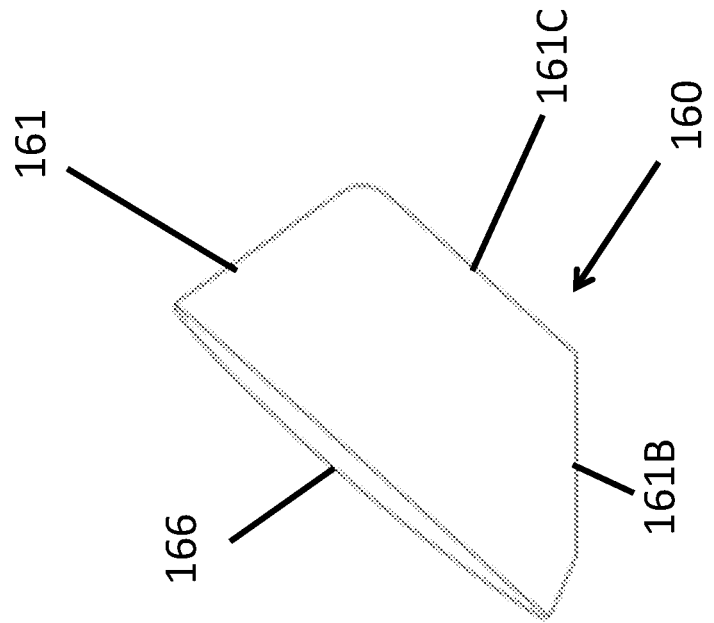
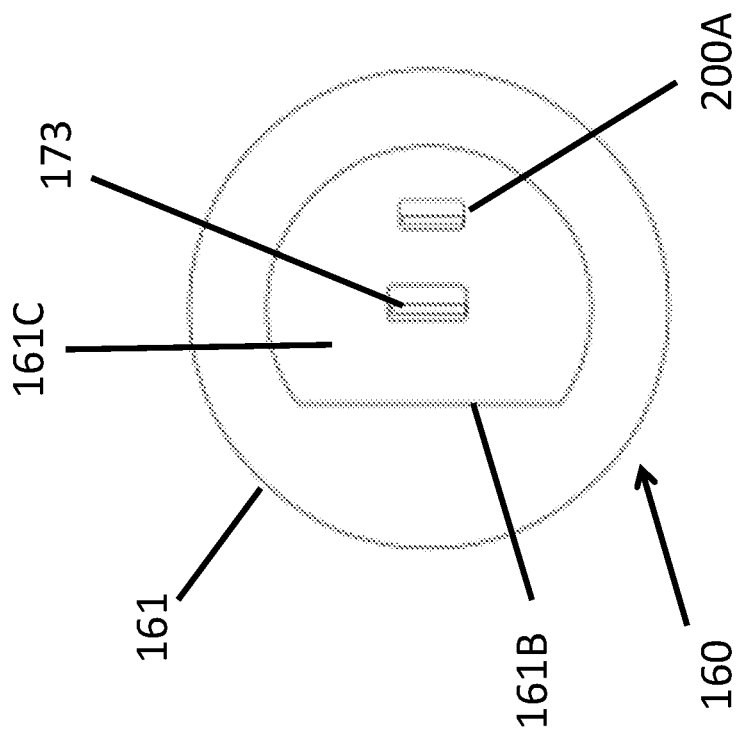

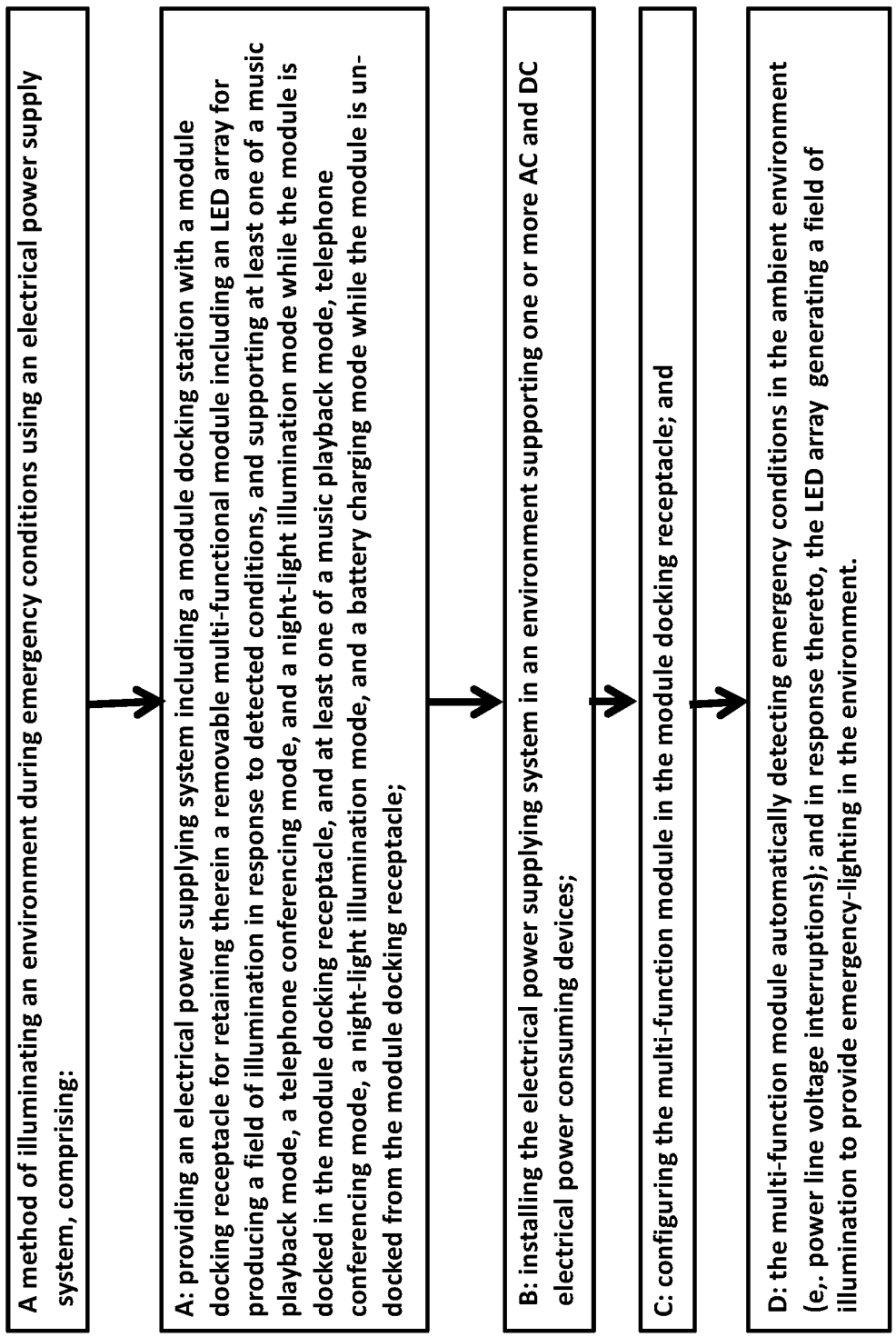

A method of illuminating an environment during emergency conditions using an electrical power supply system, comprising:

A: providing an electrical power supplying system including a module docking station with a module docking receptacle for retaining therein a removable multi-functional module including an LED array for producing a field of illumination in response to detected conditions, and supporting at least one of a music playback mode, a telephone conferencing mode, and a night-light illumination mode while the module is docked in the module docking receptacle, and at least one of a music playback mode, telephone conferencing mode, a night-light illumination mode, and a battery charging mode while the module is un-docked from the module docking receptacle;

B: installing the electrical power supplying system in an environment supporting one or more AC and DC electrical power consuming devices;

C: configuring the multi-function module in the module docking receptacle; and

D: the multi-function module automatically detecting emergency conditions in the ambient environment (e,. power line voltage interruptions); and in response thereto, the LED array generating a field of illumination to provide emergency-lighting in the environment.

FIG. 35

A method of charging a portable DC electrical energy consuming device (e.g. smartphone) using a multi-function module and smartphone arranged in wireless communication therewith, comprising:

↓

A: providing an electrical power supplying system comprising a module docking station with a module docking receptacle for retaining therein a removable multi-functional module including a loudspeaker for producing audible sound including music, and supporting at least one of a music playback mode, a telephone conferencing mode, and a night-light illumination mode while the module is docked in the module docking receptacle, and at least one of a music playback mode, telephone conferencing mode, a night-light illumination mode and a battery charging mode while the module is un-docked from the module docking receptacle;

B: installing the electrical power supplying system in an environment supporting one or more AC and DC electrical power consuming devices;

C: configuring the multi-function module in the module docking receptacle;

D: selecting the music playback mode in the multi-function module, and set up a Bluetooth wireless network connection with a smartphone;

E: operating said portable mp3 music player so as to play back a music recording running on the smartphone, and sending digital signals to the removable multi-function module;

F: said removable multi-function module receiving and processing the digital signals and producing an audio reproduction of the music recording playing back on the portable mp3 music player, through the loudspeaker in the removable multi-function module.

FIG. 41

ELECTRICAL POWER SUPPLYING AND CORD MANAGEMENT STATION WITH DOCKABLE MODULE SUPPORTING MULTIPLE MODES OF OPERATION

RELATED CASES

This is a Continuation of co-pending patent application Ser. No. 15/921,660 filed Mar. 15, 2018, which is a Continuation of U.S. patent application Ser. No. 14/957,510 filed Dec. 2, 2015, Now U.S. Pat. No. 9,927,837, which is a Continuation-In-Part (CIP) of co-pending application Ser. No. 13/934,606 filed Jul. 3, 2013, now U.S. Pat. No. 9,513,682, wherein each said patent application is commonly owned by PUCLINE, LLC, and incorporated herein by reference and is fully set forth herein.

BACKGROUND OF INVENTION

Field of Invention

The present invention relates to new and improved methods of and apparatus for supplying electrical power to electrical power consuming devices, and managing the power cords associated therewith in diverse environment.

Brief Description of the State of Knowledge in the Art

The modern lifestyle of millions of consumers involves the use of rechargeable smartphones, rechargeable cameras, portable laptop computers, rechargeable tablets, modems, powered hard drives, powered Bluetooth® speakers, and many other kinds of portable electronic devices that consume either AC or DC electrical power. Users of such portable devices are constantly plugging and unplugging devices, often kneeling down for a nearby power outlet or searching behind a fixed piece of furniture for a free outlet that is not accessible, or which is not within reach, but only to discover that the power outlet is already being used. Consequently, too often we cannot find an available outlet or if we do it is never in a handy place to satisfy our ever-expanding need for electrical power.

Traditional power strips are bulky and designed for floor use and lack a usable cord management option. Also, while other prior art devices have addressed cord management, they have not done so in ways, which are both convenient and efficient for the users of modern portable powered devices, who are constantly on the move.

Also, at the same time, millions of consumers have become used to the mobile life-style where many tasks, once centered around desktop computers, are not revolving around desktop phones, mobile pad computers (e.g. Apple iPads) and communal work environments (e.g. desks, coffee tables, etc.). This change in lifestyle and workflow has created many new challenges in supplying electrical power to portable electrical power consuming devices. At the same time, such changes have created new opportunities for power strip manufacturers to better serve the needs of their current and prospective customers.

Therefore, there is a great need in the art for new and improved electrical power supplying systems that address the unfulfilled needs of millions of consumers to power multiple portable devices in diverse users environments, with greater electrical power accessibility, improved power cord management and reduced clutter, while avoiding the shortcomings and drawbacks of prior art devices and methodologies.

Objects and Summary of the Present Invention

It is therefore a primary object of the present invention to provide a new and improved portable (i.e. transportable) system that fulfills the needs of millions of consumers to power multiple electrical appliances and/or electronic devices in diverse users environments, with a greater electrical power accessibility, improved power cord management, reduced clutter and enhanced functionality in diverse end-user environments, while avoiding the shortcomings and drawbacks of prior art devices and methodologies.

Another object of the present invention is to provide an improved electrical power supplying system for use in diverse environments comprising a module docking station with a module docking receptacle, and a multi-function module for docking in the module docking receptacle and which can be manually removed and used locally or remotely while supporting one or more different functional subsystems.

Another object of the present invention is to provide such an improved electrical power supplying system, wherein the module docking station comprises: (i) a base housing portion having an external power cord storage compartment with an internal spool, about which a power cord can be neatly wrapped up and contained within the external power cord storage compartment; and (ii) a power receptacle housing portion connected to the base housing portion, and supporting the module docking receptacle, and containing a plurality of AC power receptacles, one or more USB-type DC power receptacles, and a male-type USB-based module dock interface mounted in the central bottom portion of the module docking receptacle; and wherein the multi-function module also includes a female-type USB-based module dock interface, and is insert able within the module docking receptacle so that the male and female USB-based module dock interfaces interconnect with each other when the multi-function module is docked within the module docking receptacle.

Another object of the present invention is to provide such an improved electrical power supplying system, wherein the power receptacle housing portion comprises a ring-like geometry supporting (i) the plurality of AC electrical receptacles for supplying electrical power to AC electrical power consuming devices using electrical power cords, and (ii) the one or more USB-type DC power receptacles for supplying DC electrical power to DC electrical power consuming devices using one or more USB cables.

Another object of the present invention is to provide such an improved electrical power supplying system, wherein the multi-function module comprises a number of functional subsystems, namely: a battery power storage subsystem and includes rechargeable battery module; a night-light/emergency illumination subsystem including a LED array for automatically producing a field of visible illumination in response to the automatic detection of the light level in the ambient environment by a photo-sensor fall beyond a pre-determined threshold level; a telephone conference subsystem including a microphone and a loudspeaker for supporting teleconferences using a locally wirelessly interfaced phone device; and a music streaming subsystem for producing audio signals for music being played on a remote music player or mobile phone system transmitting music signals over a wireless communication interface, wherein each subsystem is housed in a portable compact housing adapted for mated insertion into the module docking receptacle, and controlled by a subsystem controller, wherein user-selectable controls are provided for selecting modes and controlling illumination temperature, illumination intensity, and audio volume from the multi-function module, either directly through controls on the multi-function module or by using an application running on a smartphone in wireless communication with the multi-function module.

Another object of the present invention is to provide such an improved electrical power supplying system, wherein the multi-function module can be manually removed from its module docking receptacle by lifting up on the compact housing of the multi-function module using the user's fingers, and dis-engaging the physical connection between the USB-type interface connectors.

Another object of the present invention is to provide such an improved electrical power supplying system, wherein the multi-function module supports a night-light/emergency illumination subsystem that automatically generates a field of illumination in response to low lighting conditions detected by a photo-sensor, or power-line interruptions detected by a power-line voltage detector.

Another object of the present invention is to provide such an improved electrical power supplying system, wherein the battery power storage subsystem is realized using a set of solid-state batteries, a battery recharging circuitry, and electrical sockets and battery holders.

Another object of the present invention is to provide such an improved electrical power supplying system, wherein the portable night-light/emergency illumination subsystem comprises an array of light emitting diodes (LEDs) having different wavelength characteristics capable of producing illumination having different adjustable color temperatures and intensity levels.

Another object of the present invention is to provide such an improved electrical power supplying system, wherein the night-light illumination subsystem includes a photo-sensor and related electronic circuitry for automatically detecting ambient illumination levels and automatically activating the night-light/emergency illumination subsystem in response to detecting when ambient illumination levels fall below a predetermined ambient illumination threshold level.

Another object of the present invention is to provide such an improved electrical power supplying system, wherein emergency illumination subsystems includes a power line-voltage sensor and related electronic circuitry for detecting when power interruptions have occurred and automatically activating such emergency illumination subsystem in response to detecting when the power line voltage falls below a predetermined power line voltage threshold level.

Another object of the present invention is to provide such an improved electrical power supplying system, wherein a processor on the PC board is programmed to support the control of LED driving circuitry controlling the illumination generated in from the LEDs in response to ambient lighting conditions detected by the photo-sensor.

Another object of the present invention is to provide such an improved electrical power supplying system, wherein a processor on the PC board is programmed to support the control of LED driving circuitry controlling the intensity and/or color temperature of the illumination generated in from the LEDs in response to any mode and light color temperature selection controls that may have been activated or selected by way of an computer application running on a smartphone or other mobile computing device, in communication with the multi-function module via a wireless communication interface.

Another object of the present invention is to provide such an improved electrical power supplying system, wherein the telephone conference subsystem is contained in a portable compact housing including: an audio loudspeaker for reproducing the audio voice signals detected by the mobile smartphone wirelessly interfaced with the telephone conference subsystem by way of the wireless communication interface supported by the multi-function module; a microphone having a wide audio pickup pattern for picking up voice and other sound patterns and generating corresponding electrical signals that are transmitted to the telephone conference subsystem for signal processing; and a processor programmed to support telephone conferencing among a smartphone device establishing a wireless connection with the multi-function module by way of a wireless interface connection, supported between the smartphone and the multi-function module.

Another object of the present invention is to provide such an improved method of delivering an audio reproduction of a music recording playing back on a portable mp3 music player using a multi-function module and a smartphone arranged in wireless communication therewith, wherein the method comprises the steps of: (a) providing an electrical power supplying system comprising a module docking station with a module docking receptacle for retaining therein a multi-function module including a loudspeaker for producing audible sound including music, and supporting at least one of a music playback mode, a telephone conferencing mode, and a night-light illumination mode while the module is docked in the module-docking cavity, and at least one of a music playback mode, telephone conferencing mode, a night-light illumination mode and a battery charging mode while the module is un-docked from the module-docking cavity; (b) installing the portable electrical power supplying system in an environment supporting one or more AC and DC electrical power consuming devices; (c) configuring the multi-function module in the module docking receptacle; (d) selecting the music playback mode in the multi-function module, and setting up a wireless Bluetooth interface connection with the smartphone; (e) operating the portable mp3 music player so as to play back a music recording running on the smartphone, and sending digital signals from the smartphone over the wireless interface connection to the multi-function module; and (f) the multi-function module receiving and processing the digital signals and producing an audio reproduction of the music recording playing back on the portable mp3 music player, through the loudspeaker mounted in the multi-function module.

Another object of the present invention is to provide such an improved method of conducting a teleconference initiated on a smartphone across a telephone network, using a electrical power supplying system and the smartphone arranged in wireless communication therewith, comprising: (a) providing an electrical power supplying system comprising a module docking station with a module docking receptacle for retaining therein an multi-function module including a microphone for detecting voice signal during a teleconference session and a loudspeaker for reproducing voice signals during the teleconference session, and supporting (i) at least one of a music playback mode, a telephone conferencing mode, and a night-light illumination mode while the multi-function module is docked in the module docking receptacle, and (ii) at least one of a music playback mode, telephone conferencing mode, a night-light illumination mode and a battery charging mode while the module multi-function is un-docked from the module docking receptacle; (b) installing the portable electrical power supplying system in an environment supporting one or more AC and DC electrical power consuming devices; (c) configuring the multi-function module in the module docking receptacle; (d) selecting the teleconference mode in the multi-function module, and setting up a wireless Bluetooth interface connection with the smartphone; (e) operating the smartphone so as to accept the wireless Bluetooth interface connection from the multi-function module and supporting a telephone conferencing session with one or more remote telephone devices connected to the telephone network, using the smartphone and the microphone and loudspeaker in the multi-function module; and (f) during the telephone conferencing session, the multi-function module (i) receiving digital signals received from the smartphone and corresponding to voice signals from the one or more remote telephones, and converting the digital signals into analog signals that are provided to the loudspeaker during the teleconferencing session, and (ii) generating analog signals corresponding to voice signals detected by the microphone during the voice session, and converting these analog signals into digital signals that are transmitted to the smartphone during the telephone conferencing session.

Another object of the present invention is to provide such an improved method of illuminating an environment during the night-time using a multi-function module, comprising: (a) providing an electrical power supplying system comprising a module docking station with a module docking receptacle for retaining therein a multi-function module including an LED array for producing a field of illumination in response to detected conditions, and supporting at least one of a music playback mode, a telephone conferencing mode, and a night-light/emergency illumination mode while the module is docked in the module docking receptacle, and at least one of a music playback mode, telephone conferencing mode, a night-light illumination mode and a battery charging mode while the module is un-docked from the module docking receptacle; (b) installing the portable electrical power supplying system in an environment supporting one or more AC and DC electrical power consuming devices; (c) configuring the multi-function module in the module docking receptacle; and (d) the multi-function module automatically detecting low-illumination levels in the ambient environment, and in response thereto, the LED array generating a field of illumination to provide night-lighting in the ambient environment.

Another object of the present invention is to provide such an improved method of illuminating an environment during detected emergency conditions (e.g. power line failures) using an electrical power supplying system comprising: (a) providing an electrical power supplying system comprising a module docking station with a module docking receptacle for retaining therein a multi-function module including an LED array for producing a field of illumination in response to detected emergency conditions, and supporting at least one of a music playback mode, a telephone conferencing mode, and an emergency illumination mode while the module is docked in the module-docketing cavity, and at least one of a music playback mode, telephone conferencing mode, a night-light illumination mode and a battery charging mode while the multi-function module is un-docked from the module docking receptacle; (b) installing the portable electrical power supplying system in an environment supporting one or more AC and DC electrical power consuming devices; (c) configuring the multi-function module in the module docking receptacle; and (d) signal level sensing circuitry in the multi-function module (or within the adapter) automatically detecting predefined emergency conditions (e.g. power line failure) in the ambient environment, and in response thereto, the LED array generating a field of illumination to provide emergency lighting in the ambient environment.

Another object of the present invention is to provide such an improved method of delivering an audio reproduction of a music recording playing back on a portable mp3 music player (e.g. running on a smartphone) using an electrical power supplying system and smartphone arranged in wireless communication therewith and operated in accordance with the principles of the present invention, comprising: (a) providing an electrical power supplying system comprising a module docking station with a module docking receptacle for retaining therein a multi-function module including a loudspeaker for producing audible sound including music, and supporting at least one of a music playback mode, a telephone conferencing mode, and a night-light illumination mode while the module is docked in the module docking receptacle, and at least one of a music playback mode, telephone conferencing mode, a night-light illumination mode and a battery charging mode while the module is un-docked from the module docking receptacle; (b) installing the portable electrical power supplying system in an environment supporting one or more AC and DC electrical power consuming devices; (c) configuring the multi-function module outside the module docking receptacle; (d) selecting the music playback mode in the multi-function module, and setting up a wireless Bluetooth interface connection with the smartphone; (e) operating the portable mp3 music player so as to play back a music recording running on the smartphone, and sending digital signals from the smartphone (over the wireless interface connection) to the multi-function module; and (f) the multi-function module receiving and processing the digital signals and producing an audio reproduction of the music recording playing back on the portable mp3 music player, through the loudspeaker mounted in the multi-function module.

Another object of the present invention is to provide such an improved method of delivering an audio reproduction of a music recording playing back on a portable mp3 music player (e.g. running on a smartphone) while illuminating the ambient environment using an electrical power supplying system and smartphone arranged in wireless communication therewith, comprising: (a) providing a electrical power supplying system comprising a module docking station with a module docking receptacle for retaining therein a multi-function module including an LED lighting array, and a loudspeaker for producing audible sounds including music, and supporting at least one of a music playback mode, a telephone conferencing mode, and a night-light illumination mode while the module is docked in the module-docking receptacle, and at least one of a music playback mode, telephone conferencing mode, a night-light illumination mode and a battery charging mode while the module is un-docked from the module docking receptacle; (b) installing the portable electrical power supplying system in an environment supporting one or more AC and DC electrical power consuming devices; (c) configuring the multi-function module outside the module docking receptacle; (d) selecting the music playback mode and night-light illumination mode in the multi-function module, and setting up a wireless Bluetooth interface connection with the smartphone; (e) operating the portable mp3 music player so as to playback a music recording running on the smartphone, and sending digital signals from the smartphone (over the wireless interface connection) to the multi-function module; and (f) the multi-function module receiving and processing the digital signals and producing an audio reproduction of the music recording playing back on the portable mp3 music player, through the loudspeaker mounted in the multi-function module, while the LED light array produces a field of illumination in response to detected low-illumination levels or manual selection of illumination generation.

Another object of the present invention is to provide such an improved method of charging a portable DC electrical energy consuming device (e.g. smartphone) using a multi-function module and smartphone arranged in wireless communication therewith and operated in accordance with the principles of the present invention, comprising: (a) providing an electrical power supplying system comprising a module docking station with a module docking receptacle for retaining therein a multi-function module including an LED array for producing a field of illumination in response to detected conditions, and supporting at least one of a music playback mode, a telephone conferencing mode, and a night-light illumination mode while the module is docked in the module docking receptacle, and at least one of a music playback mode, a telephone conferencing mode, a night-light illumination mode and a battery charging mode while the module is un-docked from the module-docking receptacle; (b) installing the portable electrical power supplying system in an environment supporting one or more AC and DC electrical power consuming devices; (c) configuring (i.e. installing) the multi-function module in the module docking receptacle; and (d) the multi-function module automatically detecting low-illumination levels in the ambient environment, and in response thereto, the LED array generating a field of illumination to provide night-lighting in the ambient environment.

Another object of the present invention is to provide such an improved method of remotely controlling an electrical power supplying system using a smartphone or remote computing device operably connected to the TCP/IP infrastructure of the Internet and comprising: (a) providing a multi-function module operably connected to the TCP/IP infrastructure of the Internet by way of a IP packet router, and comprising a base docking station having a set of AC electrical power receptacles and one or more USB-type DC power receptacles, and a module docking receptacle for retaining therein a multi-function module supporting at least one of a music playback mode, a telephone conferencing mode, a night-light illumination mode and a remote control mode for controlling the AC and DC electrical power receptacles while the module is docked in the module docking receptacle, and at least one of a music playback mode, telephone conferencing mode, a night-light illumination mode and a battery charging mode while the module is un-docked (i.e. removed) from the module-docking receptacle; (b) installing the portable electrical power supplying system in an environment supporting one or more AC and DC electrical power consuming; (c) configuring the multi-function module in the module docking receptacle; (d) selecting the remote control mode in the system; and (e) using a smartphone or other computing device operably connected to the TCP/IP infrastructure of the Internet to select one or more of the other modes supported by the system including remotely controlling the AC and DC electrical power receptacles supported on the base docking station.

Another object of the present invention is to provide an improved electrical power supplying system for supplying electrical power to electrical appliances and/or electronic devices and managing and concealing excess power cords deployed in diverse environments, wherever a multitude of power outlets are required, while overcoming the shortcomings and drawbacks of prior art methods and apparatus.

Another object of the present invention is to provide an improved electrical power supplying system for storing and configuring excess power cord and sharing a multiplicity of AC and DC electrical power supplies in diverse end-user environments.

Another object of the present invention is to provide an improved electrical power supplying system having a power-receptacle supplying structure supporting a plurality of electrical power receptacles for supplying AC and DC electrical power to a plurality of electrical appliances and/or electronic devices, and managing the excess length of power cords associated therewith, in a manner so that excess power cord can be wound up about a power cord spool and concealed behind spaced apart elastomeric structures forming a perimeter power cord opening, and remaining power cord is allowed to exit the perimeter power cord opening at any point about the device, and routed to an appliance or device requiring AC or DC electrical power in the workspace environment being serviced by the portable device.

Another object of the present invention is to provide a novel method of supplying electrical power to a plurality of electrical appliances and/or electronic devices in any environment, using a portable electrical power supplying system, while managing excess power cord therewithin.

Another object of the present invention is to provide an improved electrical power supplying system having dual integrated power cord storage compartments, and externally accessible USB power ports for supplying DC electrical power to USB-powered electronic devices and externally accessible 120 Volt power ports for supplying AC electrical power to 120 Volt electrical appliances.

These and other objects of invention will become apparent hereinafter and in the Claims to Invention appended hereto.

BRIEF DESCRIPTION OF THE DRAWINGS

In order to more fully understand the objects of the present invention, the following detailed description of the illustrative embodiments should be read in conjunction with the accompanying figure Drawings in which:

FIG. 21A is a perspective close-up view of the portable electrical power supplying system of the present invention illustrated in FIGS. 19 and 20, showing its power cord wrapped up neatly about the spool of the external single-decker power cord storage compartment of the device, and its multi-function module supporting (i) a portable battery power storage subsystem, (ii) a portable night-light/illumination subsystem, and (iii) telephone conference subsystem housed in a portable compact module adapted for docking within the module docking receptacle of the module docking housing station of the system, where electrical connections are established between the multi-function module and the module docking station by way of a USB plug-connector interface, and also wireless network connections are established between the multi-function module and the module docking station by way of a Bluetooth-type wireless network interface;

FIG. 24A is a bottom view of the multi-function module removed from the module docking receptacle of the module docking station of the device shown in FIGS. 21A through 22;

FIG. 24B is an elevated side view of the multi-function module removed from the module docking receptacle of the module docking station of the device shown in FIGS. 21A through 22;

FIG. 27 is a schematic representation of the portable electrical power supplying system illustrated in FIG. 27 comprising a subsystem architecture including a multi-core CPU (optionally with a GPU), program memory (RAM), and video memory (VRAM), a solid-state (DRAM) memory for persistent data storage, a LCD/Touch-screen display panel, a micro-phone and a loudspeaker, and WIFI/Bluetooth network adapters integrated with one or more bus architecture supporting controllers and the like;

FIG. 35 is a flow chart describing the steps performed during the method of illuminating an ambient environment under emergency conditions using a multi-function module operated in accordance with the principles of the present invention;

FIG. 41 is a flow chart describing the steps performed during the method of charging a portable DC electrical energy consuming device (e.g. smartphone) using a multi-function module and smartphone arranged in wireless communication therewith and operated in accordance with the principles of the present invention;

DETAILED DESCRIPTION OF THE ILLUSTRATIVE EMBODIMENTS OF THE PRESENT INVENTION

Figure 1A:
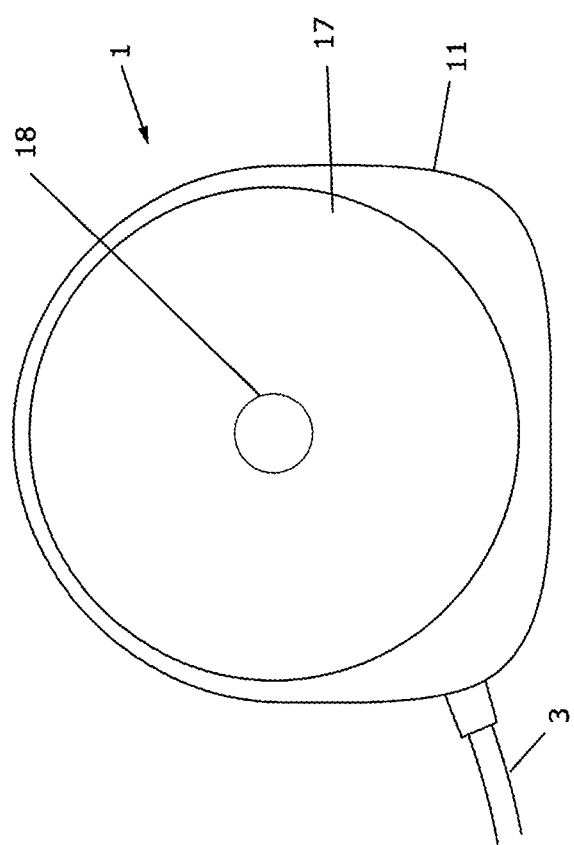
FIG. 1A is an elevated top view of a first illustrative embodiment of the portable electrical power supplying system of the present invention with its extension-type power cord unwound and extended from the housing, and its pair of USB power ports not being used to supply power to any USB-powered electronic devices.

In a first illustrative embodiment of the present invention a new and improved method of and portable apparatus is provided for supplying electrical power to AC and DC electrical-energy consuming appliances and devices, and managing the power cords thereof, while employed in diverse environments, such as workstations, desktops, library tables, cafes, restaurants, and wherever a multitude of electrical power outlets are required or desired by one or more users. This aspect of the present invention is disclosed in Applicant's co-pending application Ser. No. 13/934,606 entitled "Portable Electrical Power Supplying System For Storing And Configuring Excess Power Cord And Sharing A Multiplicity Of AC And DC Electrical Power Supplies In Diverse User Environments" filed on Jul. 3, 2013, incorporated herein by reference and is fully set forth herein.

In the first illustrative embodiment, depicted in FIGS. 1A through 6, the apparatus is realized in the form of a portable (e.g. transportable, mobile, relocateable) electrical power supplying system 1 having a single (i.e. single-decker) external integrated power cord storage compartment 2. This portable device can be supported on or under the desktop, on the floor, or even on a wall-surface, and supplied with electrical power through a flexible power supply cord 3 having a power plug 4 for plugging into a standard 120 Volt power receptacle 5.

In a second illustrative embodiment, depicted in FIGS. 7A through 18B, the apparatus is realized in the form of a portable electrical power supplying system 100 having dual (i.e. double-decker) external integrated power cord storage compartments 102A and 102B. Also, this device can be supported on or under the desktop, on the floor, or even on a wall-surface, and supplied with electrical power through a flexible power supply cord 103, plugged into a standard 120 Volt power receptacle 5 by power plug 104.

In a third illustrative embodiment, depicted in FIGS. 19 through 44, the apparatus is realized in the form of an improved portable electrical power supplying system 145 comprising: a module docking station 157 with a module docking receptacle 156 and base station 150 portion having integrated external power cord storage compartments; and a multi-function module 160 is docked in the module docking receptacle 157 and can be manually removed and used locally as well as at remote locations, in several different functionalities. As will be described in detail hereinafter, the module docking station 157 includes: a base housing portion 150 having a single (i.e. single-decker) external power cord storage compartment 152, 153, with an internal spool about which a power cord 151D can be neatly wrapped up and contained within the external power cord storage compartment, as taught in the first illustrative embodiment shown in FIGS. 1A through 6; and a power receptacle housing portion 155, connected to the base housing portion 150, and supporting the module docking receptacle 157, and containing a plurality of AC power receptacles 114A-114C, one or more USB-type DC power receptacles 115A-115B, and a first USB-based module dock interface 158 mounted in the central bottom portion of the module docking receptacle 157.

These illustrative embodiments of the present invention will now be disclosed and described in greater detail hereinafter.

Figure 1B:
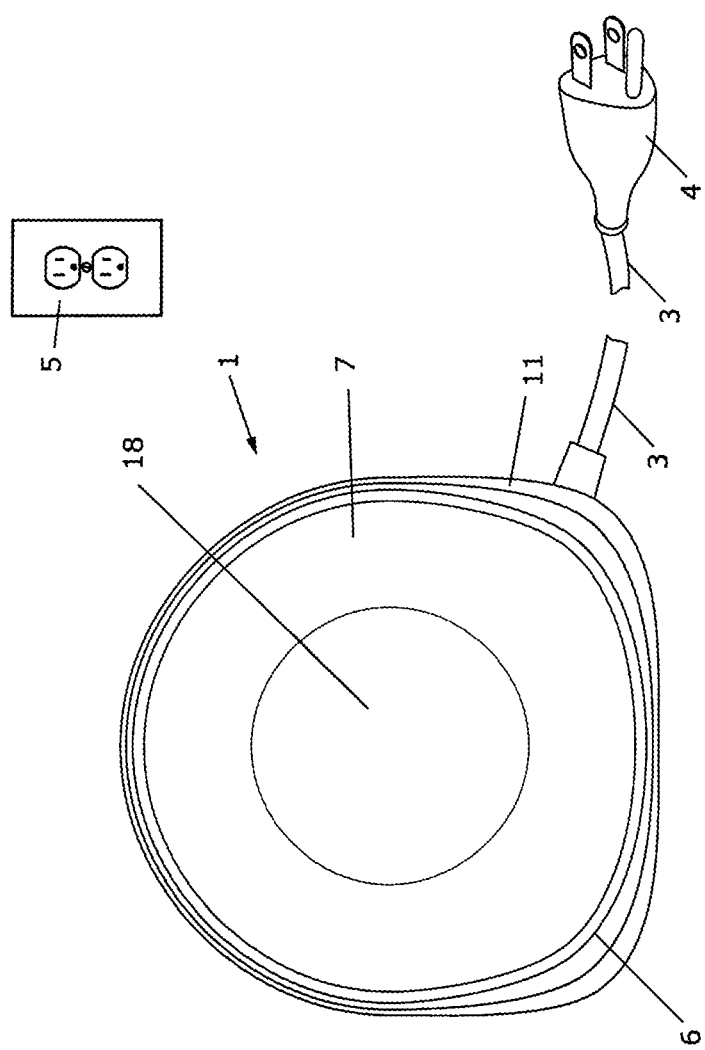
FIG. 1B is an elevated bottom view of the first illustrative embodiment of the portable electrical power supplying system shown in FIG. 1A, with its extension-type power cord unwound and extended from the housing, and its pair of USB power ports not being used to supply power to any USB-powered electronic devices.

The Portable Electrical Power Supplying System According to a First Illustrative Embodiment of the Present Invention In FIGS. 1A and 1B, the portable electrical power supplying system (e.g. device) 1 of the present invention is supported vertically on a surface and is supplied with electrical power through a flexible extension power cord 3 whose electrical plug 4 is plugged in a standard electrical power receptacle 5. As shown, a number of different AC and DC electrical power consuming appliances (e.g. LCD, WIFI power-hub, backup hard-drive, printer, computer CPU, rechargeable phones, rechargeable cameras, portable laptop computers, rechargeable tablets, modems, powered hard drives, powered Bluetooth® speakers etc) can be powered by device the through a plurality of power cords, routed through the environment into the device 1. The device 1 powered up when plugging the device into a 120 Volt AC power outlet, causing the ON-OFF indicator 16, 18 on the housing cover 17 to illuminate.

Figure 2A:
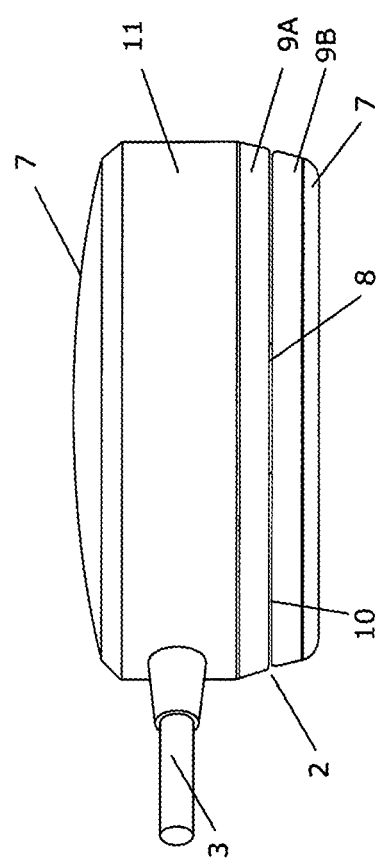
FIG. 2A is an elevated first side view of the first illustrative embodiment of the portable electrical power supplying system shown in FIGS. 1A and 1B, with its extension-type power cord unwound and extended from the housing, and its integrated cord storage compartment not being used to store excess power cord associated with any electrical appliances.
Figure 2B:
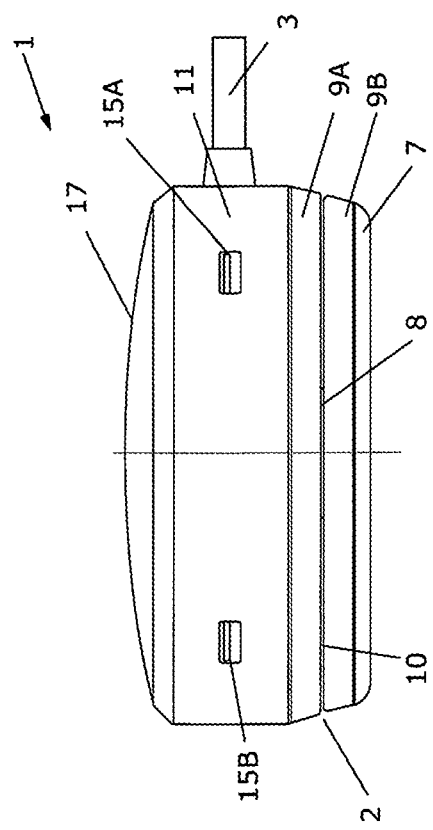
FIG. 2B is an elevated second side view of the first illustrative embodiment of the portable electrical power supplying system shown in FIGS. 1A, 1B and 2A, with its extension-type power cord unwound and extended from the housing, its integrated cord storage compartment not being used to store excess power cord associated with electrical appliances, and its pair of USB power ports not being used to supply power to USB-powered electronic devices.
Figure 2C:
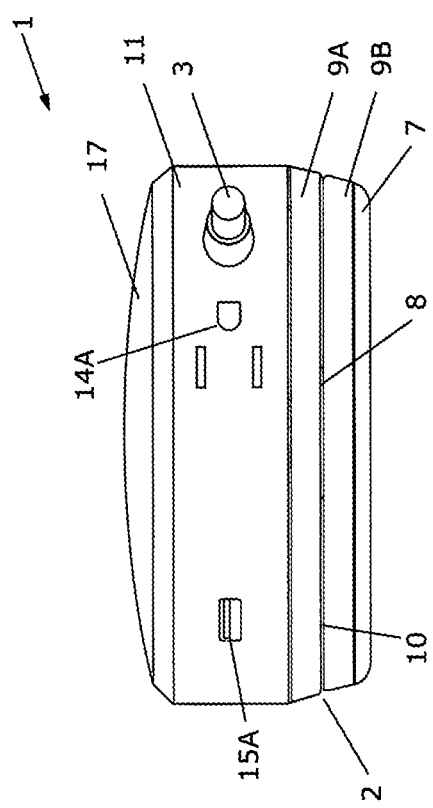
FIG. 2C is an elevated third side view of the first illustrative embodiment of the portable electrical power supplying system shown in FIGS. 1A, 1B, 2A and 2B, with its extension-type power cord unwound and extended from the housing, its single integrated cord storage compartment not being used to store excess power cord associated with electrical appliances, and USB power port and 120 Volt power outlet not being used to supply power to USB-powered devices and 120 Volt-powered devices.
Figure 2D:
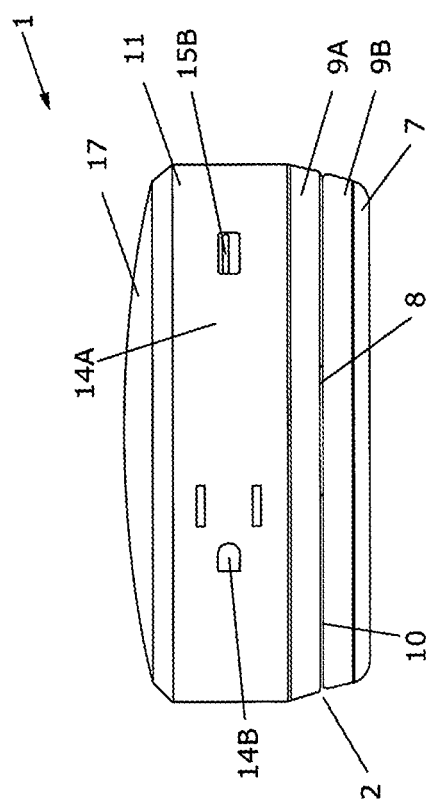
FIG. 2D is an elevated fourth side view of the first illustrative embodiment of the portable electrical power supplying system shown in FIGS. 1A, 1B, 2A, 2B and 2C, with its extension-type power cord unwound and extended from the housing, its single integrated cord storage compartment not being used to store excess power cord associated with electrical appliances, and USB power port and 120 Volt power outlet not being used to supply power to USB-powered devices and 120 Volt-powered devices.

Alternatively, as shown in FIGS. 2A and 2B, the portable electrical power supplying system 1 is shown supported on a horizontal surface (e.g. floor surface), and is supplied with electrical power from an external power receptacle 5. In this configuration as well, the device can supply DC and AC electrical power to diverse electrical power consuming appliances (e.g. LCD, WIFI power-hub, backup hard-drive, printer, computer CPU, rechargeable phones, rechargeable cameras, portable laptop computers, rechargeable tablets, modems, powered hard drives, powered Bluetooth® speakers, etc.) the through a plurality of power cords, routed through the environment into the device 1.

As shown in FIGS. 1A through 2D, the portable electrical power supplying system 1 comprises an assembly of components, namely: a lower housing portion 6 supporting an external elastomeric power cord storage compartment 2 above its bottom end portion 7; a power cord storage spool 8 axially positioned within the device and contained within the power cord storage compartment 2 and surrounded by a pair of spaced-part elastomeric discs 9A and 9B forming a perimeter power cord access opening 10, through which a length of power cord can be pushed when wrapping up excess power cord about its power cord storage spool 8 during excess cord windup operations; an upper housing portion 11 snap-fit connected to the top portion of the lower housing portion 6, and having an interior volume 12 containing a printed circuit (PC) board 13 supplying electrical power to 120 Volt AC electrical power receptacles 14A and 14B, and USB DC electrical power receptacles 15A and 15B, mounted through apertures formed through the side walls 11A of the upper housing portion 11; an LED-based power-on indicator light 16 mounted on the PC board 13; and a cover portion 17 for closing off the interior volume 12 of the upper housing portion with the LED-based power-on indicator light 16, illuminating from behind the centrally disposed translucent logo/badge 18 mounted on the cover portion 17.

Figure 4:
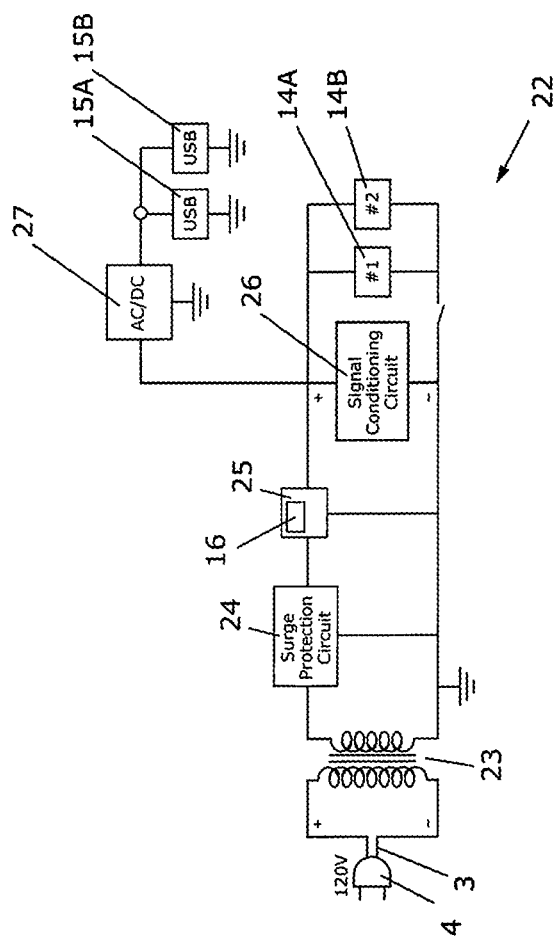
FIG. 4 is a schematic diagram of the electrical and electronic components contained and mounted in the portable electrical power supplying system shown in FIGS. 1A through 3.

Within the upper housing portion 11, the electrical receptacles 14A, 14B and 15A, 15B electronic circuit board 13 are snap-fit mounted into mounting brackets within the interior of the upper housing portion 11 along with electrical wiring connections among electrical and circuit board components, making the necessary interconnections as specified in FIG. 4.

As shown in FIG. 4, the lower portion 6 of the portable device 1 supports a connector 19 to which the electrical power cord 4 of the device is connected. The connector 16 is mounted on a small PC board or like structure 20 is also adapted to snap-fit into a mated connector on the underside of PC board 13 and establish electrical connections, with other electrical/electronic components, as shown in FIG. 4, when the upper and lower housing portions are snap-fitted together during assembly. It is understood, however, that other connection arrangements are possible, and in no way do such interconnection limit the principles of the present invention.

Figure 3:
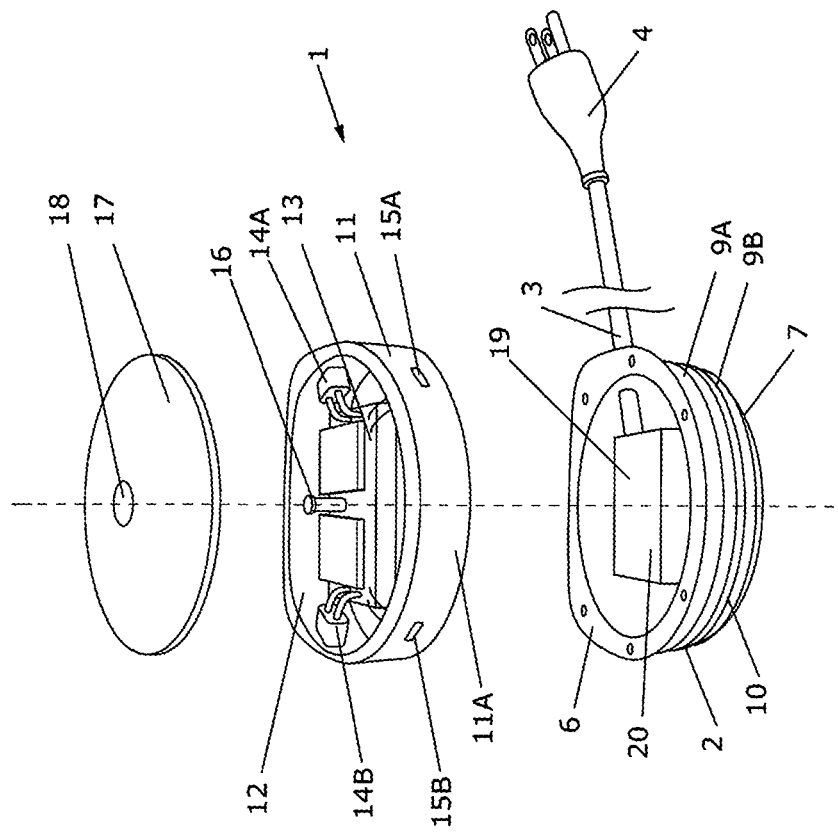
FIG. 3 is an exploded view of the portable electrical power supplying system shown in FIGS. 1A through 2D, comprising a lower housing portion supporting an external elastomeric power cord storage compartment at its bottom end, a power cord storage spool contained within each power cord storage compartment, an upper housing portion having an interior volume containing a printed circuit (PC) board supplying electrical power to 120 Volt and USB electrical power receptacles mounted through apertures formed through the side walls of the upper housing portion, and an LED-based power-on indicator light, and a cover portion for closing off the interior volume of the upper housing portion with the LED-based power-on indicator light illuminating the centrally disposed logo/badge mounted on the cover portion.

As best shown in the exploded diagram of FIG. 3, the lower housing portion 6 of the portable device 1 supports the external power cord storage compartment 2 above its bottom end portion, realized as a disc-like structure 7. The power cord storage spool 8 mounted between the lower housing 6 and bottom plate 7 contained deep, with external power cord storage compartment 6 formed therebetween, is capable of supporting a number of turns of power cord about the spool, while the elastomeric discs 9A and 9B, exert opposing forces against contacting surfaces, to retain the wound power cord in place and prevent power cord from unwinding and spilling out through the perimeter access opening 10 and off its spool 8. Only when the wound-up power cord 3 is pulled from its storage compartment 2 with sufficient force, does the elastomeric cord retention discs 9A, 9B (or functionally equivalent structures) elastically deform and allow excess power cord 3 to be removed from the storage compartment 2 and used in supplying power to its associated appliance at some preselected distance from the device 1. In the preferred embodiment, elastomeric cord retention discs 9A, 9B are configured to press against and exert forces upon each other to substantially close off perimeter access opening 10, and completely conceal excess power cord stored therebetween. At the same time, power cord 3 that is not wound up about its power cord spool 8 and concealed behind the spaced-apart elastomeric structures 9A and 9B, is allowed to exit through opening 10 at any point about the portable device 1, and routed to its respective appliance or device in the workspace being served by the portable device 1. In other alternative embodiments, the elastomeric cord retention discs 9A, 9B can be configured not press against and exert forces upon each but otherwise substantially close off perimeter access opening 10, and conceal excess power cord therebehind, as described above.

Within the upper housing portion 11 of the portable device 1, the 120 Volt AC electrical receptacles 14A, 14B, and USB-type DC power receptacles/ports 15A, 15B, and electronic circuit board 13, are snap-fit mounted into mounting brackets within the interior of the upper housing portion 11. Electrical wiring is used within the interior volume to make electrical connections among the electrical and PC board components, as specified in FIG. 4.

As shown in FIG. 4, the electrical and electronic circuitry 22 contained in the structure 11 of the device housing, comprises: the electrical power cord 3 having power plug 4 and a distal end that plugs into connector formed on PC board 20 in lower housing portion; an isolation-type power transformer 23; surge protection circuitry 24 connected to the output terminals of the isolation transformer 23; ON/OFF indicator circuit 25 provided with a glowing LED ring 16, 18 that indicates the ON state of the device; a signal conditioning circuit 26; multiple 120 Volt AC electrical power receptacles 14A, 14B supplied AC electrical power signals from the signal conditioning circuit 26; and AC/DC converter 27 supplying the USB power ports 15A, 15B with DC electrical power signals.

Figure 5:
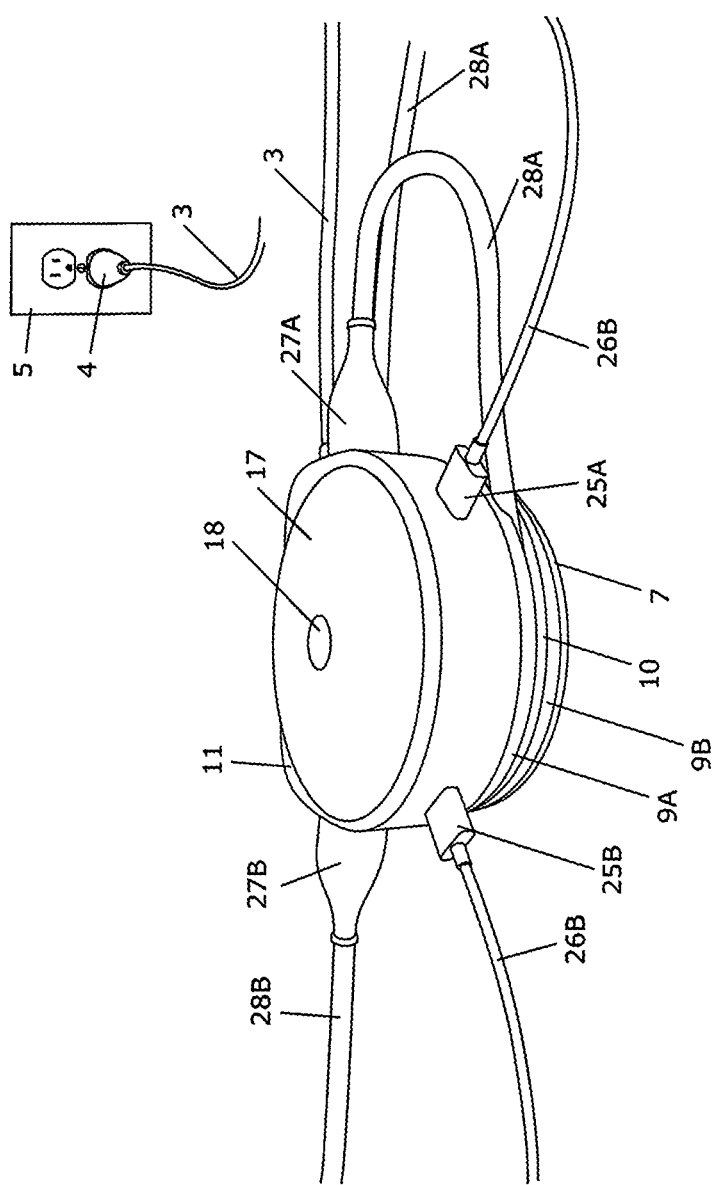
FIG. 5 is a first perspective view of the portable electrical power supplying system of the first illustrative embodiment, shown in FIGS. 1A through 2D, wherein the USB power cables of two electronic devices are plugged into the USB power ports in the upper housing portion, and two electrical appliance plugs are plugged into the two 120 Volt electrical power receptacles mounted in the upper housing portion, and wherein the excess power cord of one of the electrical appliances is wound up about and concealed within the external dual (i.e. double-decker) type power cord storage compartment disposed between the upper housing portion and the base portion of the device.
Figure 6:
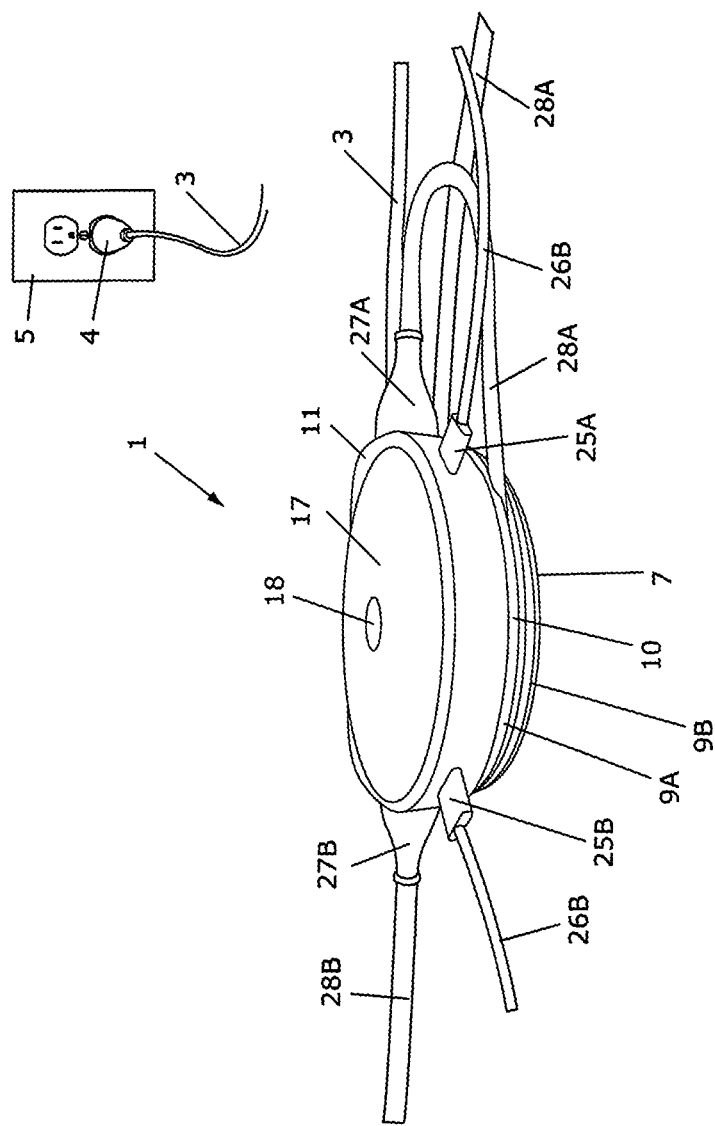
FIG. 6 is a second perspective view of the view of the portable electrical power supplying system configured as shown in FIG. 5.

FIGS. 5 and 6 show the portable electrical power supplying system of FIGS. 1A through 2D, being used in only one of its many use configurations. In particular, the USB power plugs 25 and cords/cables 26 of two electronic devices are plugged into the USB power ports 15A, 15B in the upper housing portion 11, and two electrical appliance plugs 27 and cords/cables 28 of electronic appliances are plugged into the two 120 Volt electrical power receptacles 14A, 14B mounted in the upper housing portion 11. As shown, the excess power cord of one of the electrical appliances is wound up about and concealed within the external power cord compartment 2 disposed between the upper housing portion 11 and the base portion 7 of the device.

The portable electrical power supplying system of the present invention 1 can be used on any horizontal surface at which one or more users might sit, and on which might be supported a one or more laptop computers, USB-powered iPad appliances and mobile phones etc, each of which can share electrical power from the single electrical power supplying system shown in FIGS. 1A through 4, with power cords wound in a configuration about the storage spool of the external power cord storage compartment of the device. This surface could be the surface of a library desk, a table at a coffee shop, a desktop surface at home or in the office, a deli-counter, a mechanics workbench, or any horizontal surface where two or more people could work, entertain or play together.

Figure 7:
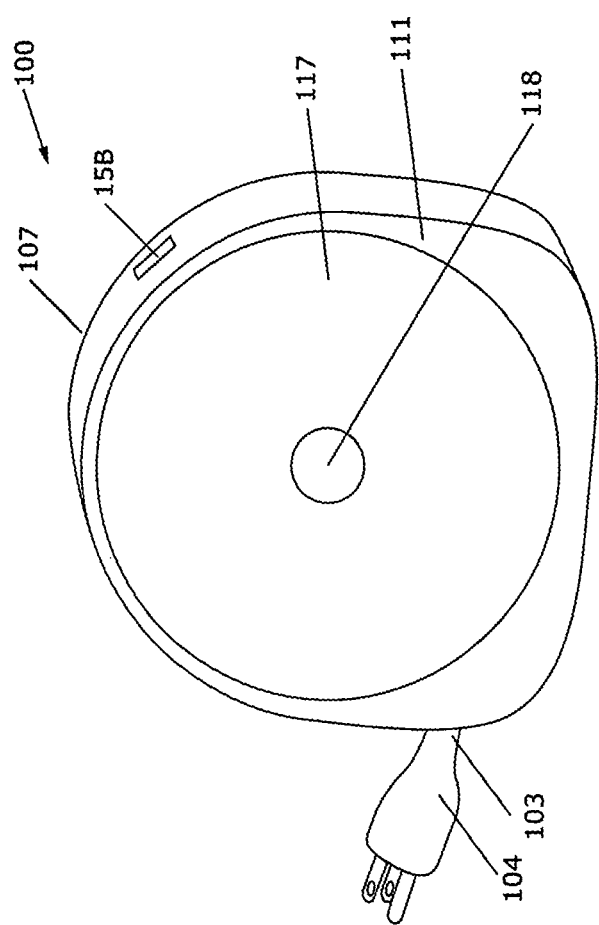
FIG. 7 is a first perspective view of the second illustrative embodiment of the portable electrical power supplying system of the present invention with its extension-type power cord wound up and un-extended from the housing.
Figure 8:
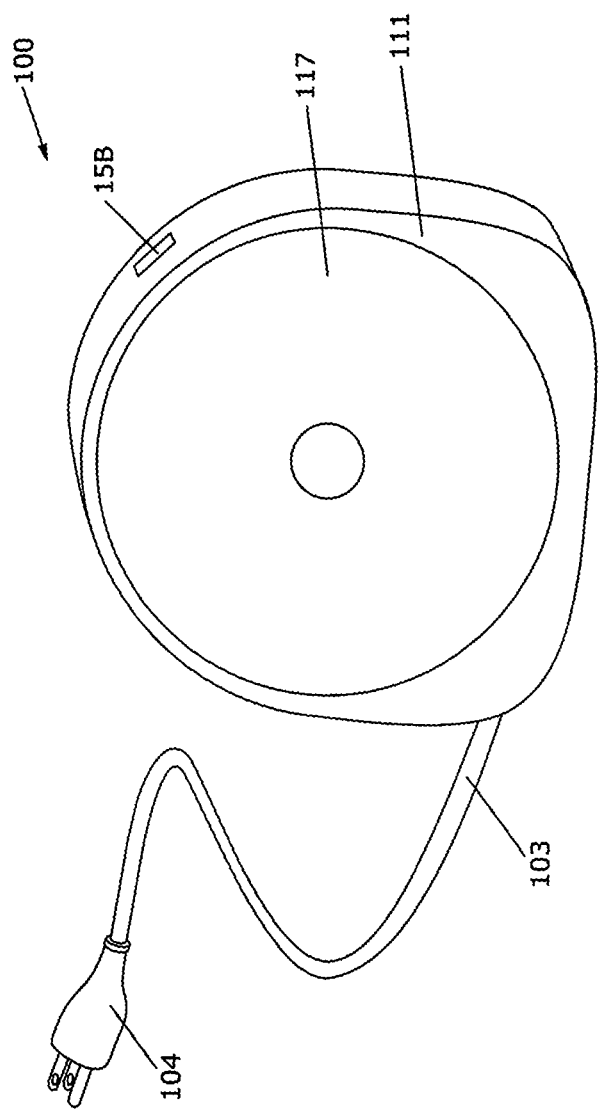
FIG. 8 is a second perspective view of the second illustrative embodiment of the portable electrical power supplying system shown in FIG. 7, with its extension-type power cord unwound and extended from the housing.

The Portable Electrical Power Supplying System According to a Second Illustrative Embodiment of the Present Invention In FIGS. 7 through 8, the portable electrical power supplying system 100 of the present invention is supported vertically on a surface and is supplied with electrical power through a flexible extension power cord 103 whose electrical plug 104 is plugged in a standard electrical power receptacle 5. As shown, a number of different AC and/or DC electrical power consuming appliances and devices (e.g. LCD, WIFI power-hub, backup hard-drive, printer, computer CPU, rechargeable phones, rechargeable cameras, portable laptop computers, rechargeable tablets, modems, powered hard drives, powered Bluetooth® speakers) can be powered by the device the through a plurality of power cords, routed through the environment into the device 100. The device 100 powered up when plugging the device into a 120 Volt AC power outlet, causing the ON-OFF indicator 116, 118 on the housing cover 111 to illuminate.

Figure 9A:
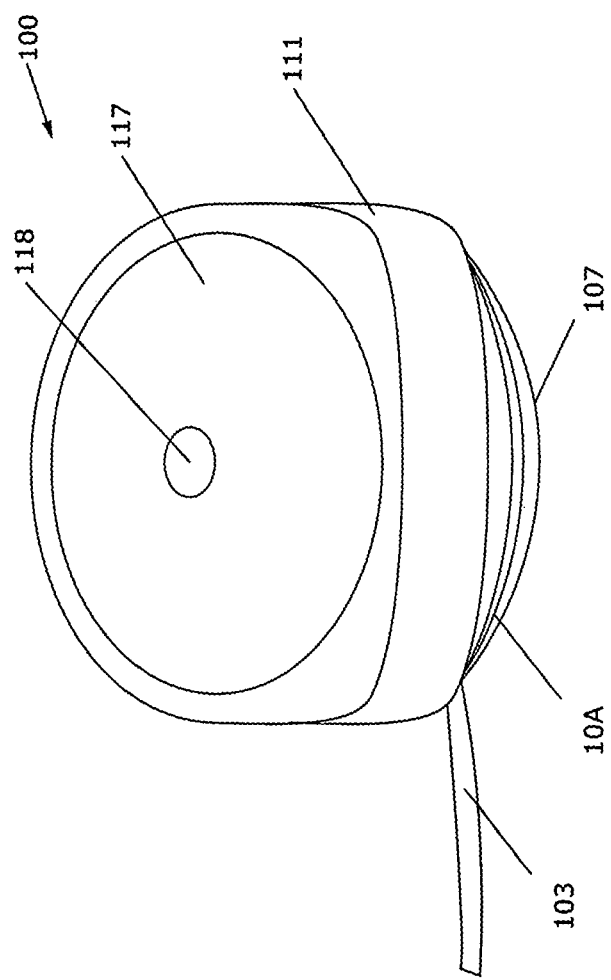
FIG. 9A is a perspective view of the second illustrative embodiment of the portable electrical power supplying system shown in FIGS. 7 and 8 with its extension-type power cord unwound and extended from the housing, its dual integrated cord storage compartments not being used to store excess power cord associated with any electrical appliances, and its USB power ports and 120 Volt power outlets not being used to supply power to any electrical appliances or electronic devices.
Figure 9B:
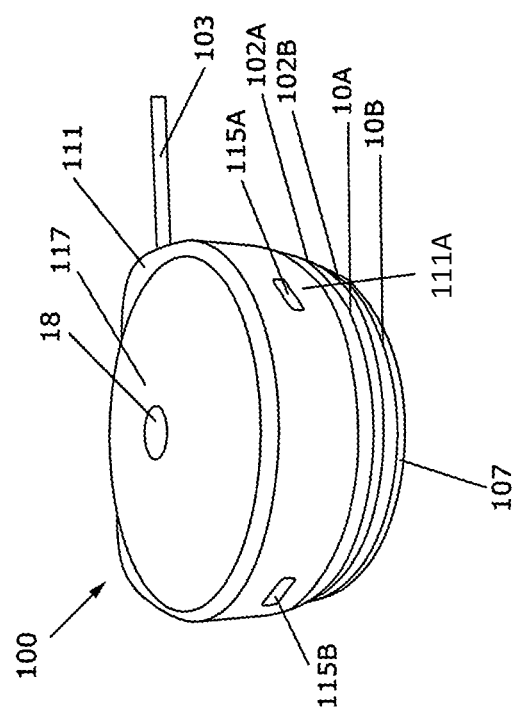
FIG. 9B is a perspective view of the second illustrative embodiment of the portable electrical power supplying system of FIGS. 7 and 8 showing its USB-power ports, and with its extension-type power cord unwound and extended from the housing, its dual integrated cord storage compartments not being used to store excess power cord associated with electrical appliances, and its USB power ports and 120 Volt power outlets not being used to supply power to any electrical appliances or electronic devices.
Figure 9C:
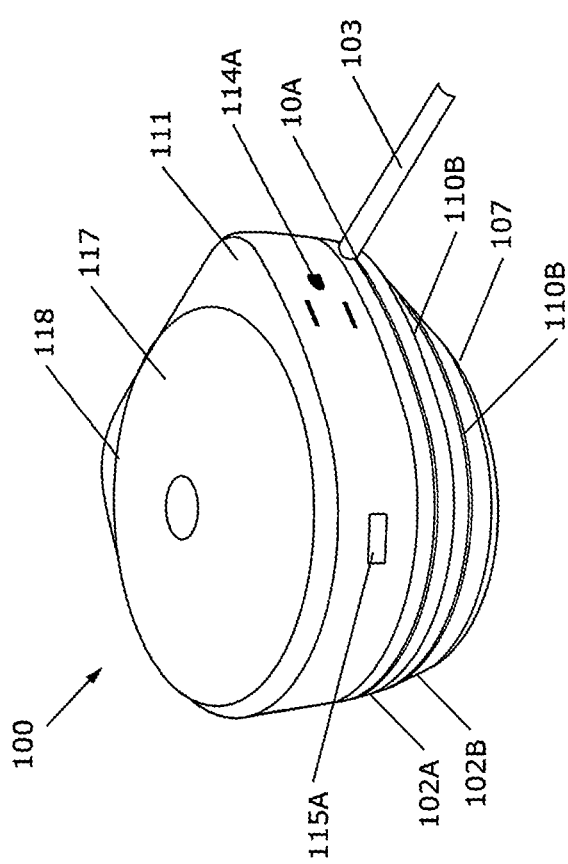
FIG. 9C is a perspective view of the second illustrative embodiment of the portable electrical power supplying system of FIGS. 7 and 8, showing a USB-power port and 120 Volt power port, and with its extension-type power cord unwound and extended from the housing, its dual integrated cord storage compartments not being used to store excess power cord associated with electrical appliances, and its USB power ports and 120 Volt power outlets not being used to supply power to any electrical appliances or electronic devices.
Figure 10:
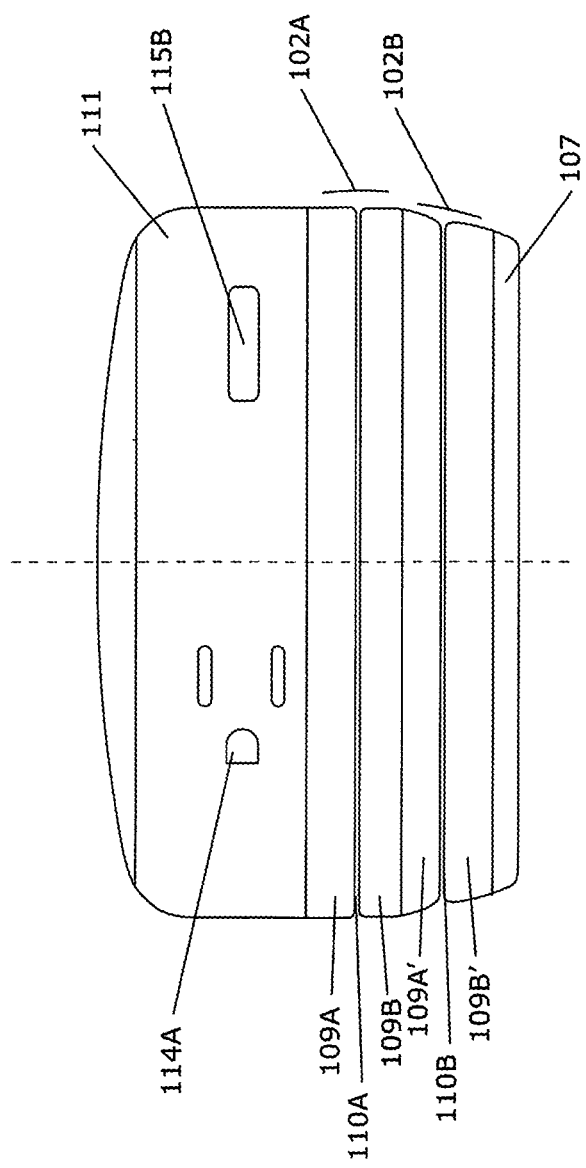
FIG. 10 is an elevated side view of the second illustrative embodiment of the portable electrical power supplying system of FIGS. 7 and 8, showing a USB-power port and 120 Volt power port, and its dual integrated cord storage compartments not being used to store excess power cord associated with electrical appliances.

Alternatively, as shown in FIGS. 9A and 9B, the portable electrical power supplying system 100 is shown supported on a horizontal surface (e.g. floor surface), and is supplied with electrical power from an external power receptacle 5. In this configuration as well, the device can supply DC and AC electrical power to diverse electrical power consuming appliances (e.g. LCD, WIFI power-hub, backup hard-drive, printer, and computer CPU) through a plurality of power cords, routed through the environment into the device 100.

As shown in FIGS. 7 through 12, the portable electrical power supplying system 100 comprises an assembly of components, namely: a lower housing portion 106 supporting a set of dual external elastomeric power cord storage compartments 102A and 102B located between upper housing portion 111 and disc-like bottom end portion 107; a first power cord storage spool 108A axially positioned within first power cord storage compartment 102A and surrounded by a first pair of spaced-part elastomeric discs 109A and 109B forming a first perimeter power cord access opening 110A, through which a length of power cord can be pushed when wrapping up excess power cord about the first power cord storage spool 108A during excess cord windup operations; a second power cord storage spool 108A axially positioned within second power cord storage compartment 102A and surrounded by a second pair of spaced-part elastomeric discs 109A and 109B forming a second perimeter power cord access opening 110A, through which a length of power cord can be pushed when wrapping up excess power cord about the second power cord storage spool 108A during excess cord windup operations; an upper housing portion 111, snap-fit connected to the top portion of the lower housing portion 106, and having an interior volume 112 containing a printed circuit (PC) board 113 supplying electrical power to 120 Volt AC electrical power receptacles 114A, 114B and USB-type DC electrical power receptacles 115A, 115B, mounted through apertures formed through the side walls 111A of the upper housing portion 111; and an LED-based power-on indicator light 116 mounted on the PC board 113; a cover portion 117 for closing off the interior volume 112 of the upper housing portion 111; and LED-based power-on indicator light 116 illuminating from behind the centrally disposed translucent logo/badge 118 mounted on the cover portion 117.

Within the upper housing portion 111 of the portable device 100, the 120 Volt electrical receptacles 114A, 114B and USB power ports 115A, 115B and electronic circuit board 113 are snap-fit mounted into mounting brackets within the interior of the upper housing portion 111. Electrical wiring is used within the interior volume to make electrical connections among the electrical and PC board components, as specified in FIG. 12.

Figure 11:
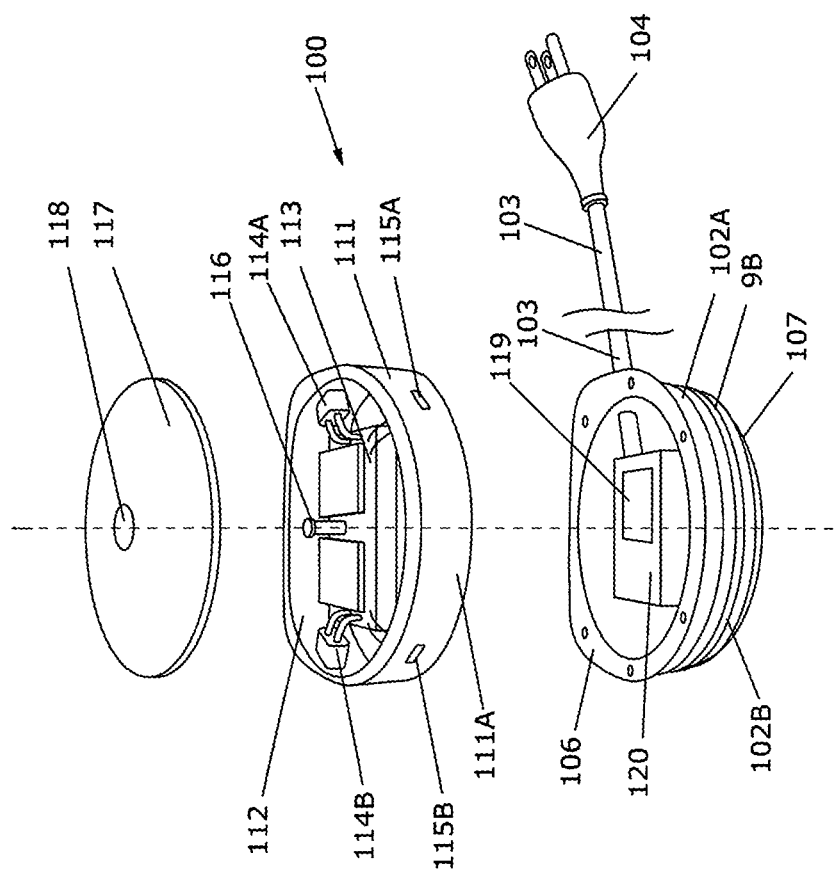
FIG. 11 is an exploded view of the portable electrical power supplying system shown in FIGS. 7 through 10, comprising a lower housing portion supporting a set of dual external elastomeric power cord storage compartments above its bottom end, a power cord storage spool contained within each power cord storage compartment, an upper housing portion having an interior volume containing a printed circuit (PC) board supplying electrical power to 120 Volt AC electrical receptacles and USB-type DC electrical power ports mounted through apertures formed through the side walls of the upper housing portion, and a cover portion for closing off the interior volume of the upper housing portion with a LED-based power-on indicator light illuminating the centrally disposed logo/badge mounted on the cover portion.
Figure 12:
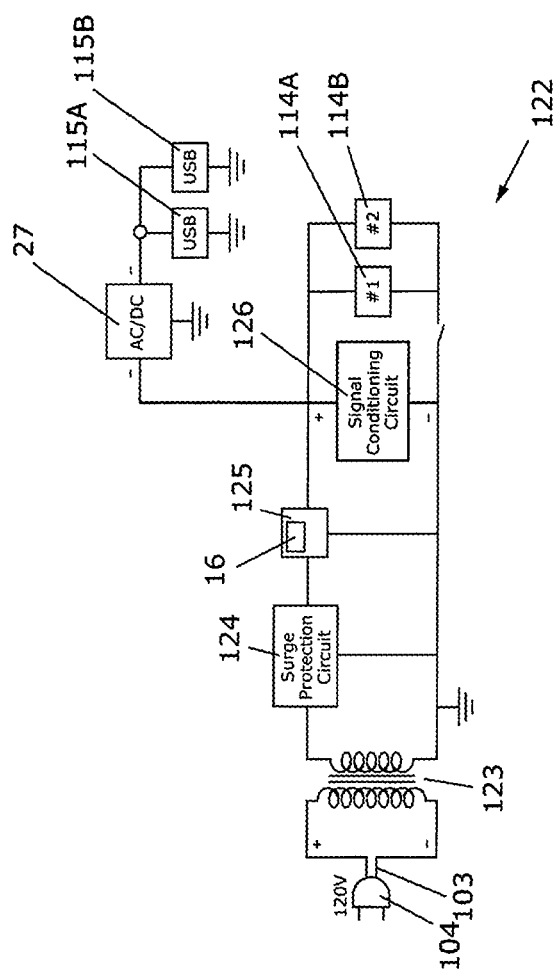
FIG. 12 is a schematic diagram of the electrical and electronic components contained and mounted in the portable electrical power supplying system shown in FIGS. 7 through 11.

As shown in FIG. 11, the lower portion 106 of the portable device 100 supports a connector 119 to which the electrical power cord 103 of the device is connected. The connector 119 is supported on a small PC board or like structure 120, is also adapted to snap-fit into a mated connector on the underside of PC board 113 and establish electrical connections, with other electrical/electronic components, as shown in FIG. 11, when the upper and lower housing portions 111 and 106 are snap-fitted together during assembly. It is understood, however, that other connection arrangements are possible, and in no way do such interconnection limit the principles of the present invention.

As best shown in the exploded diagram of FIG. 11, the lower housing portion 106 supports the set of dual external elastomeric power cord storage compartments 102A and 102B above its disc-like bottom end portion 107. Within the first external power cord storage compartment 102A, a first power cord storage spool 108A is contained deep therein with a first pair of elastomeric discs 109A and 109B mounted at the perimeter of the storage compartment 102A to retain the wound power cord in place and prevent power cord from unwinding and spilling out through the access opening 110A and off its spool 108A. Also, within the second external power cord storage compartment 102B, a second power cord storage spool 108B is contained deep therein with a second pair of elastomeric discs 109A' and 109B' mounted at the perimeter of the storage compartment 102B to retain the wound power cord in place and prevent power cord from unwinding and spilling out through the access opening 110B and off its spool 108B. Only when the wound-up power cord is pulled from its storage compartment with sufficient force, does the cord retention discs 109A, 109B (109A', 109B'), or functionally equivalent structures, elastically deform and allow excess power cord to be removed from the storage compartment and used in supplying power to its associated appliance at some preselected distance from the device 100. In the preferred embodiment, elastomeric cord retention discs 109A, 109B (109A', 109B') in each power cord storage compartment 102A, 102B are configured to press against and exert forces upon each other to substantially close off perimeter access opening 110A, 110B, and completely conceal excess power cord stored therebetween. At the same time, power cord 103 that is not wound up about its power cord spool 108A, 108B and concealed behind the spaced-apart elastomeric structures 109A and 109B (109A', 109B'), is allowed to exit through opening 110A, 110B at any point about the portable device 100, and routed to its respective appliance or device in the workspace being served by the portable device 100. In other alternative embodiments, the elastomeric cord retention discs 9A, 9B can be configured not press against and exert forces upon each but otherwise substantially close off perimeter access opening 110, and conceal excess power cord therebehind, as described above.

Within the upper housing portion 111, the electrical receptacles 114A 115B, 115A, 115B and electronic circuit board 113 are snap-fit mounted into mounting brackets within the interior of the upper housing portion 111 along with electrical wiring connections among electrical and circuit board components, making the necessary interconnections as specified in FIG. 11.

As shown in FIG. 11, the electrical and electronic circuitry 122 contained in the upper housing structure 111 of the device housing, comprises: the electrical power cord 103 having power plug 104 and a distal end that plugs into connector 119 formed on PC board 120 in the lower housing portion 106; an isolation-type power transformer 123, surge protection circuitry 124 connected to the output terminals of the isolation transformer 123; ON/OFF indicator circuit 125 provided with a glowing LED ring 116, 118 that indicates the ON state of the device; a signal conditioning circuit 126; multiple 120 Volt AC electrical power receptacles 114A, 114B supplied with AC power signals from the signal conditioning circuit 126; and AC/DC converter 127 supplying the USB-type DC power ports 115A, 115B with DC electrical power signals.

Figure 13:
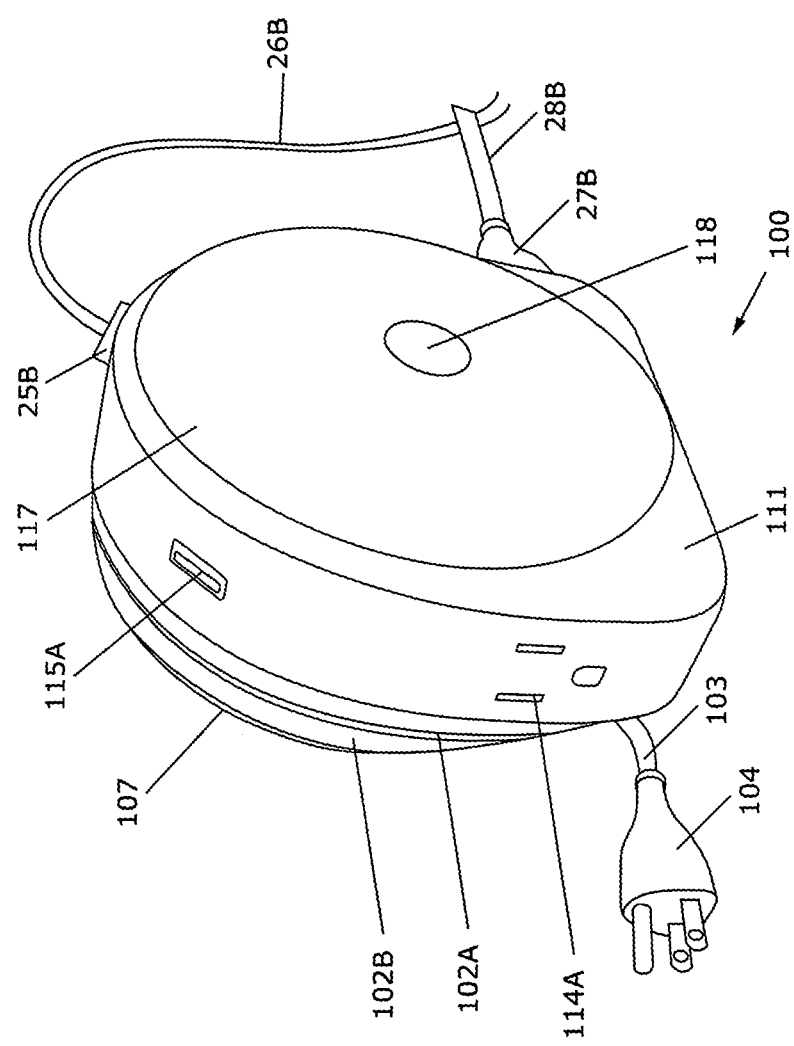
FIG. 13 is a perspective view of the portable electrical power supplying system of the second illustrative embodiment, shown in FIGS. 7 through 12, wherein the USB power cable of one electronic device is plugged into one of the USB power ports in the upper housing portion, and one electrical appliance plug is plugged into one of the 120 Volt electrical power receptacles mounted in the upper housing portion, and wherein the excess power cord of the power extension cord is wound up about and concealed within the upper external power cord compartment disposed between the upper housing portion and the base portion of the device.
Figure 14A:
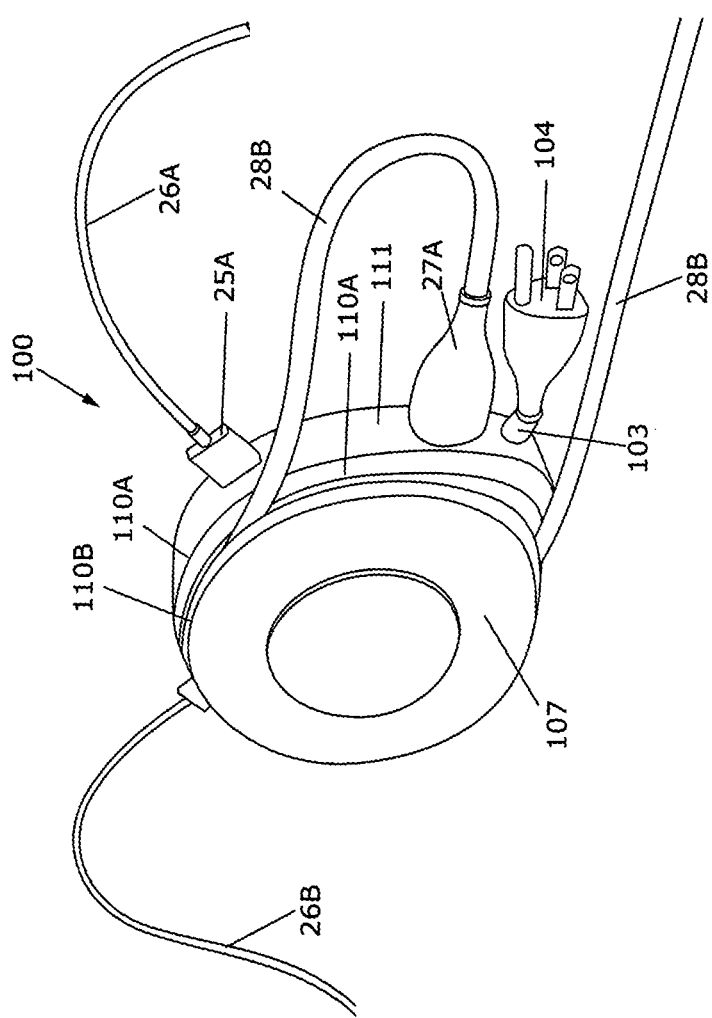
FIG. 14A is a perspective view of the portable electrical power supplying system of the second illustrative embodiment, shown in FIGS. 7 through 12, wherein the device is vertically mounted on its flat side, wherein the USB power cables of two electronic devices are plugged into the paid of USB power ports in the upper housing portion, and two electrical appliance plugs are plugged into the pair of 120 Volt electrical power receptacles mounted in the upper housing portion, and wherein the excess power cord of the power extension cord is wound up about and concealed within the first external power cord compartment disposed between the upper housing portion and the base portion of the device, and one of the appliance power cords is partially wound up about the second external power cord storage compartment and directed to its associated electrical appliance.
Figure 14B:
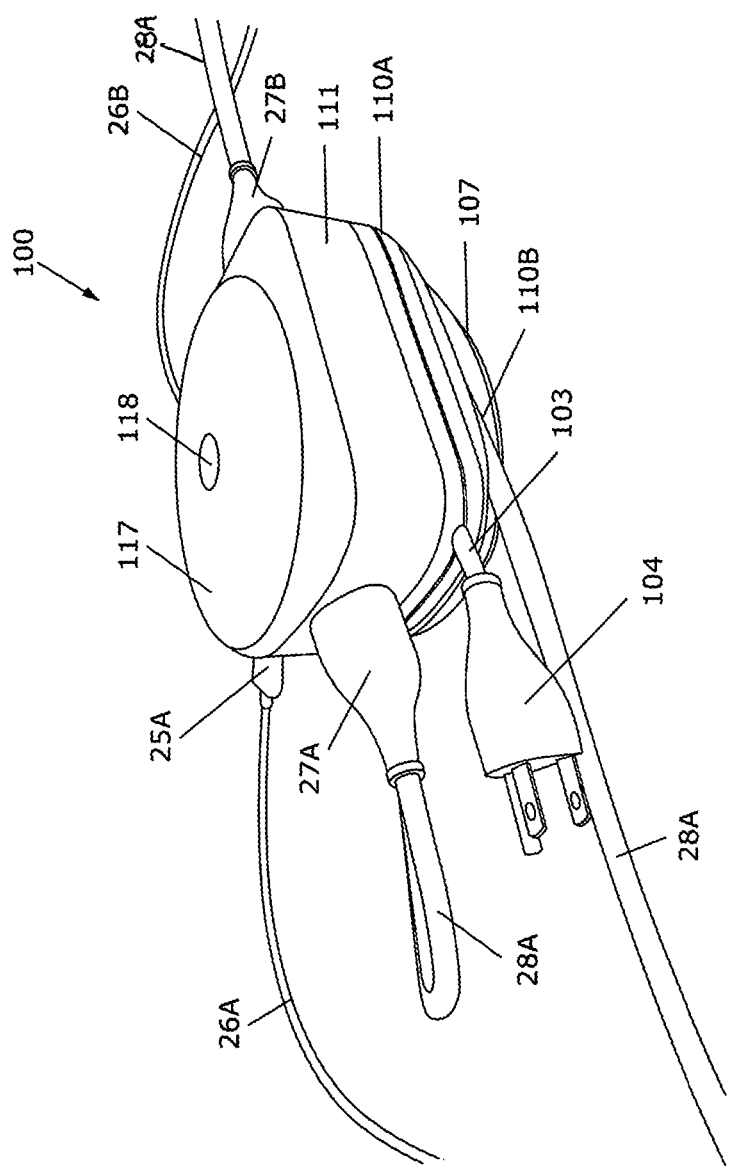
FIG. 14B is a perspective view of the portable electrical power supplying system of the second illustrative embodiment, shown in FIGS. 7 through 12, wherein the device is horizontally mounted in its base portion, wherein the USB power cables of two electronic devices are plugged into the paid of USB power ports in the upper housing portion, and two electrical appliance plugs are plugged into the pair of 120 Volt electrical power receptacles mounted in the upper housing portion, and wherein the excess power cord of the power extension cord is wound up about and concealed within the first external power cord compartment disposed between the upper housing portion and the base portion of the device, and one of the appliance power cords is partially wound up about the second external power cord storage compartment and directed to its associated electrical appliance.
Figure 14C:
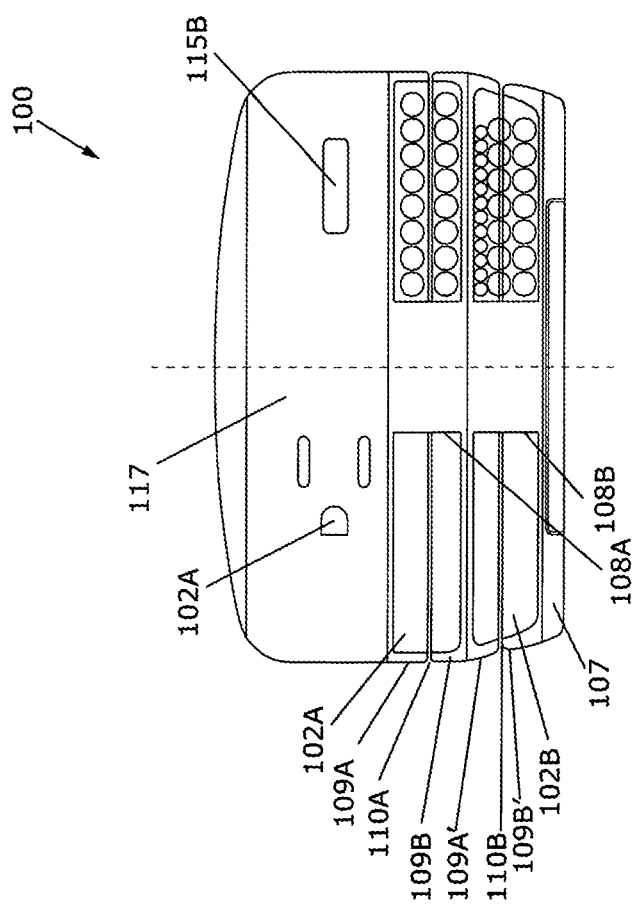
FIG. 14C is an elevated partially cross-sectional view of the portable electrical power supplying system of the second illustrative embodiment of FIGS. 14A and 14B, showing dual power cord storage compartments in cross-sectional view, and the cables that are wound up and stored therein.
Figure 15:
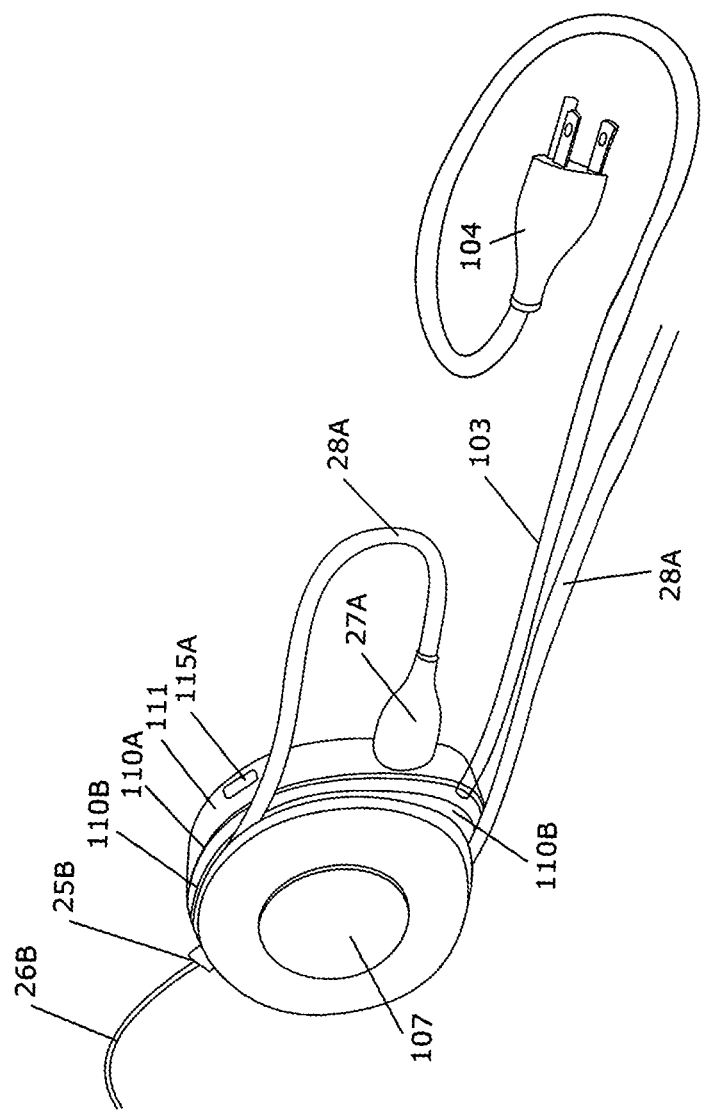
FIG. 15 is a perspective view of the portable electrical power supplying system of the second illustrative embodiment, shown in FIGS. 7A through 12, wherein the device is vertically mounted on its flat side portion, wherein one USB power cable of one electronic device is plugged into one of USB power ports in the upper housing portion, and one electrical appliance plug is plugged into one of 120 Volt electrical power receptacles mounted in the upper housing portion, and wherein the power extension cord is unwound and released from within the first external power cord compartment, and one of the appliance power cords is partially wound up about the second external power cord storage compartment and directed to its associated electrical appliance.

In FIGS. 13 through 15, a number of use cases are illustrated for the portable electrical power supplying systems of the present invention 100.

As shown in FIG. 13, the USB power port 115B of the portable electrical power supplying system 100 is used to supply DC power signals to one electronic device, while a 120 Volt electrical power receptacle 114B of the portable electrical power supplying system 100 is used to supply AC electrical power signals to one or more electrical appliances. As shown, the excess length of the power extension cord 103 is wound up about and concealed within the upper external power cord compartment 102B disposed between the upper housing portion 111 and the base portion 107 of the device.

As shown in FIGS. 14A and 14B, the USB power ports 115A, 115B of the portable electrical power supplying system 100 are used to supply DC power signals to a pair of electronic devices via USB plugs 25 and cords 26, and the pair of 120 Volt electrical power receptacles 114A, 114B of the portable electrical power supplying system 100 provide AC electrical power to a pair of electronic appliances via AC power plug 27 and cord 28. As shown, the excess power cord of the extension power extension cord 103 is wound up about and concealed within the first external power cord compartment 102A disposed between the upper housing portion and the base portion of the device, and one of the appliance power cords 28B is partially wound up about the second external power cord storage compartment 102B and directed to its associated electrical appliance. FIG. 14C shows the power cords wound up about the power cord spools 108A and 108B within the dual power cord storage compartments 102A and 102B, respectively. Note that even excess USB power cord can be wound up around the power cord spools.

As shown in FIG. 15, one of the USB power ports 115B of the portable electrical power supplying system 100 is used to supply DC power signals to an electronic devices, while the pair of 120 Volt electrical power receptacles 114A, 114B of the portable electrical power supplying system 100 provide AC electrical power to a pair of electronic appliances via respective AC power plug 27A and cord 28A. As shown, the power extension cord 103 is unwound and released from within the first external power cord compartment 102A, but is not plugged into an AC power receptacle 5. Also, any of the appliance power cords can be partially wound up about the second external power cord storage compartment 102B and directed to its associated electrical appliance or electronic device, as required.

Figure 16A:
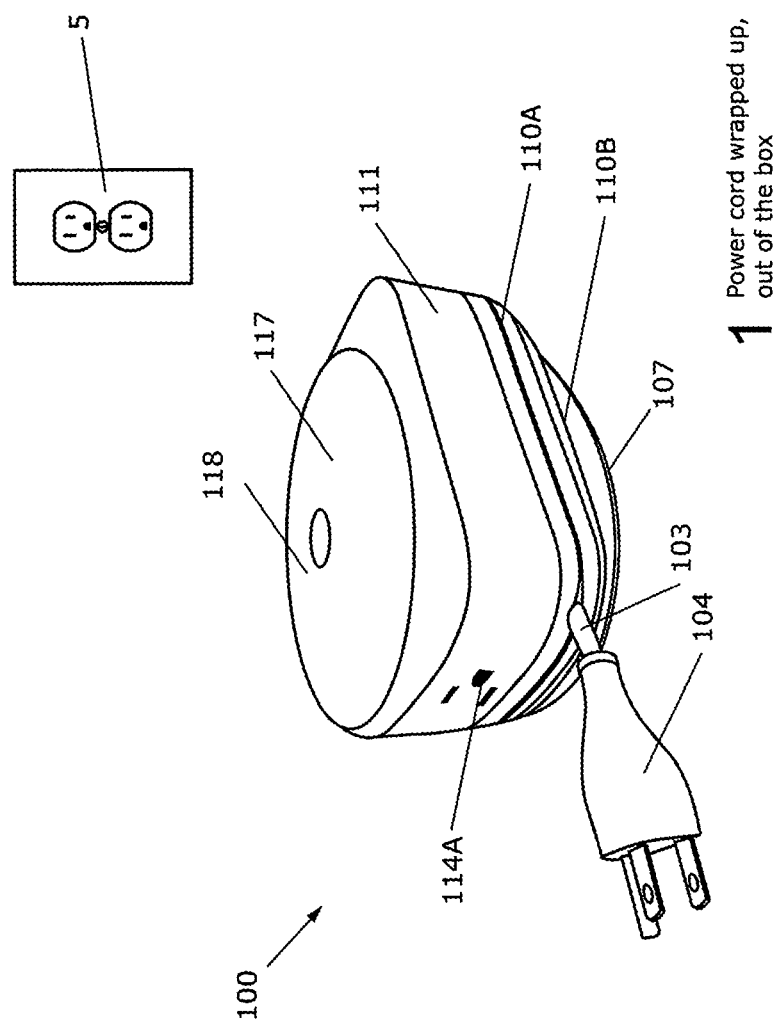
FIG. 16A is perspective view of the portable electrical power supplying system of the second illustrative embodiment, shown in FIGS. 7 through 12, illustrating that during the first step taken when using the device to supply power to electrical appliances, the power extension cord is wound up and concealed within the first external power cord storage compartment.
Figure 16B:
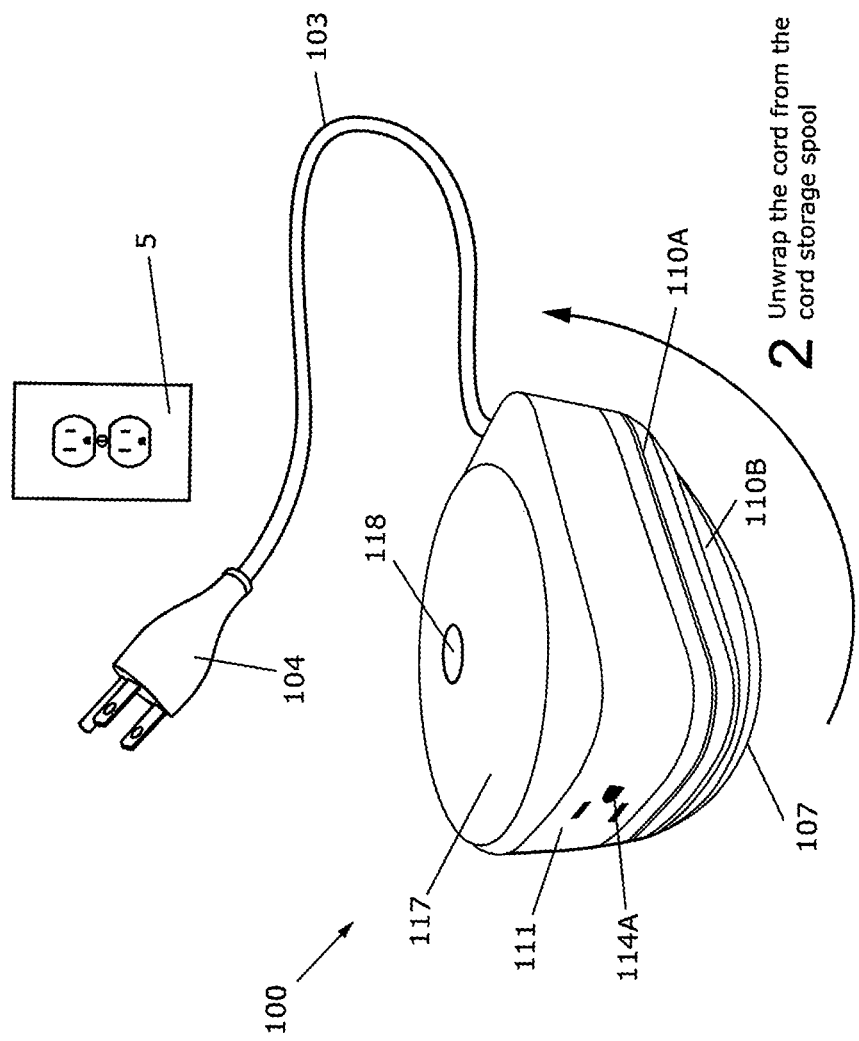
FIG. 16B is perspective view of the portable electrical power supplying system of the second illustrative embodiment, shown in FIGS. 7 through 12, illustrating that the second step of the method involves unwrapping the power extension cord from the external cord storage compartment.
Figure 16C:
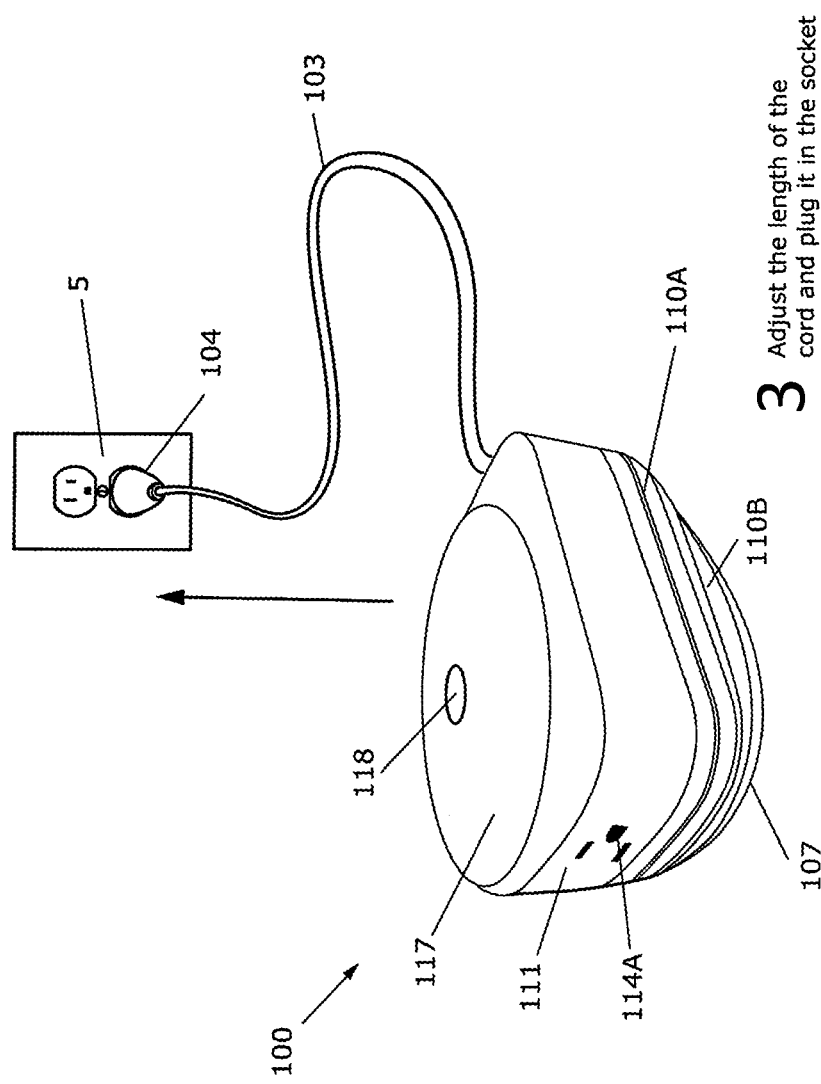
FIG. 16C is perspective view of the portable electrical power supplying system of the second illustrative embodiment, shown in FIGS. 7 through 12, illustrating that the second step of the method involves adjusting the length of the power extension cord of the device, by wrapping it around the spool within the external power cord storage compartment and then plugging its power cord into a 120 Volt wall-mounted electrical power receptacle.

In the FIGS. 16A through 16C, the primary steps are described for a method of using the portable electrical power supplying system 100 of the present invention.

As shown in FIG. 16A, the first involves procuring the portable device 100, wherein its the power extension cord 103 is wound up and concealed within the first external power cord storage compartment 102A thereof.

As shown in FIG. 16B, the second step involves unwrapping the power extension cord 103 from the external cord storage compartment 102A of the portable device 100.

As shown in FIG. 16C, the third step of the method involves adjusting the length of the power extension cord 103 of the portable device 100, by wrapping it around the spool 108A within the external power cord storage compartment 102A and then plugging its power cord into a 120 Volt wall-mounted electrical power receptacle 5.

Figure 16D:
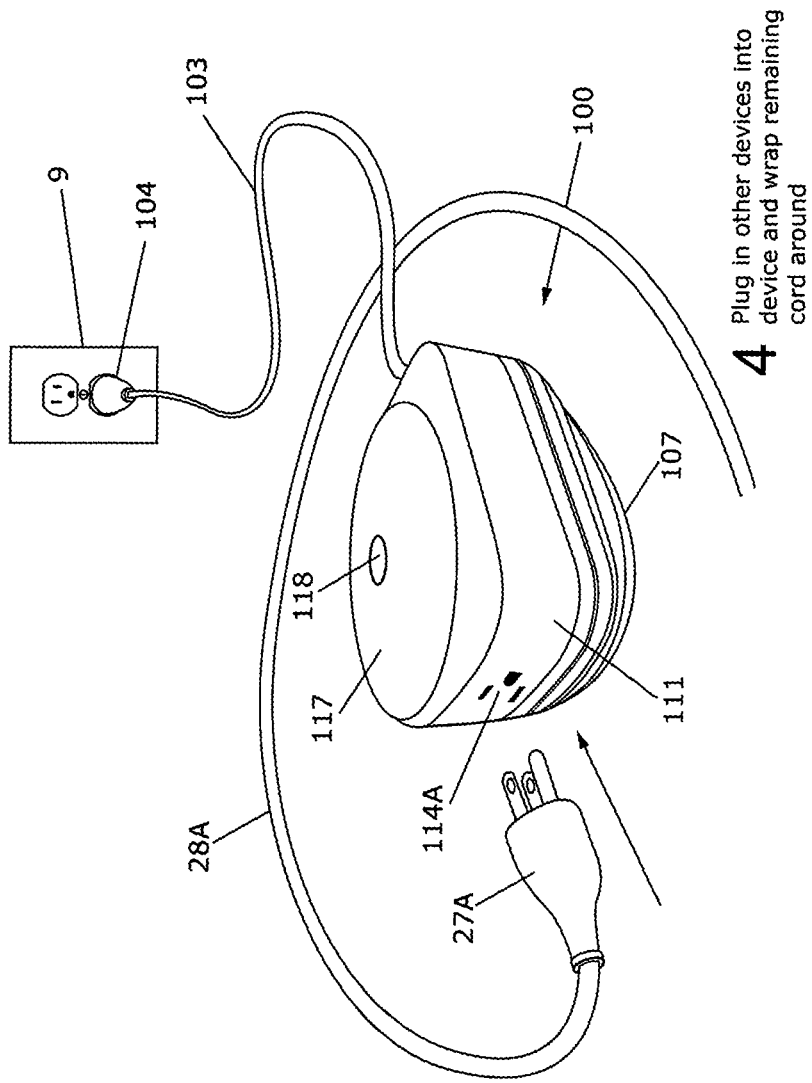
FIG. 16D is perspective view of the portable electrical power supplying system of the second illustrative embodiment, shown in FIGS. 7 through 12, illustrating that the second step of the method involves plugging USB-powered and/or 120 Volt powered appliances and devices into the USB-power and/or 120 Volt power receptacles provided on the device of the present invention, and wrapping any excess cord about the opening in the external power cord storage compartments.

As shown in FIG. 16D, the fourth step of the method involves plugging the AC power plug 27A and cord 28A from a 120 Volt powered appliance into one of the 120 Volt power receptacles 114A, 114B provided on the portable device of the present invention, and wrapping any excess length of cord about the opening in the second external power cord storage compartment 102B. A USB-power plug 25A and cord 26A can also be plugged into a USB power port 115A, 115B.

Figure 16E:
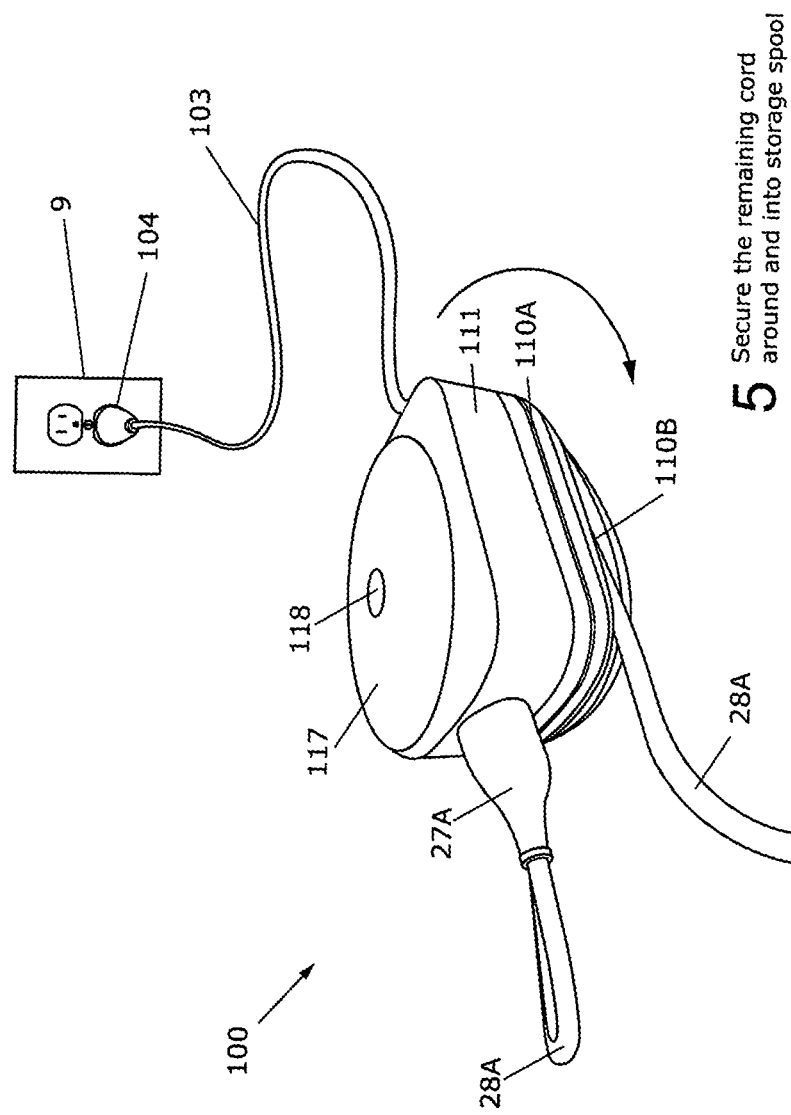
FIG. 16E is perspective view of the portable electrical power supplying system of the second illustrative embodiment, shown in FIGS. 7 through 12, illustrating that the second step of the method involves securing any remaining power cord length about the storage spool within one of the power cord storage compartment.

As shown in FIG. 16E, the fifth step of the method involves securing any remaining power cord length about the storage spool within one of the power cord storage compartments 102A and 102B.

Figure 16F:
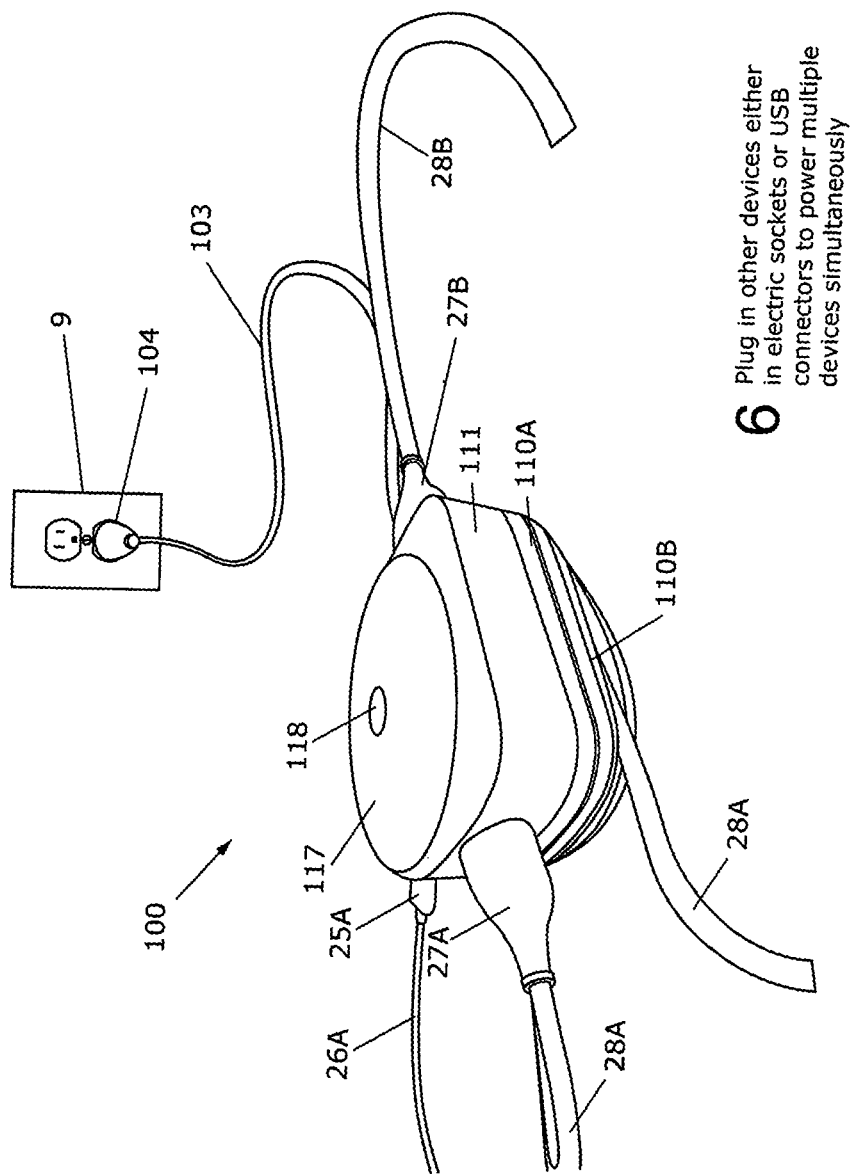
FIG. 16F is perspective view of the portable electrical power supplying system of the second illustrative embodiment, shown in FIGS. 7 through 12, illustrating that the sixth step of the method involves plugging in other appliances into the USB-power or 120 Volt power receptacles, and wrapping excess cord about the cord storage spools within the external cord storage compartments.

As shown in FIG. 16F, the sixth step of the method involves plugging in other appliances into the USB-power or 120 Volt power receptacles, and wrapping excess cord about the cord storage spools 108A, 108B within the external cord storage compartments 102A, 102B, respectively.

Figure 17:
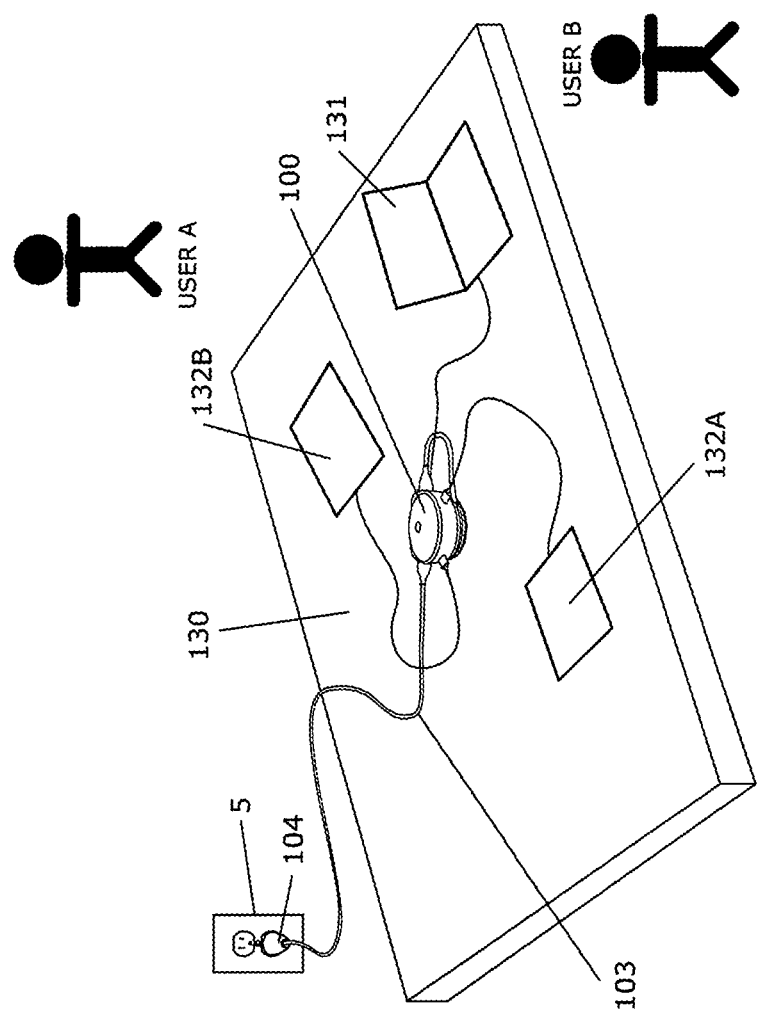
FIG. 17 is a perspective view showing two users sitting on opposite sides of a library tabletop surface, on which are supported a laptop computer and a pair of USB-powered iPad appliances, each sharing electrical power from the portable electrical power supplying system shown in FIGS. 7 through 12, with power cords wound in a first configuration about the storage spools of the external power cord storage compartments of the device.
Figure 18:
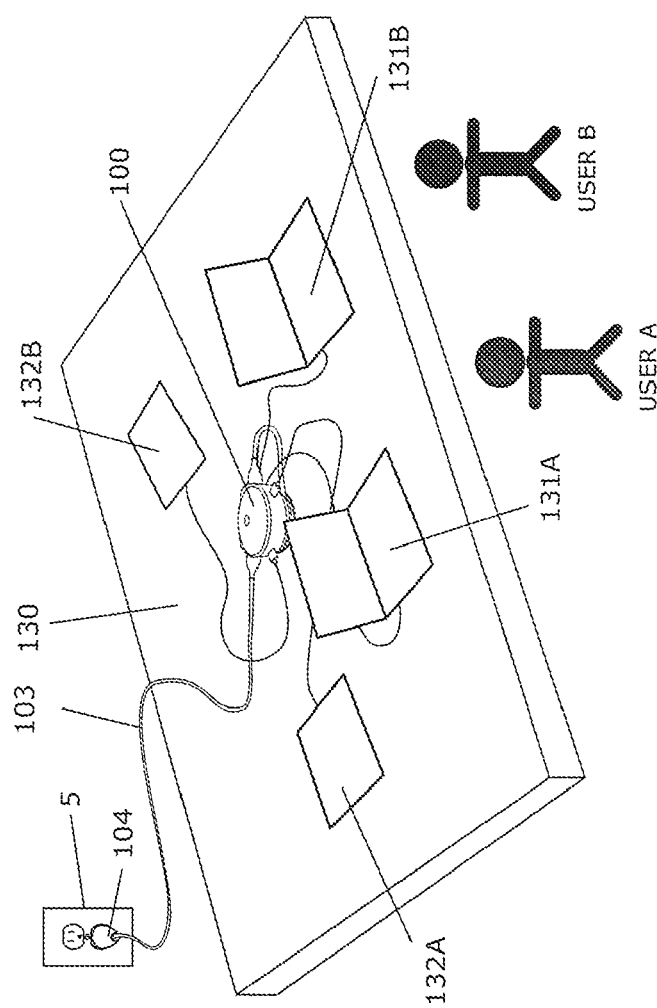
FIG. 18 is a perspective view showing two users sitting on the same side of a library tabletop surface, on which are supported a pair of laptop computers and a pair of USB-powered iPad appliances, each sharing electrical power from the portable single electrical power supplying system shown in FIGS. 7 through 12, with power cords wound in a second configuration about the storage spools of the external power cord storage compartments of the device.

FIGS. 17 and 18 illustrate how the portable electrical power supplying systems 1 and 100 can be used to share electrical power with friends and their appliances and devices, in diverse ways.

In FIG. 17, two users A and B are shown sitting on opposite or adjacent sides of a horizontal support surface 130, on which are supported a laptop computer 131 and a pair of USB-powered iPad appliances 132A and 132B. The horizontal surface 130 could be the surface of a library desk, a table at a coffee shop, a desktop 2rotect from electrical shock and shorting.

The Portable Electrical Power Supplying System According to a Third Illustrative Embodiment of the Present Invention In general, another object of the present invention is to provide a new and improved portable apparatus for supplying electrical power to AC and DC electrical-energy consuming devices of solo as well as communal users, and managing the power cords thereof, while delivering other useful functions to its users.

Referring to FIGS. 19 through 33B, the third illustrative embodiment of the present invention is illustrated in the form of a multi-function electrical power supplying system 145 adapted for use in connection with desktop computer systems, printers, pad computers and/or mobile smartphones, in diverse environments, such as workstations, desktops, library tables, cafes, restaurants, wherever portable AC and/or DC electrical power is required or desired by one or more users.

Figure 22:
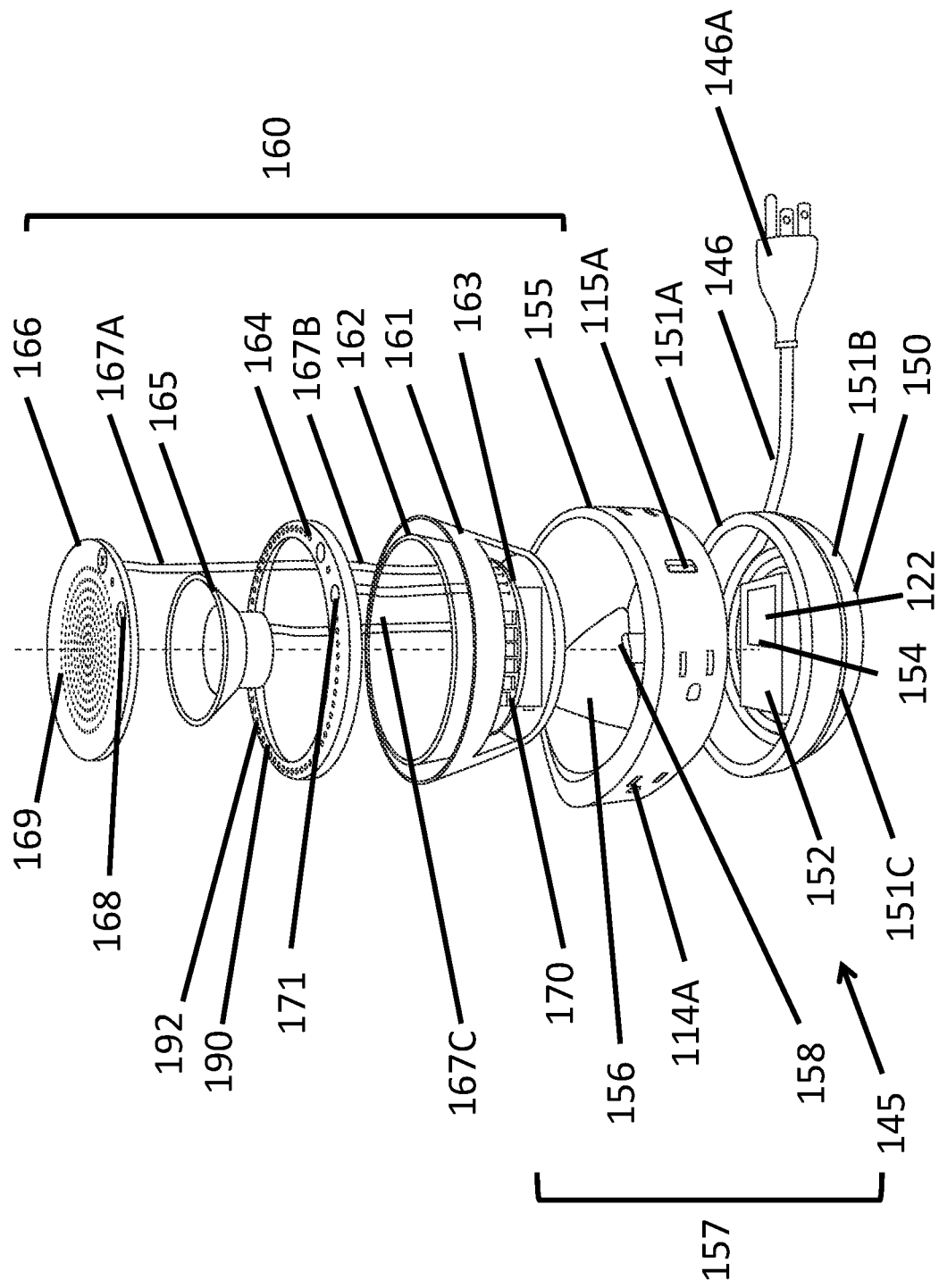
FIG. 22 is an exploded perspective view of the portable electrical power supplying system of the present invention shown in FIGS. 21A through 21B, comprising the module docking station having a base housing component with an external power cord storage compartment as employed in the first illustrative embodiment shown in FIGS. 1 through 18 and containing a AC/DC power adapter and related AC and DC power supply circuitry, wherein the module docking station includes a power receptacle housing portion having (i) a ring-like geometry supporting a plurality of AC and DC electrical receptacles for supplying AC and DC electrical power to electrical power consuming devices, and (ii) a module docking receptacle supporting a USB power connector centrally mounted on the bottom surface of the module docking receptacle in an axial manner and electrically connected to DC power supply circuitry within the base housing portion, and (iv) multi-function module (i.e. device) for removably docking within the module docking receptacle of the module docking station, and supporting (a) a portable battery power storage subsystem, (b) a portable night-light/emergency illumination subsystem, (c) a telephone conference subsystem and (d) a music player subsystem, each subsystem being realized and housed in a portable compact module adapted for mated insertion in the module docking receptacle of the module docking station, where an electrical connection is established between the multi-function module and the module docking station by way of a USB connector and a Bluetooth interface connection.
Figure 23A:
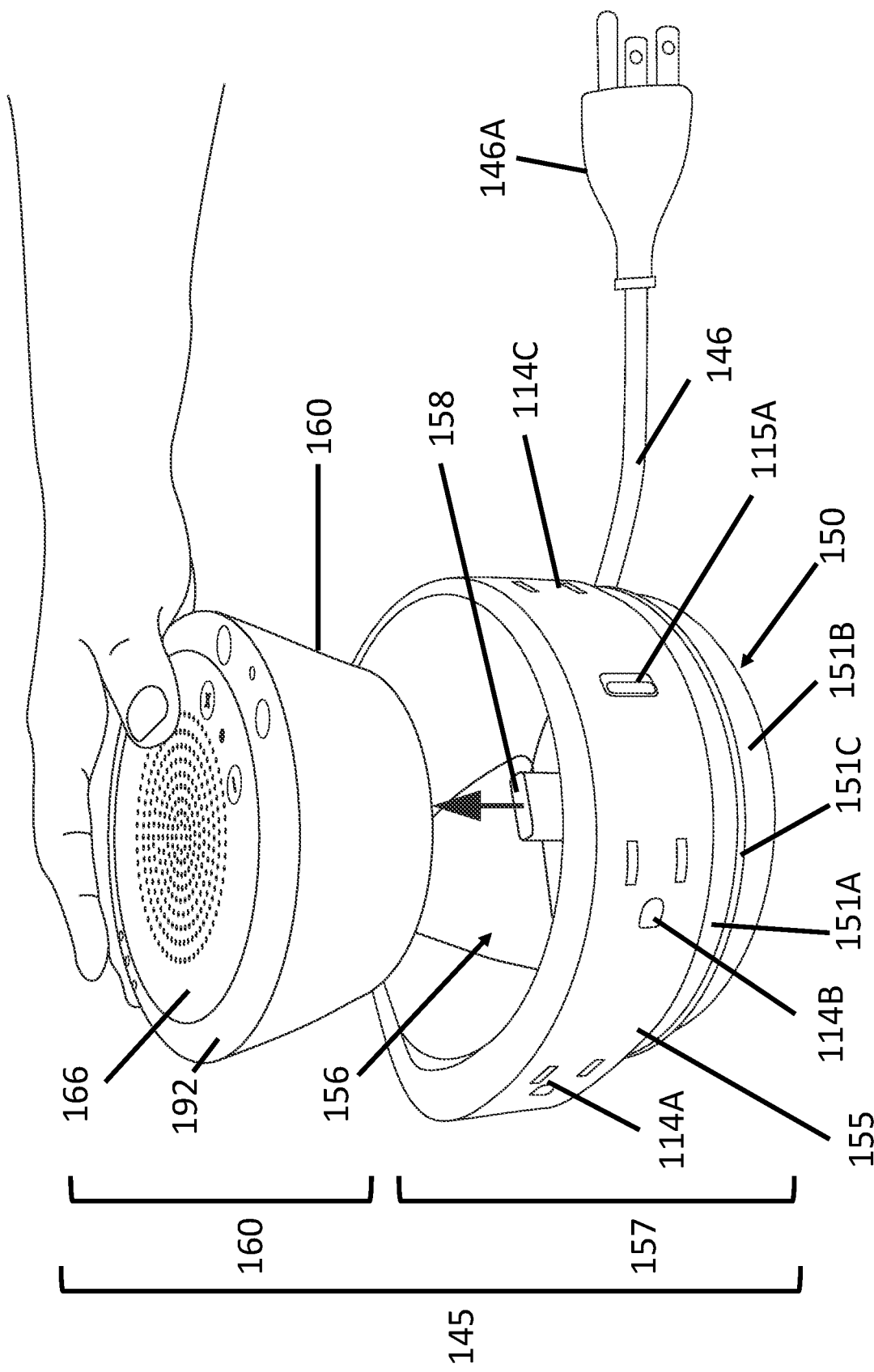
FIG. 23A is a first perspective view of the portable electrical power supplying system of the present invention shown in FIGS. 21A through 22, showing its multi-function module being manually removed from the module docking receptacle of the module docking station of the device, with the matching USB-type ports being disengaged.
Figure 25:
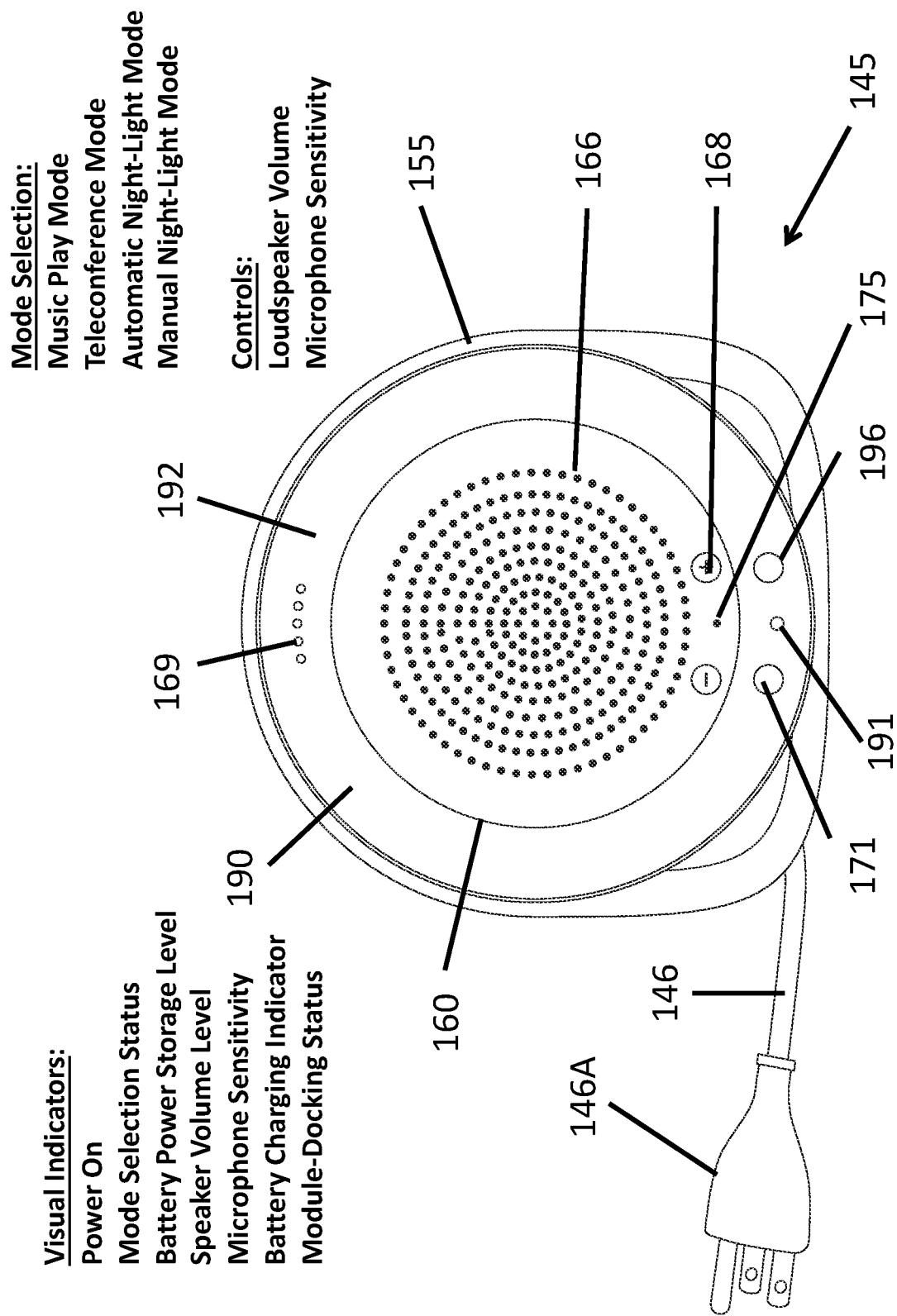
FIG. 25 is a plan view of the portable electrical power supplying system of the present invention shown in FIGS. 21A through 22, showing its multi-function module docked in the module docking receptacle of the module docking station of the device, with its loudspeaker exposed to the ambient environment, its power cord wound up and its power plug extending from the housing.
Figure 25A:
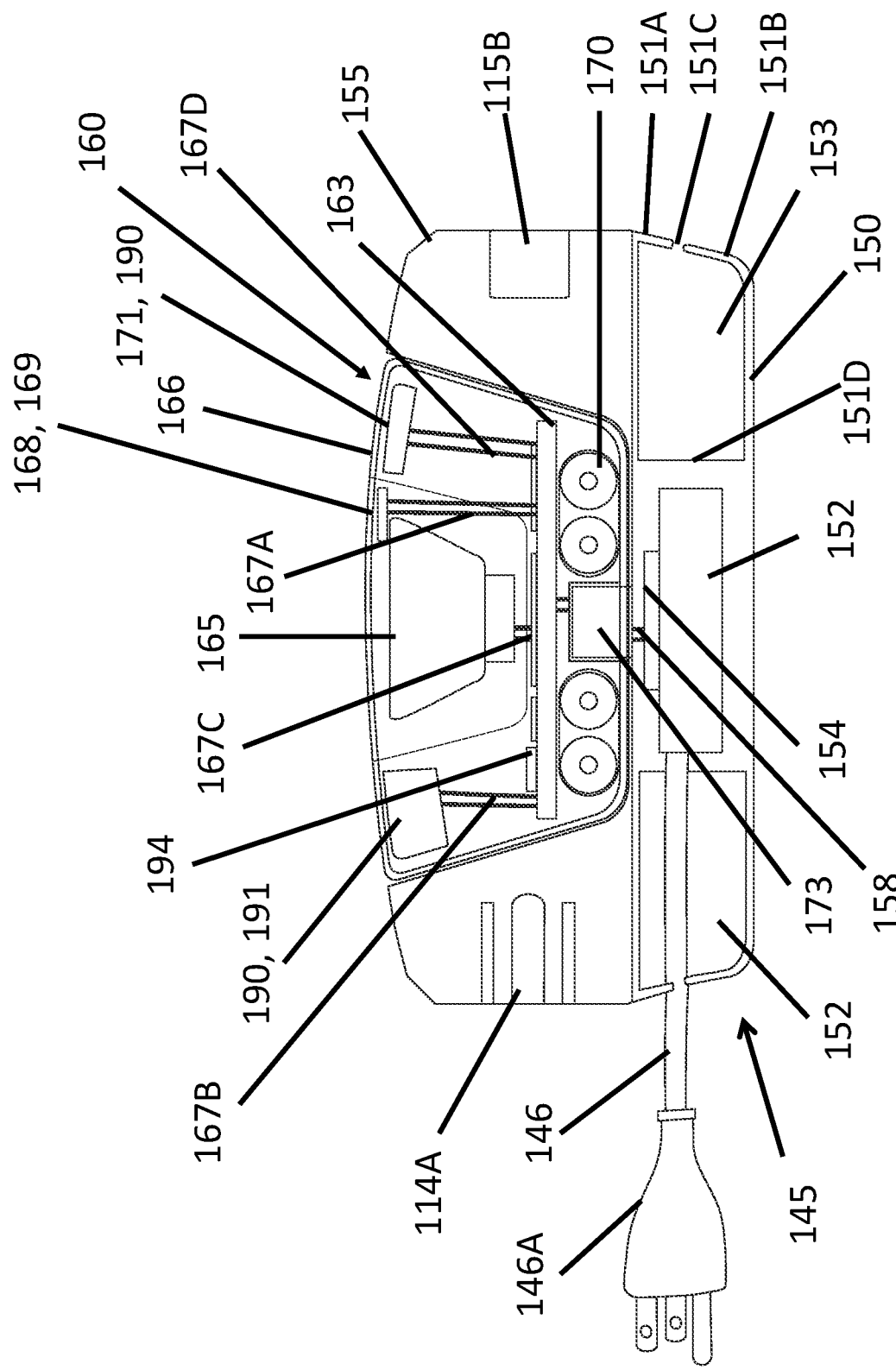
FIG. 25A is an elevated cross-sectional view of the portable electrical power supplying system of the present invention shown in FIGS. 21A through 25, showing its multi-function module docked in the module docking receptacle of the module docking station of the device, and revealing its components comprising (i) a power receptacle housing portion of ring-like geometry supporting a plurality of electrical receptacles for supplying electrical power to electrical power consuming devices, (ii) a base housing portion having an external power cord storage compartment as employed in the first illustrative embodiment shown in FIGS. 1 through 18 and mounted to the base housing portion and containing an AC/DC power adapter and related AC and DC power supply circuitry including a USB power connector aligned in the axial direction of the device, (iii) a module docking station formed by combining the base housing portion with the power receptacle housing portion and having a dock-module cavity with a volume of frusto-conical geometry supporting a USB power connector centrally mounted on the bottom surface of the dock-module cavity in an axial manner, and (iv) multi-function module for docking within the module docking receptacle of the module docking station, and supporting (a) a battery power storage subsystem, (b) a night-light/emergency illumination subsystem, (c) telephone conference subsystem and (iv) a music player subsystem, each subsystem being realized using a PC motherboard supported above the battery storage module and contained within a portable compact module adapted for mated insertion within the module docking receptacle of the module docking station, and where electrical connection is established between the multi-function module and the base portion of the device by way of a USB connector and a Bluetooth network connection.

As shown in FIGS. 22, 23A, 25A, the portable electrical power supplying system 145 comprises a module docking station 157, and a multi-function module 160. The module docking station 157 comprises: a power receptacle housing 155 having a module docking receptacle 156; and a base housing portion 150 having integrated external power cord storage compartments 152 and 153 as illustrated in connection with the first and second illustrative embodiments. The multi-function module 160 is designed for docking (i.e. releasable mounting) within the module docking receptacle 156 of the module docking station 157, and can be manually removed and used locally as well as remotely, while providing one or more functionalities to its users, as illustrated in FIGS. 27 through 33B.

Figure 19:
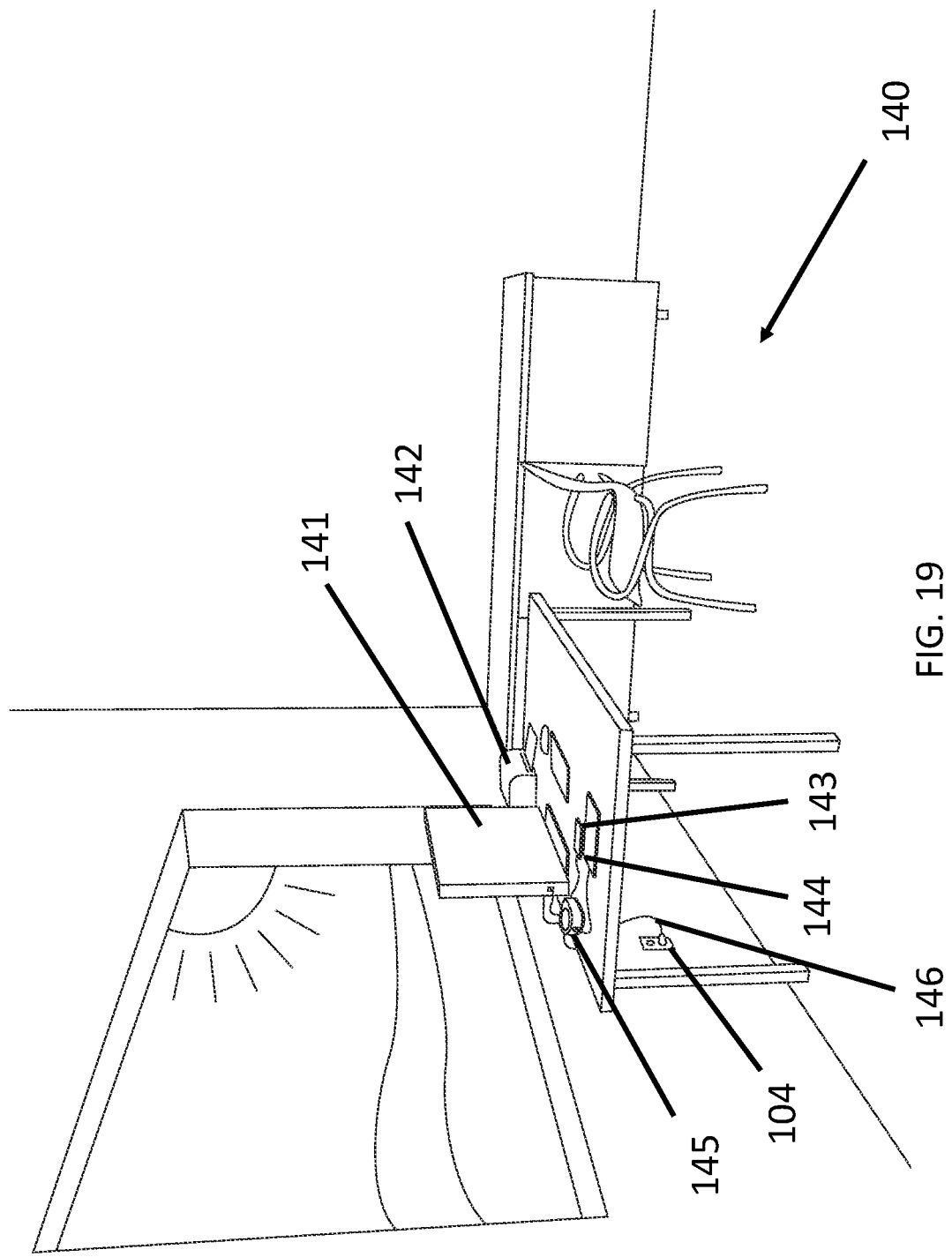
FIG. 19 is a first perspective view showing an exemplary desktop user environment in which the portable electrical power supplying system of the third illustrative embodiment of the present invention, with its single (i.e. single-decker) integrated external power cord storage compartments and multi-function module, might be used in conjunction with a desktop computer system, printer, pad computer, mobile smartphone and other electrical power consuming devices within the environment.
Figure 20:
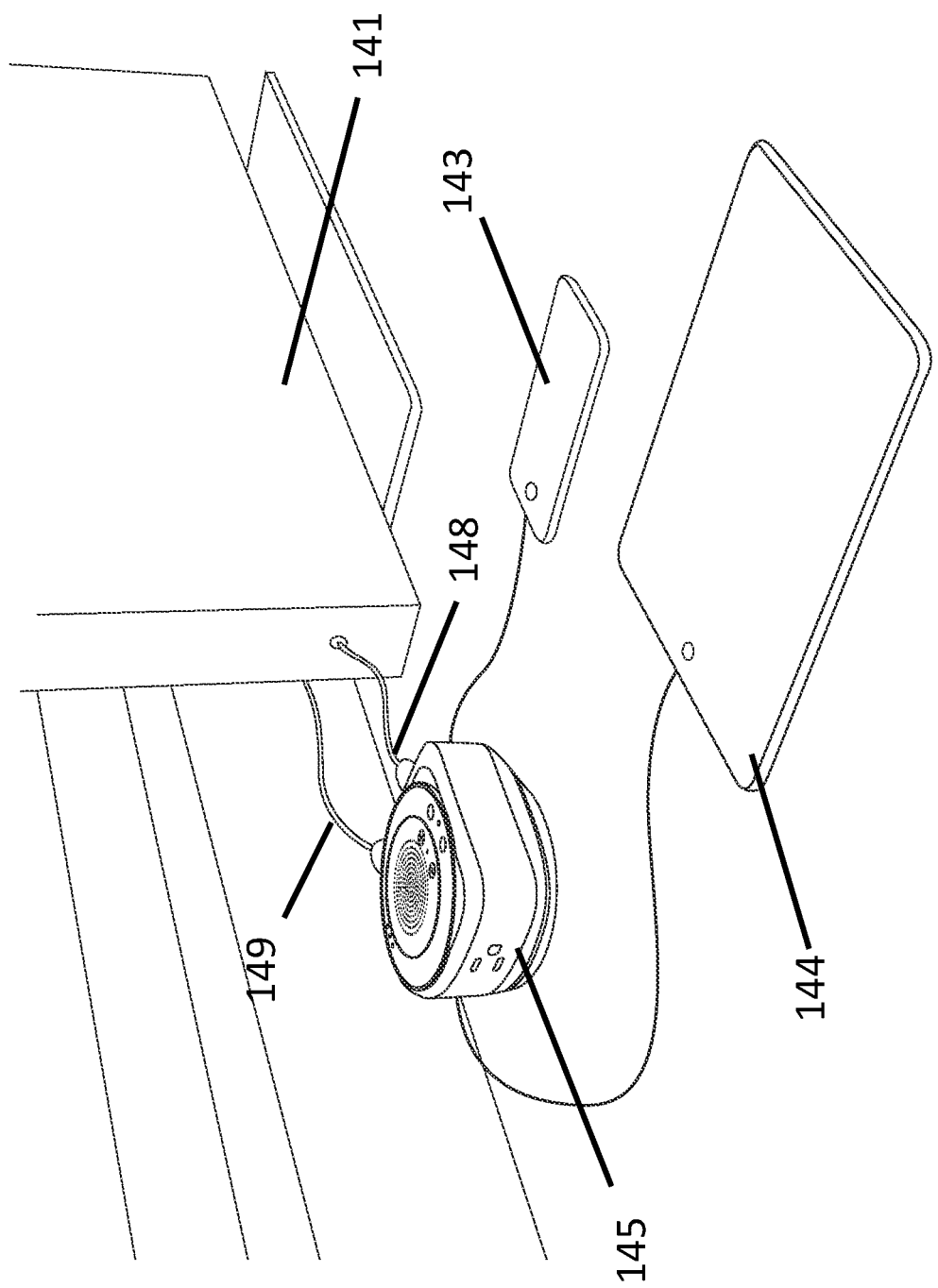
FIG. 20 is a second close-up perspective view of the portable electrical power supplying system of the present invention, shown deployed in the environment of FIG. 19, supplying electrical power to the desktop computer system, pad computer and mobile smartphone.
Figure 21B:
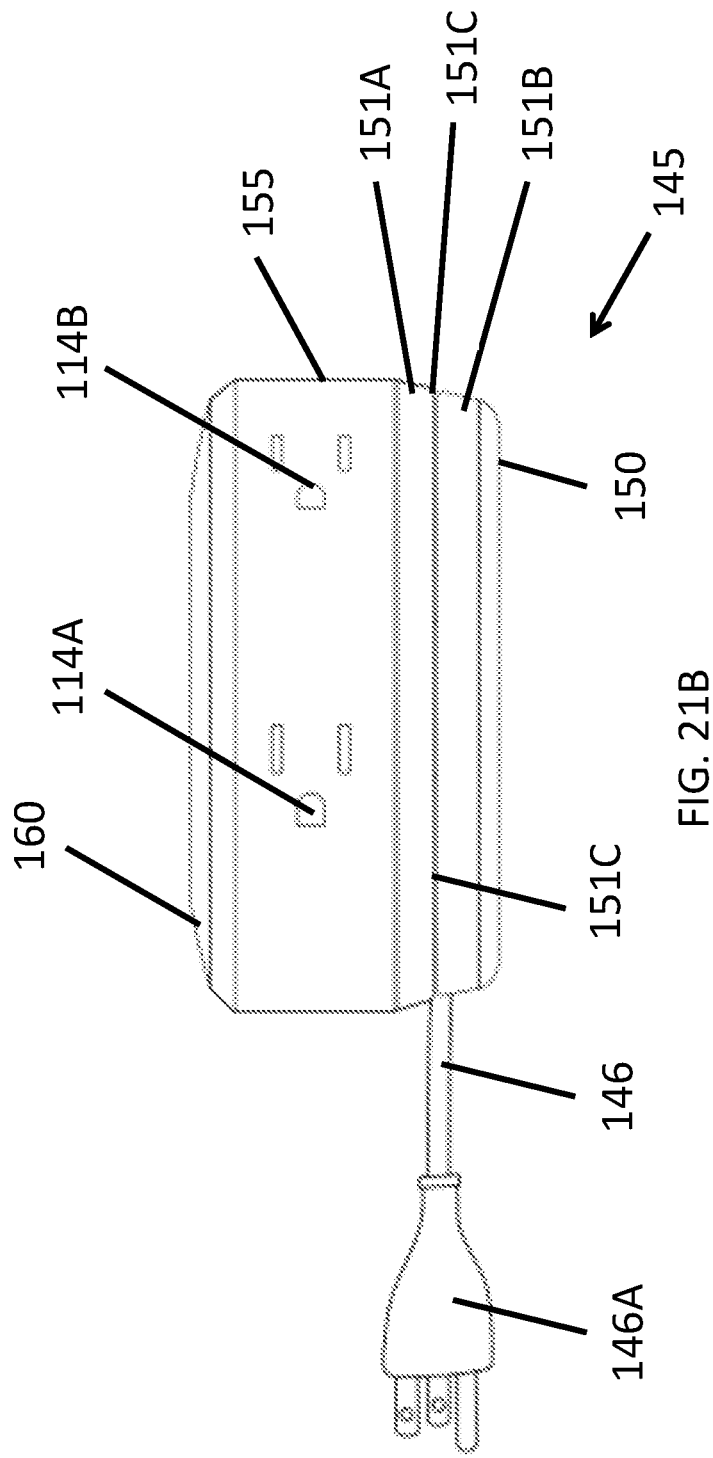
FIG. 21B is an elevated side view of the portable electrical power supplying system of the present invention illustrated in FIG. 21A, showing its pair of AC power receptacles.

As shown in the exemplary desktop user environment 140 of FIG. 19, the portable electrical power supplying system 145 is deployed alongside of a desktop computer system 141 connected to a wireless printer 142, a mobile smartphone (e.g. Apple iPhone 6+) 143 and a pad computer 144. As more clearly shown in FIG. 20, the portable electrical power supplying system 145 is arranged to supply electrical power to the desktop computer system 141, the pad computer 142, the printer 142, the mobile smartphone 142 and the pad computer 144, while supporting the many other functions (i.e. system modes) of the multi-function module 160.

As shown in FIGS. 21A, 21B, 22, 23A and 23B, the portable electrical power supplying system 145 is shown comprising its module docking station 157 with its module docking receptacle 156; and its multi-function module 160 docked (i.e. physically and electrically interfaced) within the module docking station 157.

As shown in FIG. 25A, the base housing portion 150 supports the external power cord storage compartment 152 having an internal spool 151D about which a power cord 146 can be neatly wrapped up and contained with cord storage compartment 152, accessible through opening 151C formed between flexible, pliant upper and lower surfaces 151B and 151B, as shown in FIG. 25A, and described above in connection with the first and second illustrative embodiments; and a power receptacle housing portion 155 having a module docking receptacle 156 illustrated in FIGS. 23A and 25A, and containing AC power receptacles 114A, 114B and 114C, USB-type DC power receptacles 115A and 115B and a USB-based module dock interface 158 mounted in the central bottom portion of the module docking receptacle 156.

As shown in FIG. 25A, the multi-function module 160 has a USB interface connector 173 which connects with the USB interface 158 mounted within bottom of the module docking receptacle 156, when the multi-function module 160 is docked within its geometrically mated/matched module docking receptacle 156.

As shown in FIG. 22, the power receptacle housing portion 155 comprises: a ring-like geometry supporting (i) the plurality of AC electrical receptacles 114A through 114C for supplying electrical power to AC electrical power consuming devices using conventional power cables known in the art; and (ii) the plurality of USB-type DC power receptacles 115A and 115B for supplying DC electrical power to DC electrical power consuming devices (e.g. mobile phones, iPads, etc.) using USB cables well known in the art.

As shown in FIG. 22, the power receptacle housing portion 155 is interfaced with the base housing portion 150 using screws, glue or other fastening means, although both housing portions 150 and 155 could be realized as a single piece construction using injection molding, or other fabrication techniques. The wall surfaces of the power receptacle housing portion 155 form the module docking receptacle 156. As shown, the USB power connector 158 is centrally mounted on the bottom surface of the module-docking receptacle 156. As shown in FIGS. 23A and 25A, the USB connector 158 is arranged in an axial manner and electrically connected to the AC/DC power adapter and control circuitry 122 mounted within the base housing portion 150. As shown in FIGS. 21A, 21B, 22, 24A and 26, the USB-based module dock interface 172A formed within the multi-function module 160 includes a female-type USB connector 173 for interfacing with the male-type USB connector 158 associated with the USB interface 158A formed within the module docking receptacle 156.

Figure 26:
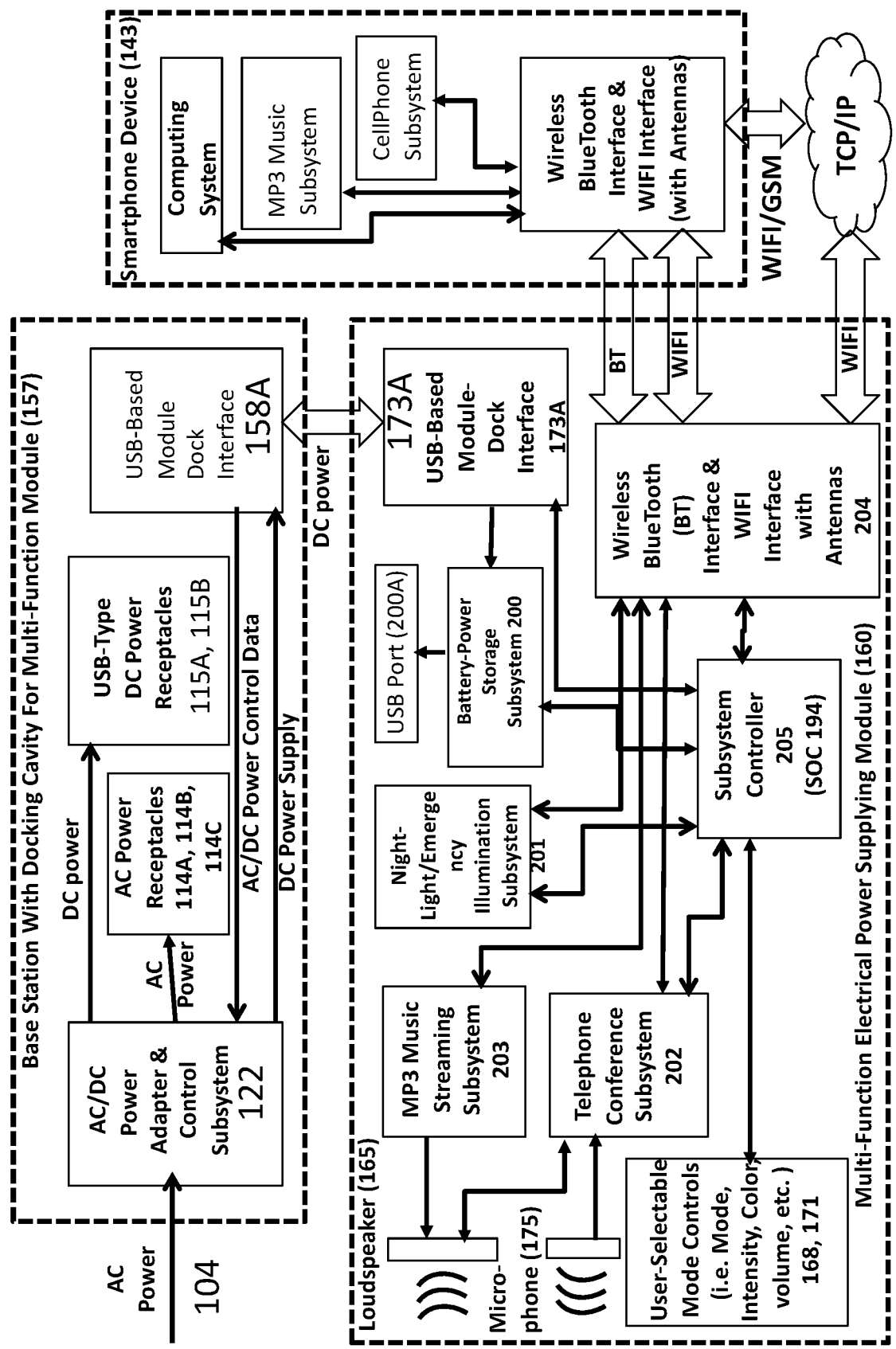
FIG. 26 is a schematic block diagram of the portable electrical power supplying system of the present invention, comprising (i) a module docking station with a module docking receptacle for a multi-function module, including an AC/DC power adapter subsystem, AC power receptacles, USB-type DC power receptacles and a USB-based module dock interface, and (ii)) a multi-function module including a subsystem controller, a wireless Bluetooth interface for establishing a wireless interface with the wireless Bluetooth interface within one or more smart-phone devices or other wireless devices in the vicinity of the device, a USB-based module-dock interface, a battery power storage subsystem with USB port, a night-lite/emergency illumination subsystem with photo-sensor, a mp3 music streaming subsystem connected to an audio transducer/loudspeaker, a telephone conference subsystem connected to the loudspeaker/transducer and a microphone, and a user selectable mode controls in the form of a set of buttons, membrane switches or the like and associated LED indicators.

As shown in FIGS. 23A, 23B, 23C and 26, electrical connections are established between the multi-function module 160 and the module docking station 157 by way of a USB plug-connector interface realized by the male-type USB connector 158 and female-type USB connector 173 which mate together as shown in FIG. 25A. Also, wireless network connections indicated by BT, WIFI and BT in FIG. 26 are established between the multi-function module 160 and the module docking station 157 of the device 145 by way of the Bluetooth/WIFI wireless network interface 204 having appropriate antenna structures (e.g. micro-strip, fractal, and/or other kinds) supporting the operative electromagnetic signals required by these wireless radio-frequency interface standards. As shown, the multi-function module 160 can be manually removed from the module docking receptacle 156 in the module docking station 157 by using the user's fingers to lift up on the compact housing 161 of the multi-function module 160, and thereby physically disengage the USB-type interface connectors 158 and 173. DC electrical power and other digital signals are transported across the USB interface connection established by USB connectors 173A and 158A only when the female-type USB receptacle 173 in the multi-function module 160 is electrically connected to its mated male-type USB receptacle 158 in the central base portion of the module docking receptacle 156.

Figure 28:
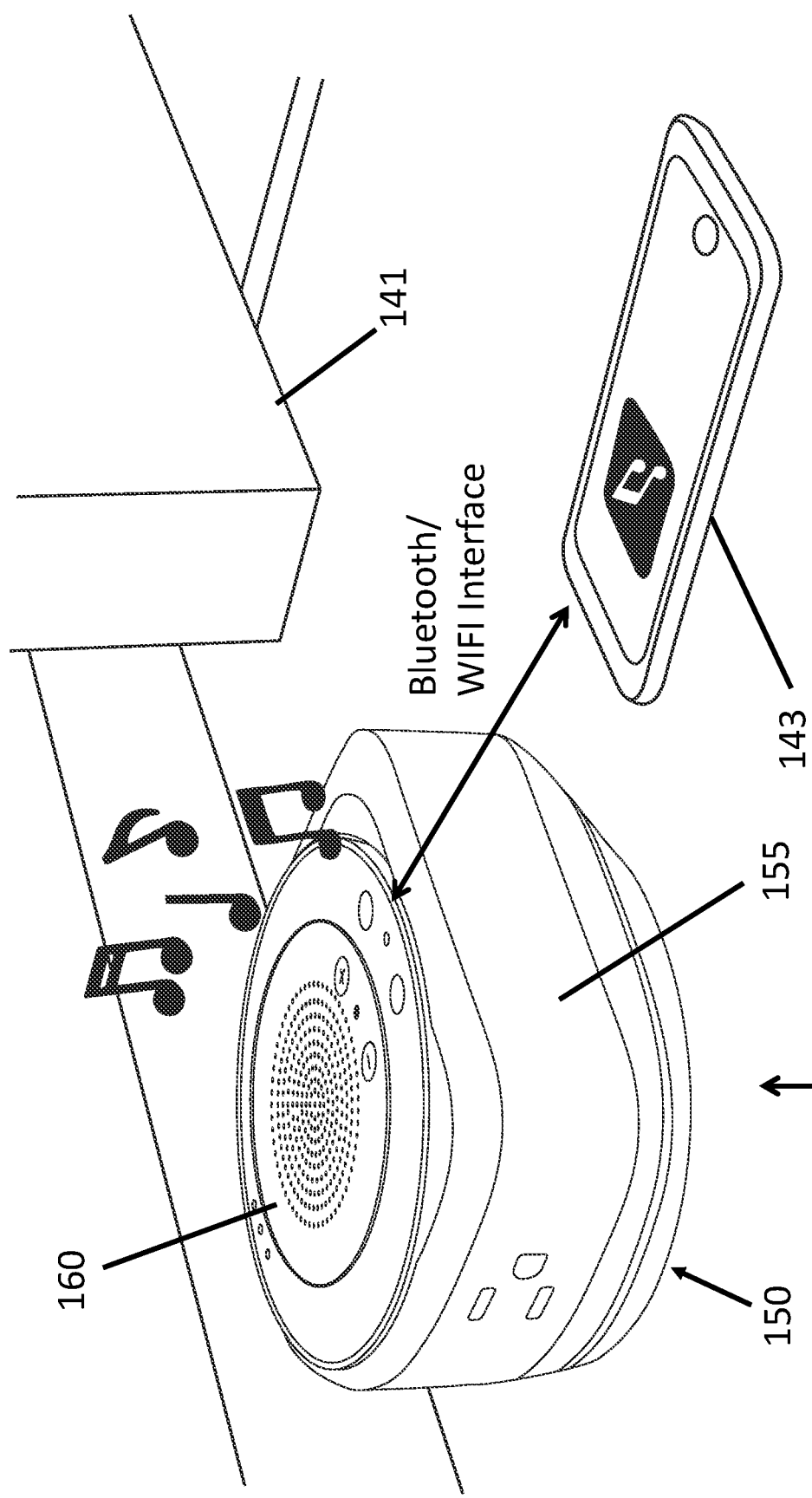
FIG. 28 is a perspective view of the portable electrical power supplying system of the present invention shown in FIGS. 21 through 27, illustrating the device operating in its Music Streaming Mode of Operation with a smartphone device in wireless communication with the multi-function module over a Bluetooth wireless communication interface.
Figure 36:
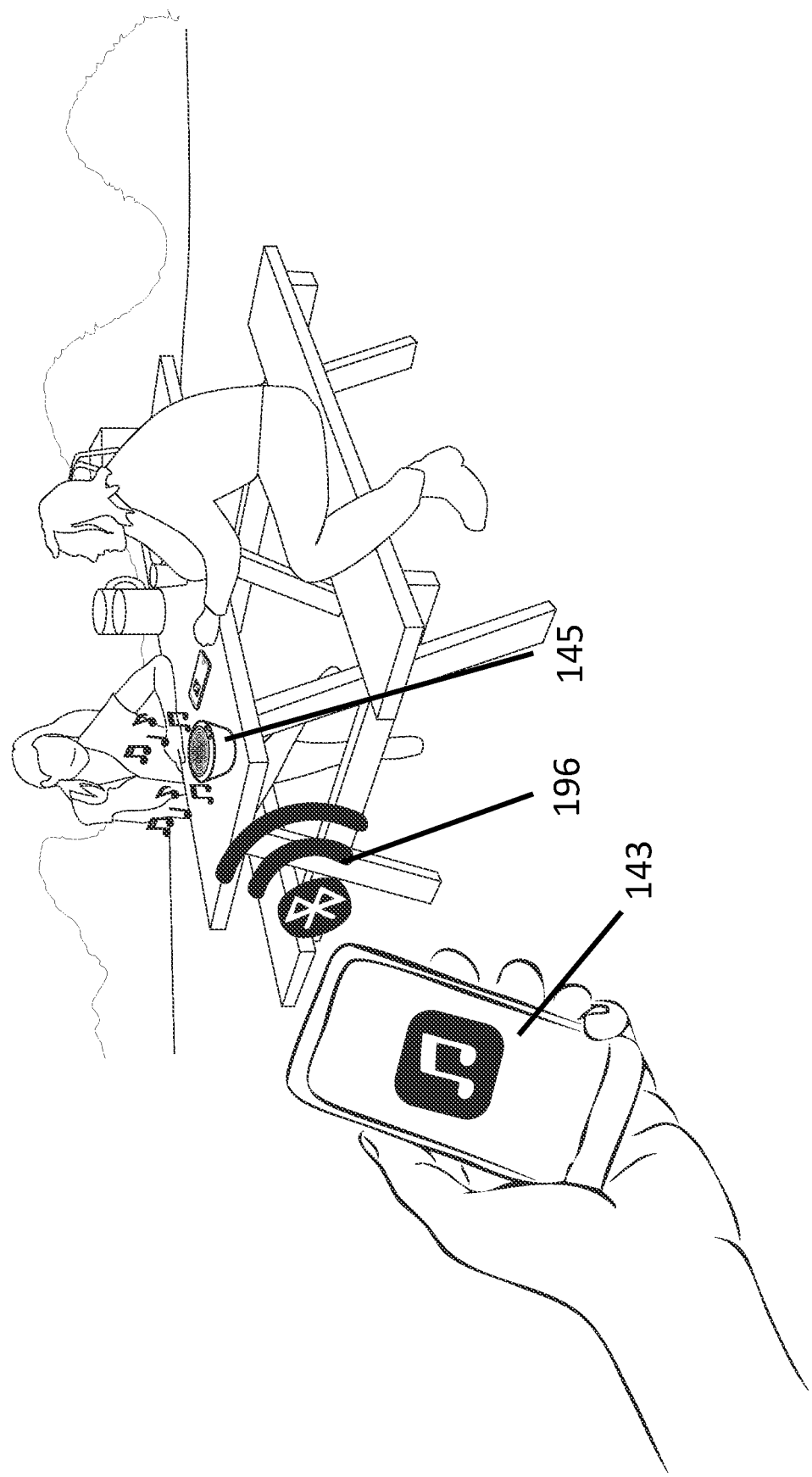
FIG. 36 is a perspective view of the portable electrical power supplying system of the present invention shown in FIGS. 21 through 27, illustrating its multi-function module operating in its Remote Music Streaming Mode of Operation during the day-time when ambient illumination conditions are bright, with the portable electrical power supplying system removed from the module docking receptacle the module docking station, and located at a distance from a smartphone device in wireless communication with the multi-function module over a Bluetooth wireless communication interface.
Figure 38:
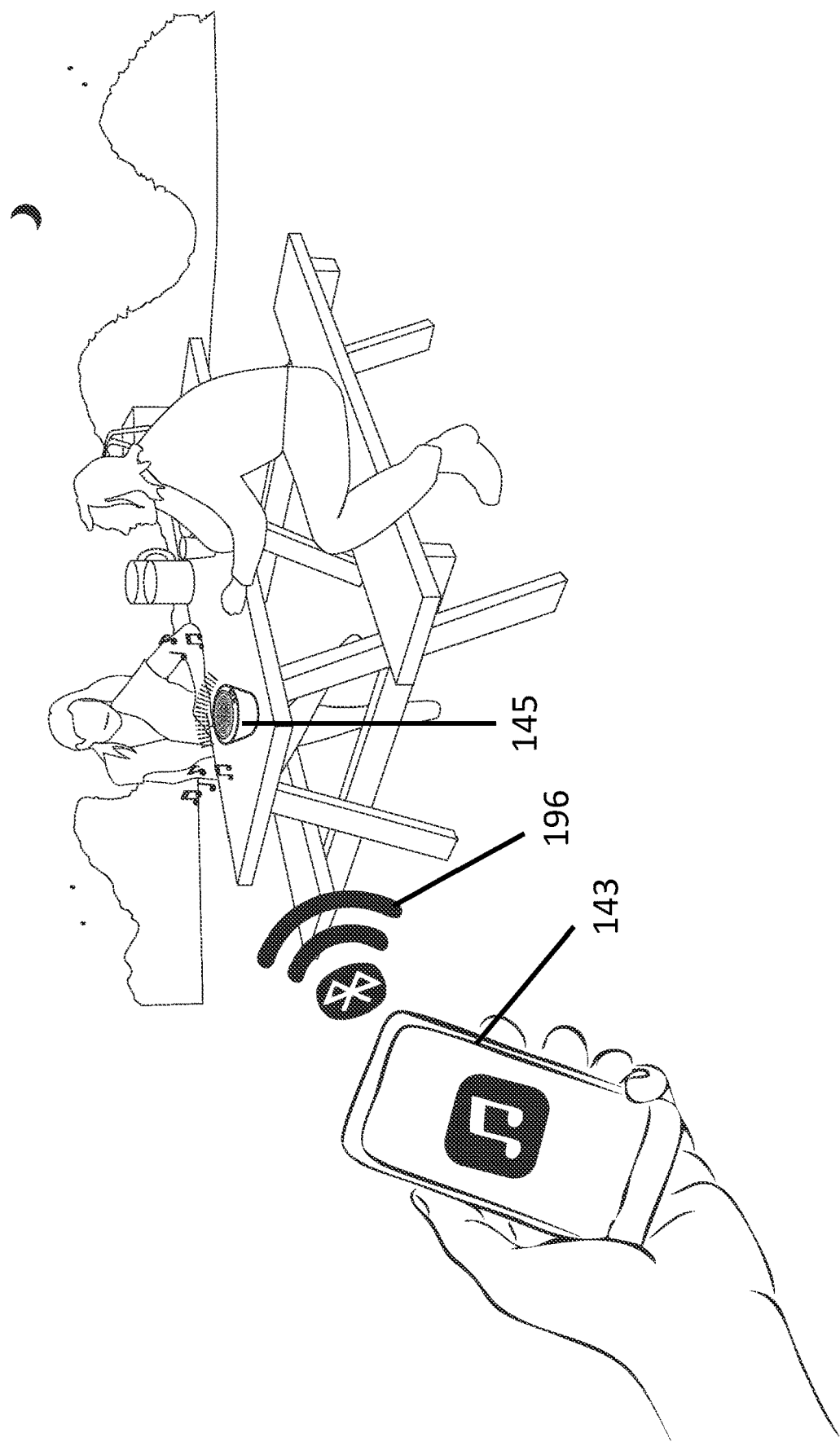
FIG. 38 is a perspective view of the portable electrical power supplying system of the present invention shown in FIGS. 21 through 27, illustrating the device operating in both its Remote Music Streaming Mode of Operation and Night-Lighting Mode of Operation during the night-time when ambient illumination conditions are low, wherein the multi-function module is removed from the module docking receptacle of the module docking station, and located at a distance from a smartphone device in wireless communication with the portable electrical power supplying system over a Bluetooth wireless communication interface, while the smartphone streams music signals to the multi-function module while its illumination subsystem generates night lighting under low illumination levels detected in the ambient environment.

As shown in FIG. 26 and briefly mentioned above, the multi-function module 160 comprises a number of high-level functional subsystems realized within its compact construction, namely: the subsystem controller 205 for controlling the operations of all subsystem and components within the multi-function module 160; a wireless Bluetooth interface 204 for establishing a wireless interface with the wireless Bluetooth interface 143A within one or more smartphone devices 143 or other wireless devices 144 located in the vicinity of the device 145; the USB-based module-dock interface 173A; the battery power storage subsystem 200 with USB port 200A which includes rechargeable battery unit 170, adapted for discharging electrical DC power stored in battery 170 and recharging DC power consuming devices 143, 144 etc. therewith using a conventional USB cable known in the art; the night-light/emergency illumination subsystem 201 including LED array 190 for producing illumination of variable temperature color and intensity, and photo-sensor 191 for sensing the level of light in the ambient environment 140 and elsewhere (e.g. outdoors) and using this sensed level for control; music streaming subsystem 203 connected to an audio transducer/speaker 165 for producing audio signals for music being played on a remote music player or phone system transmitting music signals over the wireless Bluetooth and/or WIFI interface 204; telephone conference subsystem 202 connected to the audio speaker/transducer 165 and microphone 175 for supporting teleconference conferences initiated through smartphone 143 in wireless communication with the multi-function module 160, while using the loudspeaker 165 and microphone 175 mounted within the multi-function module 160 which docked within module docking station 157 as shown in FIG. 28, or while the module is un-docked from the module docking station 157 as illustrated in FIGS. 36 and 38. Each of these subsystems is controlled by the subsystem controller 205, and realized within the portable compact module 161 that is adapted for mated insertion into the module docking receptacle 156, as described above.

User-selectable mode controls 168, 171 are provided for manual mode selection, illumination temperature control, illumination intensity control and audio volume control. As shown in FIG. 26, electrical communication is established between the multi-function module 160 and the module docking station 157 by way of the wired USB interface 158A/173A, and also by way of the Bluetooth wireless network interface 204. The wireless Bluetooth (BT) and WIFI interface connections supported by wireless interface subsystem 204 enables mobile phones 143 and other computing devices 144 to establish data packet communication with the multi-function module 160 and support multiple functions within the various subsystems implemented therewithin.

As shown in FIG. 25, user selectable controls 168, 171 are realized in the form of a set of buttons, membrane switches or other switching technology, while associated LED indicators and optionally an LCD touch-screen display panel 180 can be mounted on or near speaker sound transmission cover plate 166, or other surface that satisfies design requirements and specifications. The function of controls 168, 171 is to allow the user to manually select and control particular modes of the multi-function module 160, in addition to the color temperature of illumination produced from the LED array 170, the intensity of illumination produced from the LED array 170, the sound level of the loudspeaker 165, and/or the sensitivity of the microphone 175. In the preferred embodiment, the night-light and emergency illumination modes are automatically selected by the subsystem controller 205 upon the automated detection of ambient lighting condition by the light sensor 191, or line-voltage interruptions detection by the line-voltage detector 125 shown in FIG. 26A In general, the multi-function module 160 is capable of supporting a number of different functions while supported within its docking receptacle 156 as well as when removed therefrom and located away from the module docking station 157, as illustrated in FIGS. 36 through 40B. While these various functions will be described in greater detail below with reference to FIGS. 27 through 33B, it will be helpful to first describe the various subsystems that support these functions, namely the battery power storage subsystem 200, the portable night-light/emergency illumination subsystem 201, the telephone conference subsystem 202, and the music streaming subsystem 203 shown in FIG. 26, while making reference to FIG. 22 and related figures. Each of these subsystems are realized using the PC motherboard 163 and components mounted thereon as illustrated in FIG. 27. As shown in FIGS. 22 and 25A, the PC motherboard is supported above the battery storage module 170 and USB interface connector 173, contained within a portable compact module 160 adapted for mated insertion in the module docking receptacle 156 of the module docking station 157.

As shown in FIGS. 25A and 26, the portable battery power storage subsystem 200 is typically realized using a set of solid-state (e.g. lead-acid) batteries 170, battery recharging circuitry, electrical sockets, battery holders, etc. mounted on the rear surface of the PC board 163. The batteries 170 are connected to a power bus realized on the PC board 163 to deliver DC electrical power to the various electrical components of device supported on the PC board, and to flexible wire harnesses (e.g. ribbon cables, etc.) for electrical components mounted off the PC board 163, such as LED arrays 190, photo-sensors 191, controls 171, 168, LED indicators 169 and the like, illustrated in FIGS. 21A through 26.

Figure 23B:
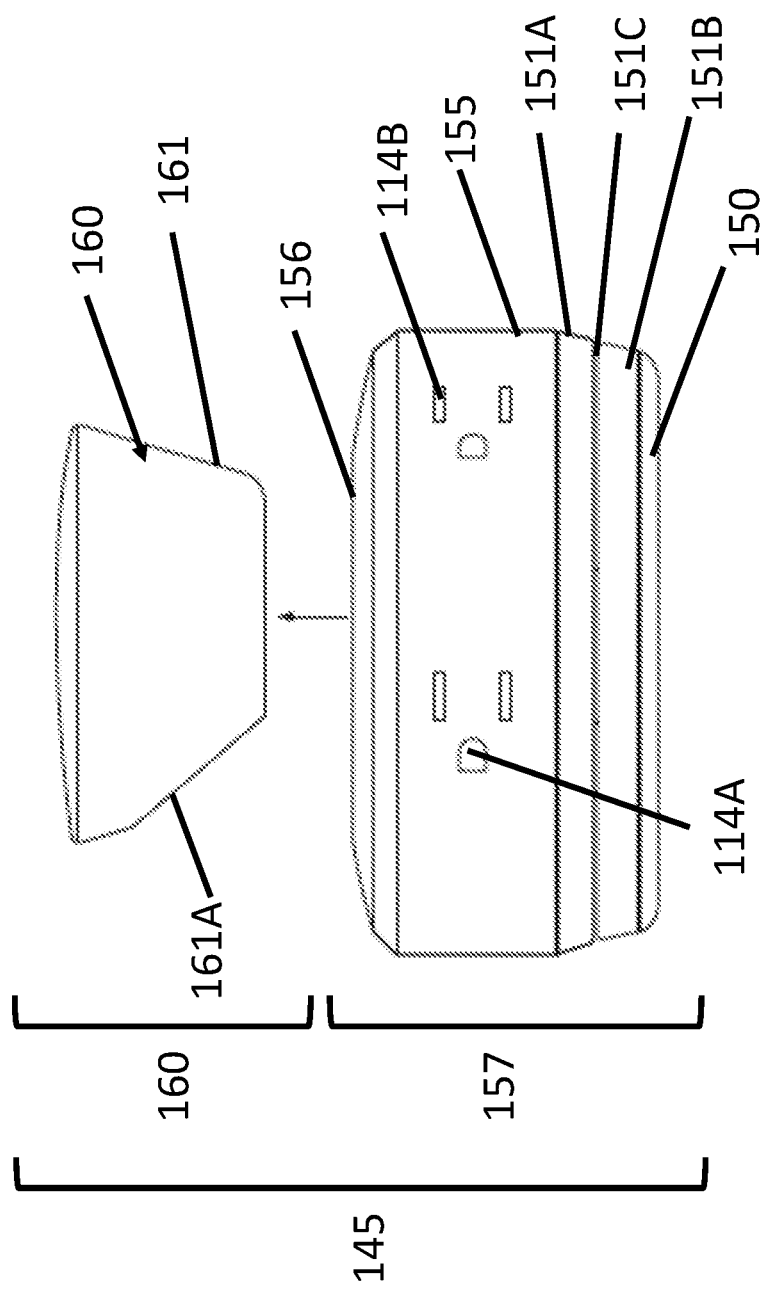
FIG. 23B is a second elevated side view of the portable electrical power supplying system of the present invention shown in FIGS. 21A through 22, showing the external AC power supply in the module docking station, and its multi-function module being removed from the module docking receptacle of the module docking station of the device.
Figure 23C:
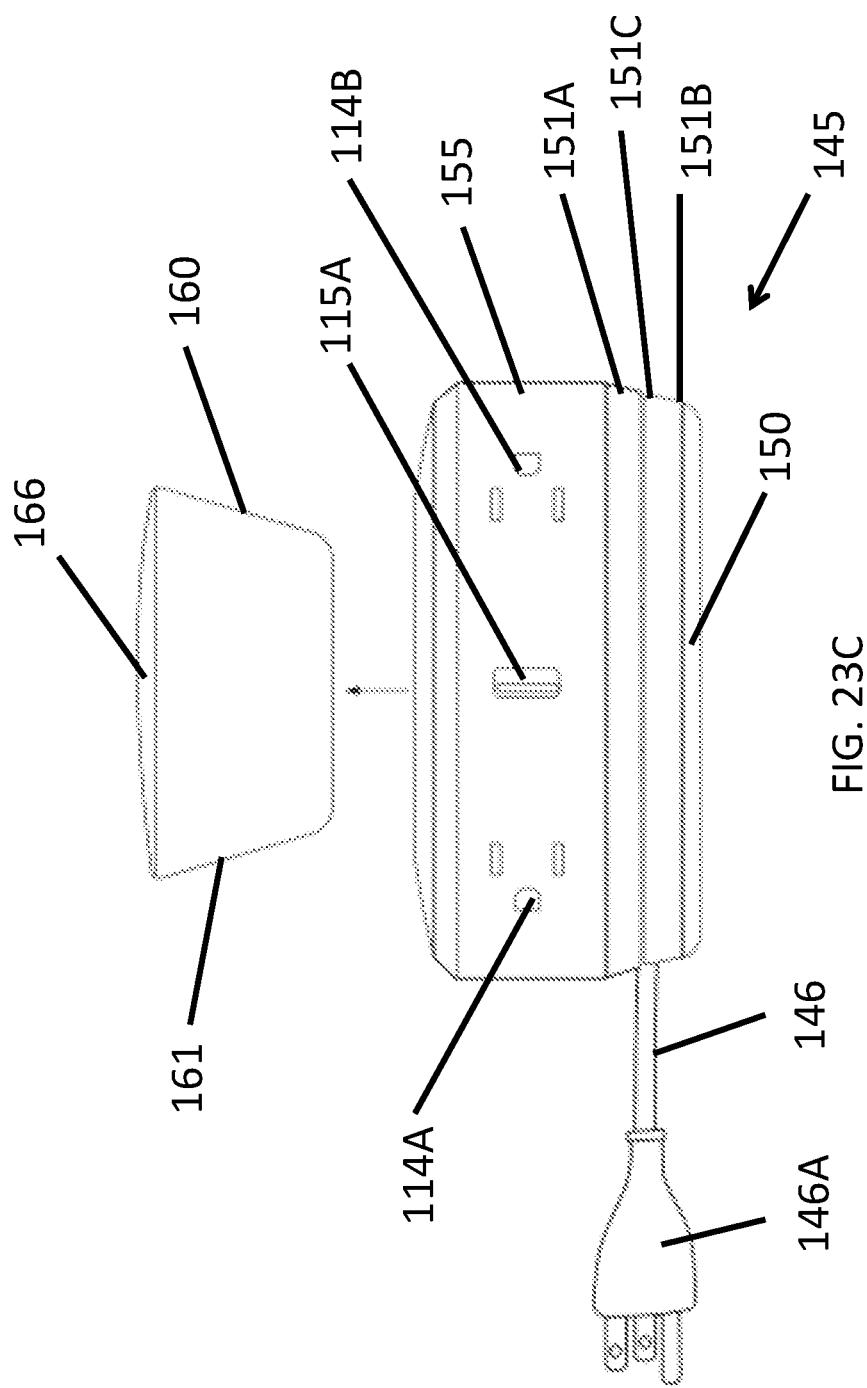
FIG. 23C is an elevated side view of the multi-function module removed from the module docking receptacle of the module docking station of the device shown in FIGS. 21A through 22.

FIG. 25A shows the portable electrical power supplying system 145 with its multi-function module 160 docked in the module docking receptacle 156 of the module docking station 157, and revealing its components comprising: (i) a power receptacle housing portion 155 of ring-like geometry supporting a plurality of electrical receptacles 114A, 114B, 114C, 115A, and 115B for supplying AC and DC electrical power to electrical power consuming devices; (ii) an external power cord storage compartment 153, as employed in the first illustrative embodiment shown in FIGS. 1 through 18, and mounted to the base housing portion 150 and containing an AC/DC power adapter 122 and related AC and DC power supply circuitry including a USB power connector 158 aligned in the axial direction of the device; (iii) the dock-module cavity 156 within the power receptacle housing portion 155, having a volume of frusto-conical geometry and allowing the USB power connector 158 to project through an aperture formed centrally in the bottom surface of the dock-module cavity in an axial manner, and with the base station 150 and cord storage compartment 153, forming the module docking station 157 as illustrated in FIGS. 23A and 23B; and (iv) the multi-function module 160 adapted for docking in the module docking receptacle 156 of the module docking station 157, and supporting (a) the portable battery power storage subsystem 200, (b) a portable night-light/emergency illumination subsystem 201, (c) portable telephone conference subsystem 202, and music streaming subsystem 203. Each subsystem is realized using PC motherboard 163 supported above the battery storage module 170 and contained within a portable compact module 161 adapted for mated insertion in the module docking receptacle 156 of the module docking station 157, where electrical connection is established between the multi-function module 160 and the module docking station 157 by way of USB connectors 158 and 173.

In FIG. 25, the user control console 171, 190 of the multi-function module 160 is shown comprising a set of control buttons that are selectable by the user, namely: (i) four (4) Mode Selection Button for the Music Play Mode, the Teleconference Mode, Automatic Night-Light (Illumination) Mode and Manual Night-Light (Illumination) Mode; (ii) volume controls for increasing and decreasing the volume of the loudspeaker; and (iii) microphone sensitivity controls for increasing and decreasing the sensitivity of the integrated microphone.

As shown in FIG. 25, the multi-function module 160 also comprises a set of visual indicators (e.g. LEDs), namely: (i) Power On status; (ii) Mode Selection Status (i.e. indicating which mode has been selected; (iii) Battery Power Storage Level; (iv) Speaker Volume Level; (v) Microphone Sensitivity; (vi) Battery Charging Indicator; and (vii) Module Docking Status (i.e. docked, undocked).

Figure 26A:
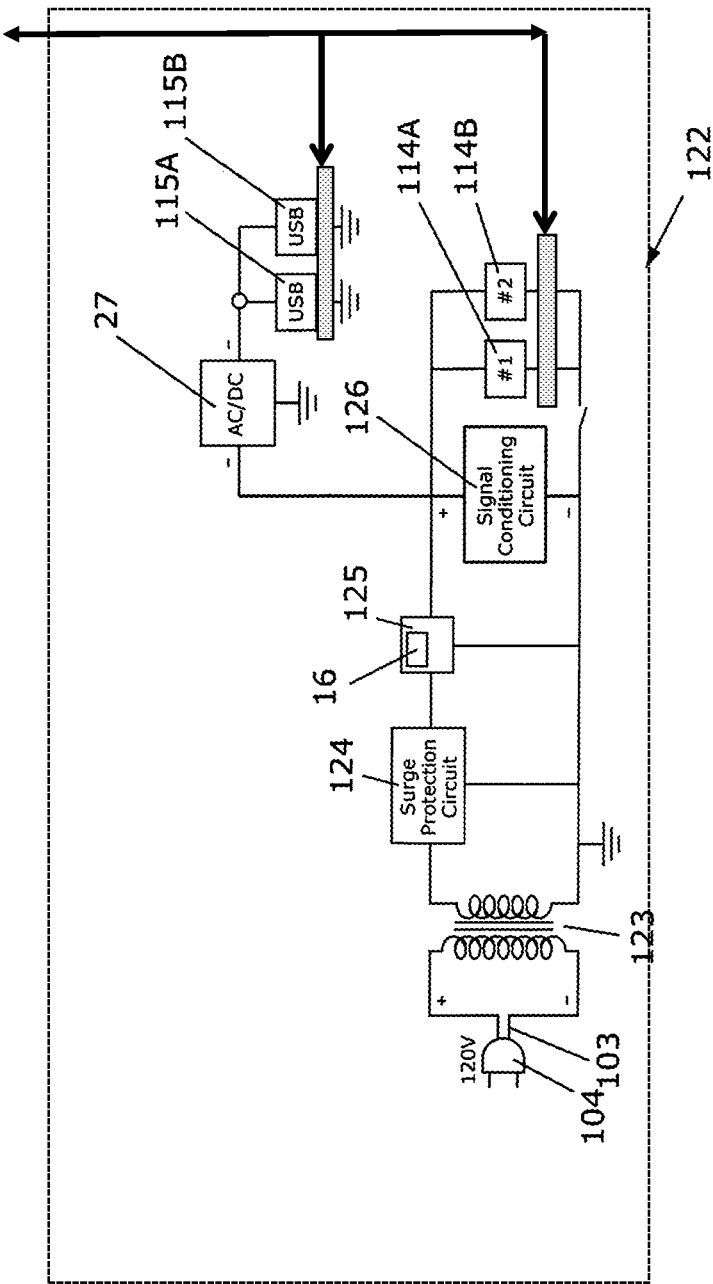
FIG. 26A is a schematic representation of certain components within the base station shown in the portable electrical power supply system of FIG. 26.
Figure 27:
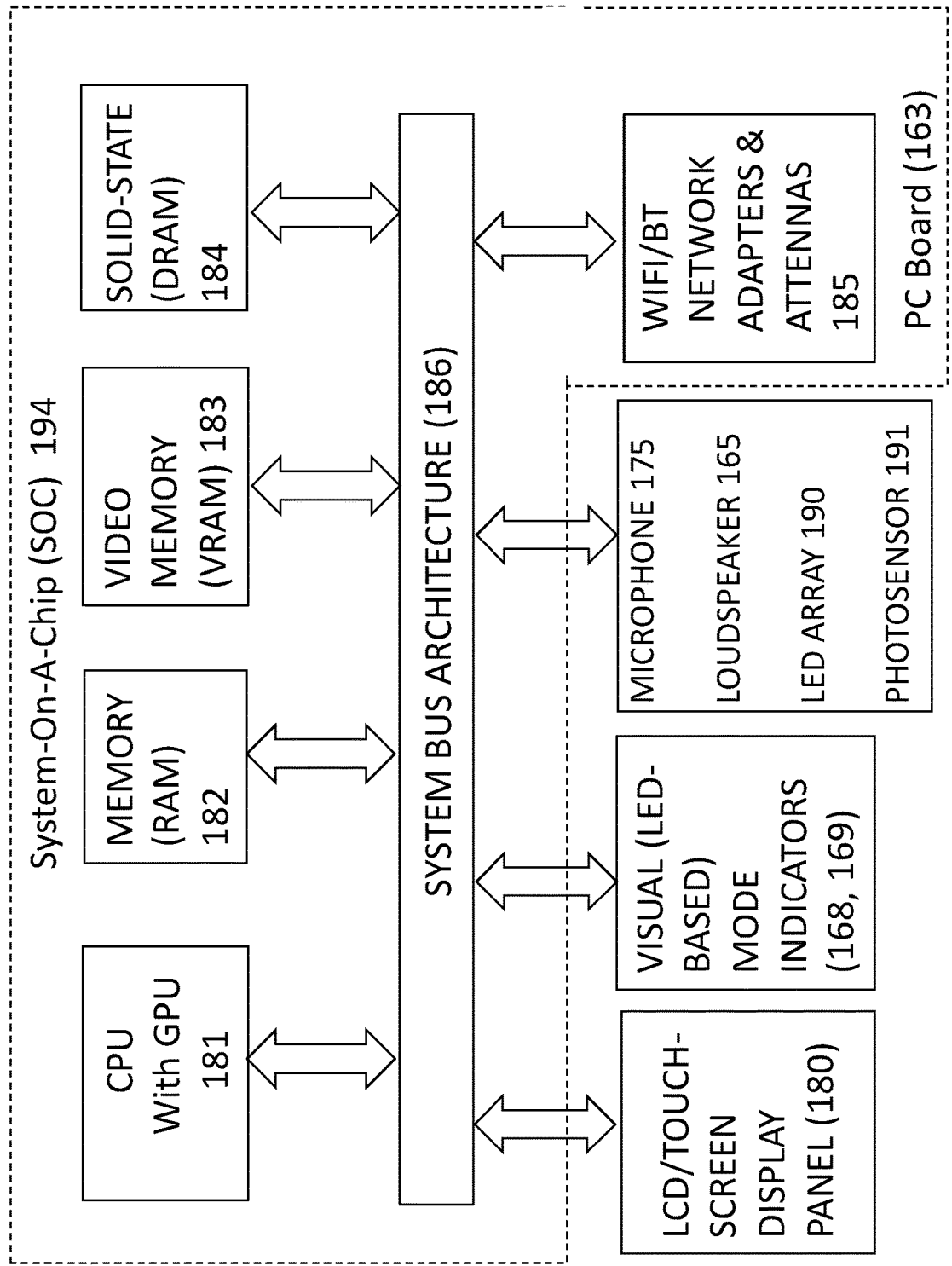

FIG. 26A is a schematic diagram for the AC/DC power adapter and control subsystem 122 including power plug 104 employed in the system shown in FIG. 26. Subsystem 122 is similar to the subsystems provided in the first and second illustrative embodiment with the exception of the mounting of the USB power interface 158 within the USB-based module dock interface 158A interfacing with the mating USB connector 173 mounted on the base of the multi-function module 160, as shown in FIGS. 24A and 26.

Figure 29:
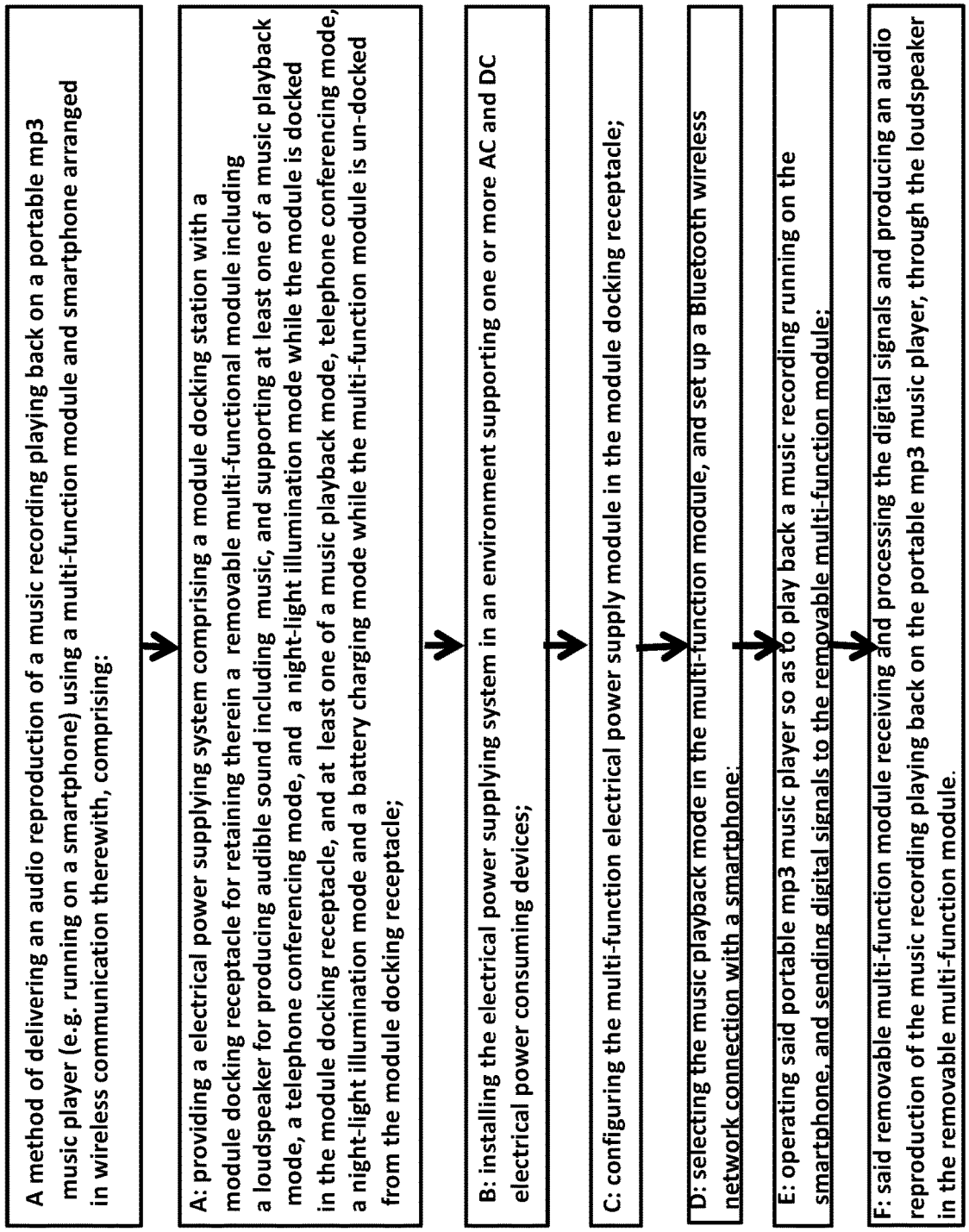
FIG. 29 provides a flow chart describing the steps performed during the method of delivering an audio reproduction of a music recording playing back on a portable mp3 music player (e.g. running on a smartphone) using a multi-function module and smartphone arranged in wireless communication therewith and operated in accordance with the principles of the present invention.
Figure 30:
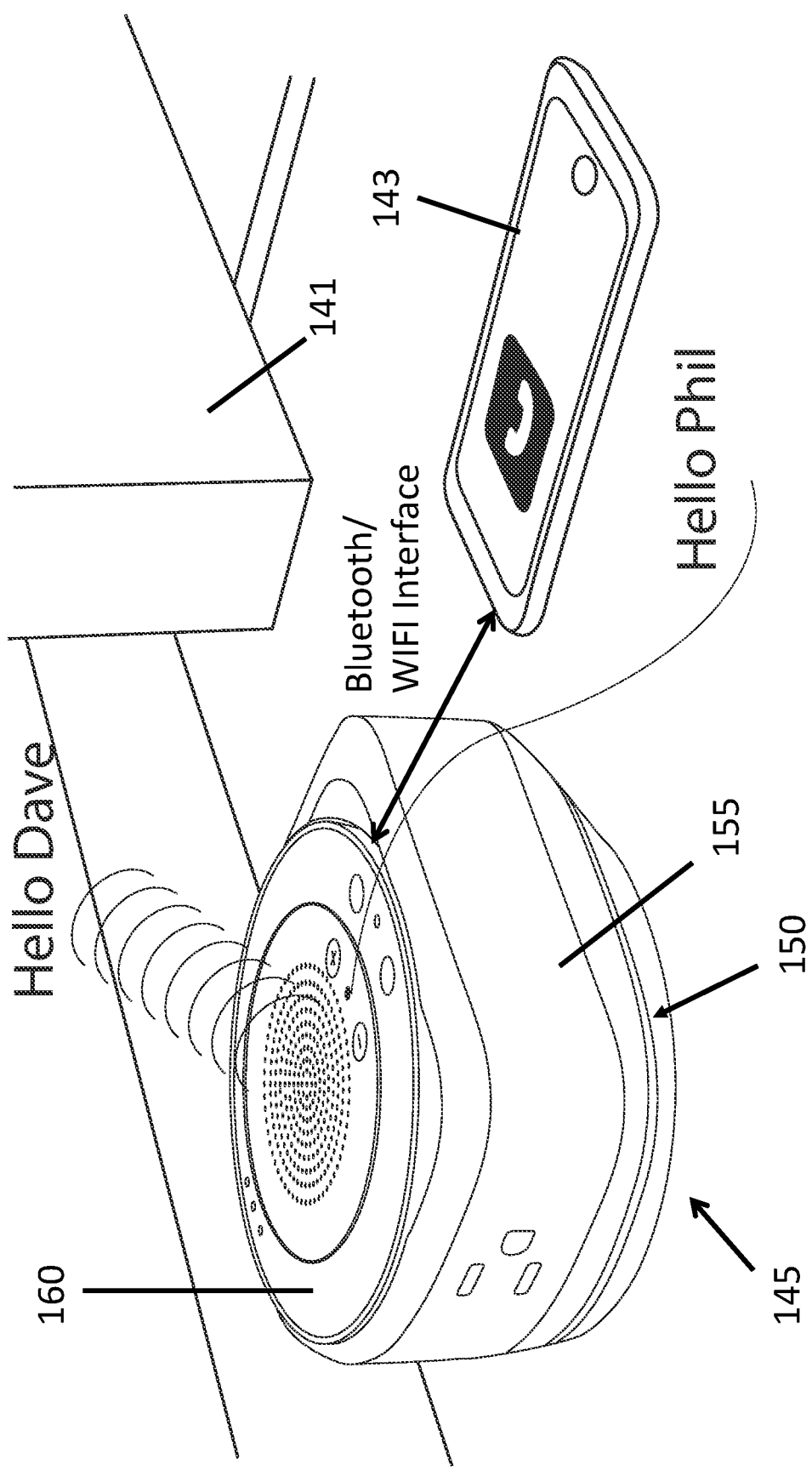
FIG. 30 is a perspective view of the portable electrical power supplying system of the present invention shown in FIGS. 21 through 27, illustrating the device operating in its Telephone Conference Mode of Operation with a smartphone device in wireless communication with the multi-function module over a Bluetooth wireless communication interface.

As shown in FIG. 26, the portable night-light/emergency illumination subsystem 201 comprises: the array of light emitting diodes (LEDs) 190 having different wavelength characteristics to produce illumination having different adjustable color temperatures at disclosed in U.S. Pat. No. 8,203,260 and patents cited therein (incorporated herein by reference), and being electrically connected to a LED driver circuitry mounted on the PC board 163, along with other components thereon, to drive the LEDs in a controlled manner to achieve the selected color temperature and intensity level; a photo-sensor 191 and related electronic circuitry on PC board 163 for detecting ambient illumination levels and generating analog or digital signals corresponding to the detected ambient illumination levels; a light conducting pipe structure (e.g. Lucite block or panel) into which light emitted from the LED array 190 is injected and travels through the light pipe structure 192 and exits at locations treated (e.g. pitted) to cause light leakage in the manner similar to the way light emitting panels are commonly constructed; optionally, a lens structure employing refractive, diffractive and/or reflective principles, for shaping the light beam emitted from the LED array 190 to meet the design requirements for a night-light as illustrated in FIG. 29, and also a projection light useful during emergency situations involving electrical power interruptions, as illustrated in FIG. 30; and a system-on-a-chip (SOC) 194 mounted on the PC board 163 for implementing the various subsystems supported within the compact housing of the multi-function module 160.

In the illustrative embodiment, the SOC 194 is programmed to support the control of the LED driving circuitry controlling (i) the intensity of illumination generated in from the LEDs 190 in response to ambient lighting conditions detected by photo-sensor 191, and any mode and light color temperature selection controls 171 that may have been activated or selected by way of an computer (e.g. web-based or native) application running on a smartphone 143 in communication with the device via the wireless Bluetooth wireless interface 204 or WIFI wireless interface 204 supporting TCPIP and packet communications with the subsystem controller 205 and its SOC 194, (ii) the color spectral characteristics and thus the color temperature of the illumination produced from driven LEDs having different characteristic wavelengths, and (iii) the spatial illumination pattern produced by certain LEDs in the array 190 selected for activation to generate the desired spatial illumination pattern (e.g. wide angle pattern, narrow pattern, etc.).

As shown in FIG. 26, the telephone conference subsystem 202 housed in the portable compact module 161 comprises: audio loudspeaker 165 interfaced with the subsystem 202, for reproducing the audio voice signals detected by the mobile smartphone 143 wirelessly interfaced with the telephone conference subsystem 202 by way of the wireless Bluetooth interface 204 or WIFI interface 204 supported by the multi-function module 160; microphone 175 having a wide audio pickup pattern and interfaced with the subsystem 202 for picking up voice and other sound patterns and generating corresponding electrical signals that are transmitted to the telephone conference subsystem 202 for signal processing in accordance with standard protocols used in the digital telephony industry; and the system-on-a-chip (SOC) 194 mounted on the PC board 163, and programmed to support telephone conferencing among the smartphone device 143 establishing a wireless connection with the multi-function module 160 by way of a wireless Bluetooth interface connection 204, or a wireless WIFI interface connection 204, supported between the smartphone 143 and the multi-function module 160, as illustrated in FIGS. 26 and 28.

FIG. 27 shows an exemplary subsystem architecture for implementing the portable electrical power supplying system 145 illustrated in FIG. 26. As shown, this subsystem architecture comprising: a multi-core CPU (optionally with a GPU) 181 mounted on the PC board 163 for running an operating system (e.g. Linux) and executing program code; program memory (RAM) 182 mounted on the PC board 163 for storing programs and executing the same; video memory (VRAM) 183 mounted on the PC board 163 for buffering frames of video graphics data during video processing operations; a solid-state (RAM) hard drive 184 mounted on the PC board 163 for storing persistent data including video data frames; a LCD/Touch-screen display panel 180 for displaying the state of modes, data relating to each mode, and information pertaining the state of operation of the system during a particular mode, and optionally implementing the various user controls supported by the system device 145 (e.g. mountable within the top surface of the device); the micro-phone 175 for detecting sound patterns and generating electrical signals corresponding thereto and supplying the same to the CPU (i.e. programmed microprocessor) for digital signal processing; the audio transducer (e.g. loudspeaker) 165 for reproducing sound in response to electrical audio signals produced by D/A circuitry under the control of the programmed microprocessor; and WIFI/Bluetooth network adapters 185 and associated antenna structures for supporting the wireless Bluetooth interface 204 and the WIFI interface 204 illustrated in FIG. 26, wherein each of these major components are integrated with one or more bus architecture supporting controllers and the like.

Having described the hardware and software architecture of the portable electrical power supplying system 145 illustrated in FIG. 26, it is appropriate at this juncture to describe the many different functions supported by the device 145, and its module 160, in both local and remote system configurations.

Referring to FIG. 28, the portable electrical power supplying system 145 depicted in FIGS. 21 through 27, is shown operating in its Music Streaming Mode of Operation with smartphone device 143 arranged in wireless communication with the "docked" multi-function module 160 over a Bluetooth wireless communication interface/connection 204. In this mode of operation, the device is configured in its Music-Streaming Mode of Operation while the multi-function module 160 is located in its module docking receptacle 156, as shown. The device 160 is activated into its Music-Streaming Mode of Operation by selecting this mode (e.g. indicated by a musical note symbol/icon) from the Mode Controls 168, while the smartphone device 143 is configured with its music application (e.g. iTunes on IOS Apple iPhone device) running on its computing subsystem shown in FIG. 26. Once the device 160 is configured into this mode, the method of delivering an audio reproduction of a music recording playing back on a portable mp3 music player (e.g. Apple iPhone® smartphone 143 running an iTunes music application) can be performed by its users as described in the flow chart of FIGS. 29A and 29B.

FIG. 29 describes the steps performed during the method of delivering an audio reproduction of a music recording playing back on a portable mp3 music player (e.g. running on a smartphone) 143 using a multi-function module 145 and the smartphone 143 arranged in wireless communication therewith and operated in accordance with the principles of the present invention. As shown, the method comprises the steps: (a) providing the multi-function module comprising a module docking station with a module docking receptacle for retaining therein a multi-function module 160 including a computing subsystem and a loudspeaker for producing audible sound including music, and supporting at least one of a music playback mode, a telephone conferencing mode, and a night-light illumination mode while the module is docked in the module-docketing cavity 156, and at least one of a music playback mode, telephone conferencing mode, a night-light illumination mode and a battery charging mode while the multi-function module 160 is un-docked from the module-docketing cavity 156; (b) installing the portable electrical power supplying system 145 in an environment supporting one or more AC and DC electrical power consuming devices; (c) configuring the multi-function module 160 in the module docking receptacle 156; (d) selecting the music playback mode in the multi-function module 160, and setting up a wireless Bluetooth interface connection with the smartphone; (e) operating the portable mp3 music player so as to play back a music recording running on the smartphone, and sending digital signals from the smartphone (over the wireless interface connection) to the multi-function module 160; and (f) the multi-function module 160 receiving and processing the digital signals and producing an audio reproduction of the music recording playing back on the portable mp3 music player 143, through the loudspeaker 165 mounted in the multi-function module 160.

Referring to FIG. 30, the portable electrical power supplying system 145 shown in FIGS. 21 through 27, has its multi-function module 160 operating in its Teleconference Mode of Operation with a smartphone device 143 in wireless communication with the portable electrical power supplying system 160 over a Bluetooth wireless communication interface 204. In this mode of operation, the device 160 is configured in its Teleconference Mode of Operation while the multi-function module 160 is installed/docked in its module docking receptacle 156, as shown. The module (i.e. device) 160 is activated into its Teleconference Mode of Operation by selecting this mode (e.g. indicated by a phone/teleconference symbol/icon) from the Mode Controls 168, while the smartphone device (e.g. Apple iPhone 6+) 143 is configured with its IOS phone application running, as shown in FIG. 26. Once the device 160 is configured into this mode, the method of conducting a teleconference initiated on the smartphone 143 can be performed by its user(s) as described in the flow chart of FIG. 31.

Figure 31:
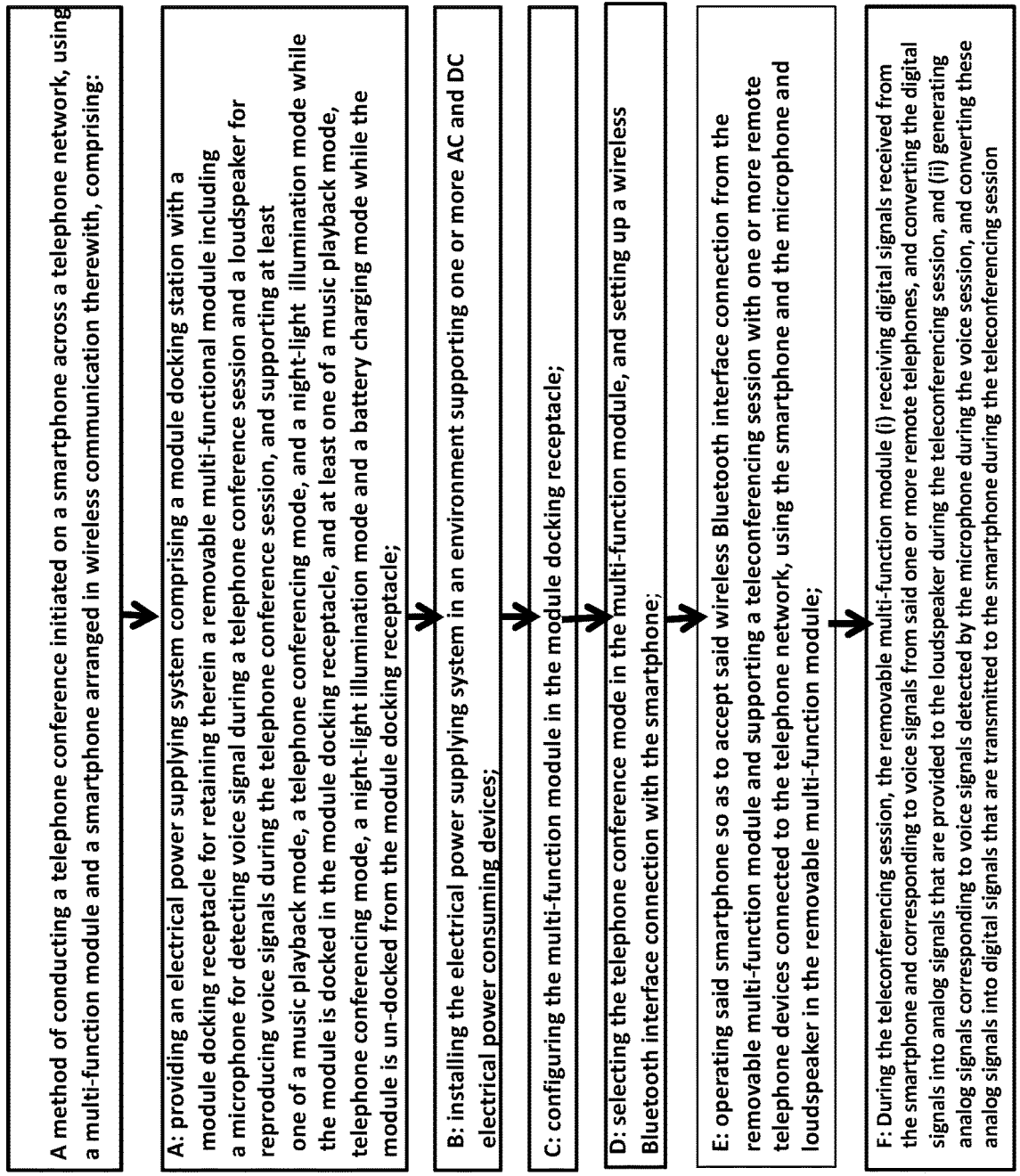
FIG. 31 provides a flow chart describing the steps performed during the method of conducting a telephone conference (i.e. teleconference) initiated on a smartphone using a multi-function module and the smartphone arranged in wireless communication therewith and operated in accordance with the principles of the present invention.

FIG. 31 describes the steps performed during the method of conducting a teleconference initiated on a smartphone across a telephone network, using a multi-function module 145 and the smartphone 143 arranged in wireless communication therewith and operated in accordance with the principles of the present invention, comprising: (a) providing a electrical power supplying system 145 comprising a module docking station 157 with a module docking receptacle 156 for retaining therein an multi-function module 160 including a microphone 175 for detecting voice signal during a teleconference session and a loudspeaker 165 for reproducing voice signals during the teleconference session, and supporting at least one of a music playback mode, a telephone conferencing mode, and a night-light illumination mode while the multi-function module 160 is docked in the module docking receptacle 156, and at least one of a music playback mode, telephone conferencing mode, a night-light illumination mode and a battery charging mode while the module multi-function 160 is un-docked from the module docking receptacle 156; (b) installing the portable electrical power supplying system 145 in an environment supporting one or more AC and DC electrical power consuming devices; (c) configuring the multi-function module 160 in the module docking receptacle 156; (d) selecting the teleconference mode in the multi-function module 160, and setting up a wireless Bluetooth interface connection 204 with the smartphone 143; (e) operating said smartphone 143 so as to accept said wireless Bluetooth interface connection 204 from the multi-function module 160 and supporting a telephone conferencing session with one or more remote telephone devices connected to the telephone network, using the smartphone 143 and the microphone 175 and loudspeaker 165 in the multi-function module 160; and (f) during the telephone conferencing session, the multi-function module 160 (i) receiving digital signals received from the smartphone 143 and corresponding to voice signals from the one or more remote telephones, and converting the digital signals into analog signals that are provided to the loudspeaker 165 during the teleconferencing session, and (ii) generating analog signals corresponding to voice signals detected by the microphone 175 during the voice session, and converting these analog signals into digital signals that are transmitted to the smartphone 143 during the telephone conferencing session.

Figure 32:
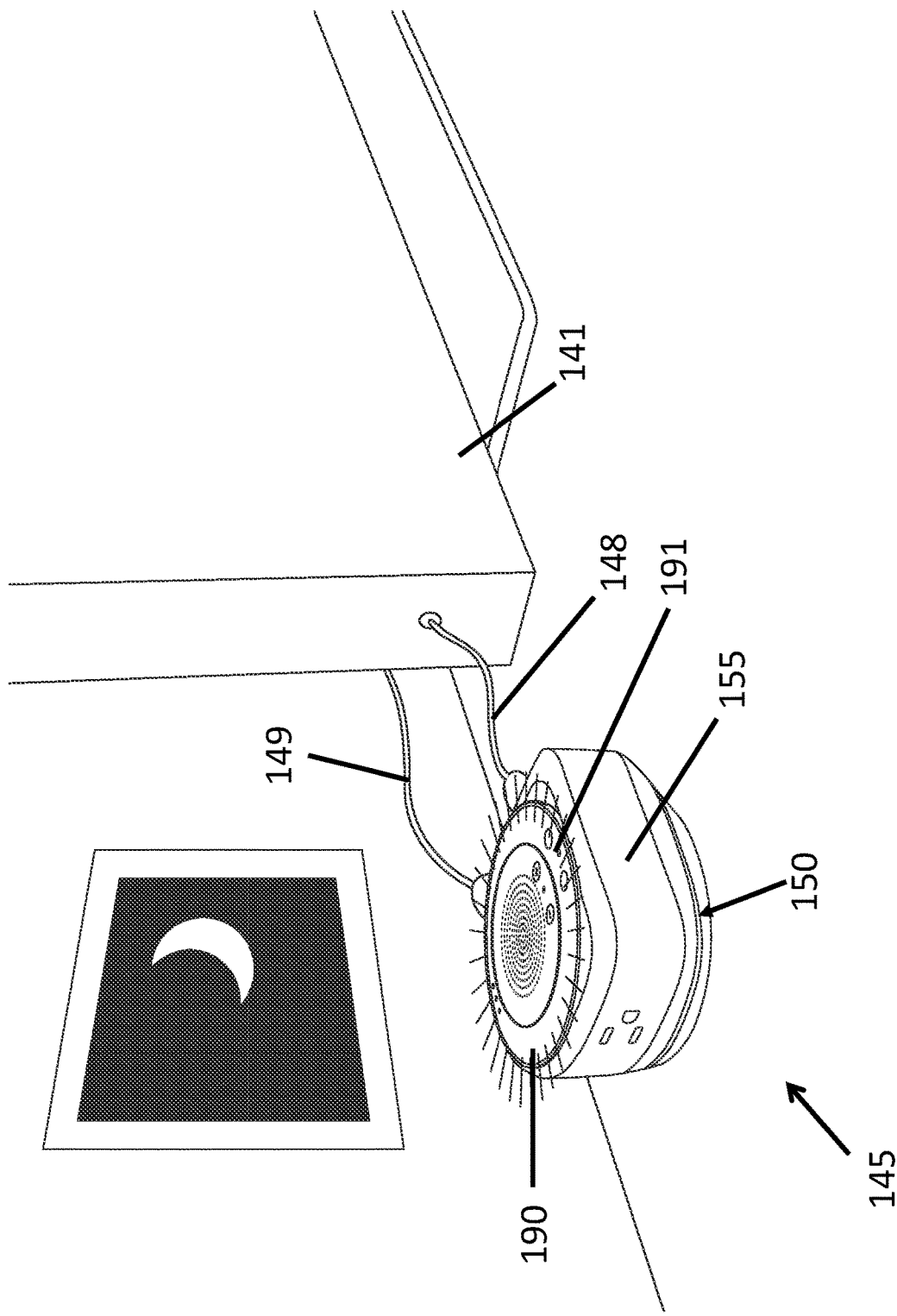
FIG. 32 is a perspective view of the portable electrical power supplying system of the present invention shown in FIGS. 21 through 27, illustrating the device operating in its Night-Lite Mode of Operation while low light levels are being detected in the ambient environment.

FIG. 32 is a perspective view of the electrical power supply system of the present invention 145 shown in FIGS. 21 through 27, illustrating its multi-function module 160 operating in its Night-Lite Mode of Operation while low light levels are being detected in the ambient environment. In this mode of operation, the multi-function module 160 is configured in its Night-Time Mode of Operation while the multi-function module 160 is installed in its module docking receptacle 156, as shown. The multi-function module 160 is activated into its Night-Light (Illumination) Mode of Operation by the photo-sensor 191 in the multi-function module 160 automatically detecting that the ambient light level has dropped below a predetermined threshold, causing the sub-system controller 125 to drive the LED array 190 to produce a suitable field of illumination that provides night-lighting according to the user's selected preferences for color temperature, intensity etc. Upon powering up, the system 145 is driven into this mode (e.g. indicated by a half-moon symbol/icon) and the photo-sensor 19 in response to detected low light levels, the user can adjust the intensity and color temperature automatically senses the ambient light level in the environment and its associated circuitry detects when the sensed level falls below a predetermined threshold which can be adjusted by the user during a calibration mode. The method of illuminating an ambient environment at night-time using system 145 is described in the flow chart of FIG. 33.

Figure 33:
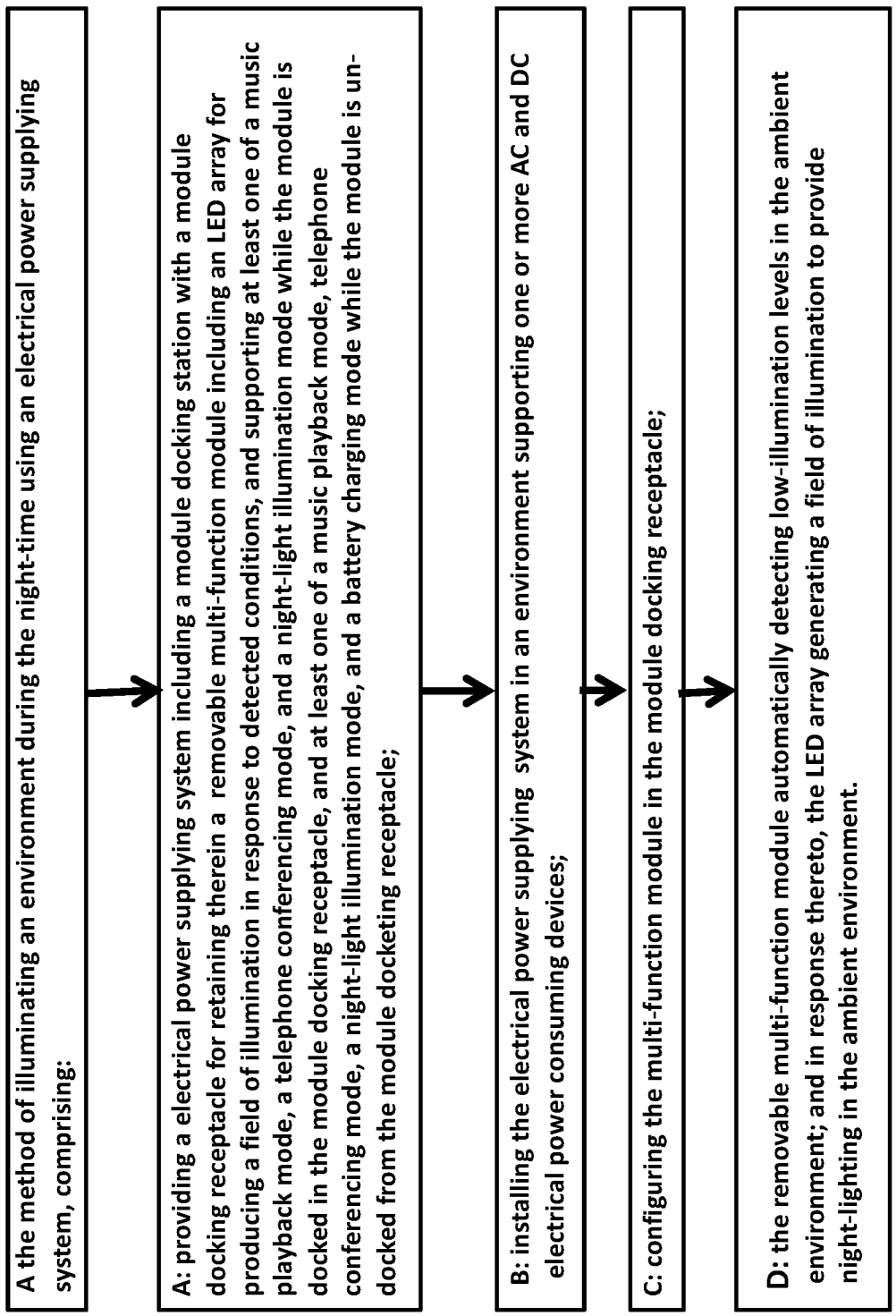
FIG. 33 is a flow chart describing the steps performed during the method of illuminating an ambient environment in a room using a multi-function module operated in accordance with the principles of the present invention.

As shown in FIG. 33, the method of illuminating an environment during the night-time using a multi-function module 145, comprises the steps of: (a) providing a electrical power supplying system comprising a module docking station 145 with a module docking receptacle 165 for retaining therein a multi-function module 160 including an LED array 190 for producing a field of illumination in response to detected conditions, and supporting at least one of a music playback mode, a telephone conferencing mode, and a night-light/emergency illumination mode while the module is docked in the module docking receptacle 156, and at least one of a music playback mode, telephone conferencing mode, a night-light illumination mode and a battery charging mode while the module is un-docked from the module docking receptacle 156; (b) installing the portable electrical power supplying system 145 in an environment supporting one or more AC and DC electrical power consuming devices; (c) configuring the multi-function module 160 in the module docking receptacle 145; and (d) the photo-sensor 191 in the multi-function module 160 automatically detecting low-illumination levels in the ambient environment, and in response thereto, the LED array 190 generating a field of illumination to provide night-lighting in the ambient environment.

Figure 34:
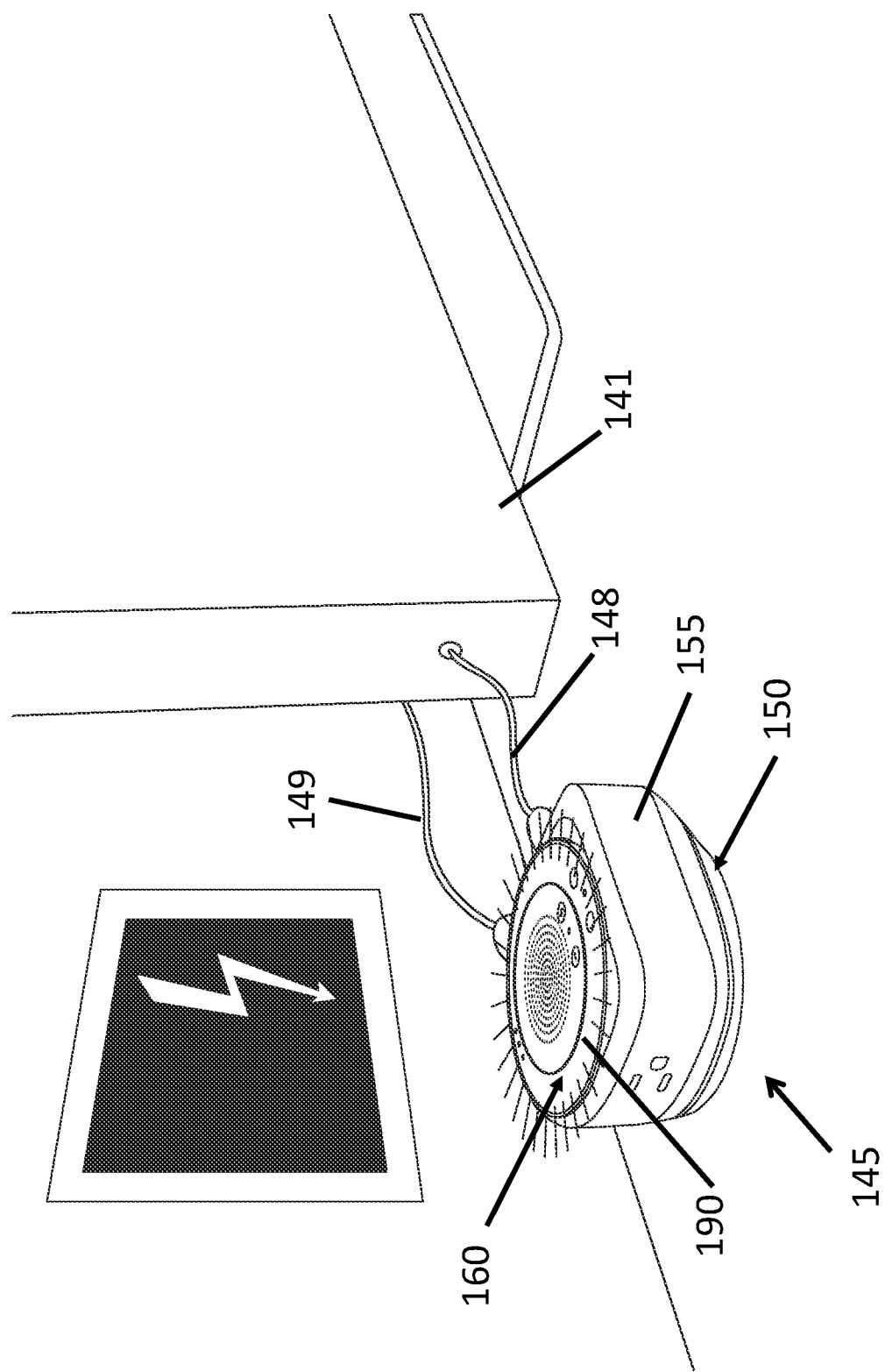
FIG. 34 is a perspective view of the portable electrical power supplying system of the present invention shown in FIGS. 21 through 27, illustrating the device operating in its Emergency-Lighting Mode of Operation while disruption of electrical input power is being detected.

Referring to FIG. 34, the portable electrical power supplying system 145 shown in FIGS. 21 through 27, has its the multi-function module 160 operating in its Emergency-Light Illumination Mode of Operation upon disruption of electrical input power is being detected by its internal sensing circuitry 25 within adapter 122 shown in FIG. 26A. Upon powering up, the system 145 is automatically configured in its Emergency Illumination Mode of Operation while the multi-function module 160 is docked in its module docking receptacle 156, as shown. During operation, the sensor 125 senses for line-voltage interruptions as shown in FIG. 26A. The method of emergency illumination is performed as described in the flow chart of FIG. 35.

As shown in FIG. 35, the method of illuminating an environment during detected emergency conditions (e.g. power line voltage interruption or power line failures) using the electrical power supplying system 145 comprises the following steps: (a) providing an electrical power supplying system 145 comprising a module docking station 157 with a module docking receptacle 156 for retaining therein a multi-function module 160 including an LED array 190 for producing a field of illumination in response to detected emergency conditions, and supporting at least one of a music playback mode, a telephone conferencing mode, and an emergency illumination mode while the multi-function module 160 is docked in the module-docketing cavity 156, and at least one of a music playback mode, telephone conferencing mode, a night-light illumination mode and a battery charging mode while the multi-function module 160 is un-docked from the module docking receptacle 156; (b) installing the portable electrical power supplying system 145 in an environment 140 supporting one or more AC and DC electrical power consuming devices; (c) configuring the multi-function module 160 in the module docking receptacle 156; (d) selecting the emergency illumination mode in the multi-function module 160; and (e) signal level sensing circuitry in the multi-function module 160 (or within the adapter 122) automatically detecting predefined emergency conditions (e.g. power line failure) in the ambient environment 140; and in response thereto, the LED array 190 generating a field of illumination to provide emergency lighting in the ambient environment 140.

Referring to FIG. 36, the portable electrical power supplying system 145 shown in FIGS. 21 through 27, has its multi-function module 160 operating in its Remote Music Streaming Mode of Operation during the day-time when ambient illumination conditions are bright, with the multi-function module 160 removed from the docking receptacle 156 of the module docking station 157, and located at a distance from a smartphone device 143 in wireless communication with the multi-function electrical power supply system 160 over a Bluetooth wireless communication interface 204. In this mode of operation, the device 160 is configured in its Remote Streaming Mode of Operation while the portable electrical power supplying system 160 is docked in the module docking receptacle 156, as shown. The multi-function module 160 is activated into its Remote Music Streaming Mode of Operation by selecting this mode (e.g. indicated by a musical notes symbol/icon) from the Mode Controls 168, while the smartphone device 143 is configured with its music player application, as shown in FIG. 26. Once the multi-function module 160 is configured into this mode, the method of remote music streaming can be performed by its users as described in the flow chart of FIG. 37.

Figure 37:
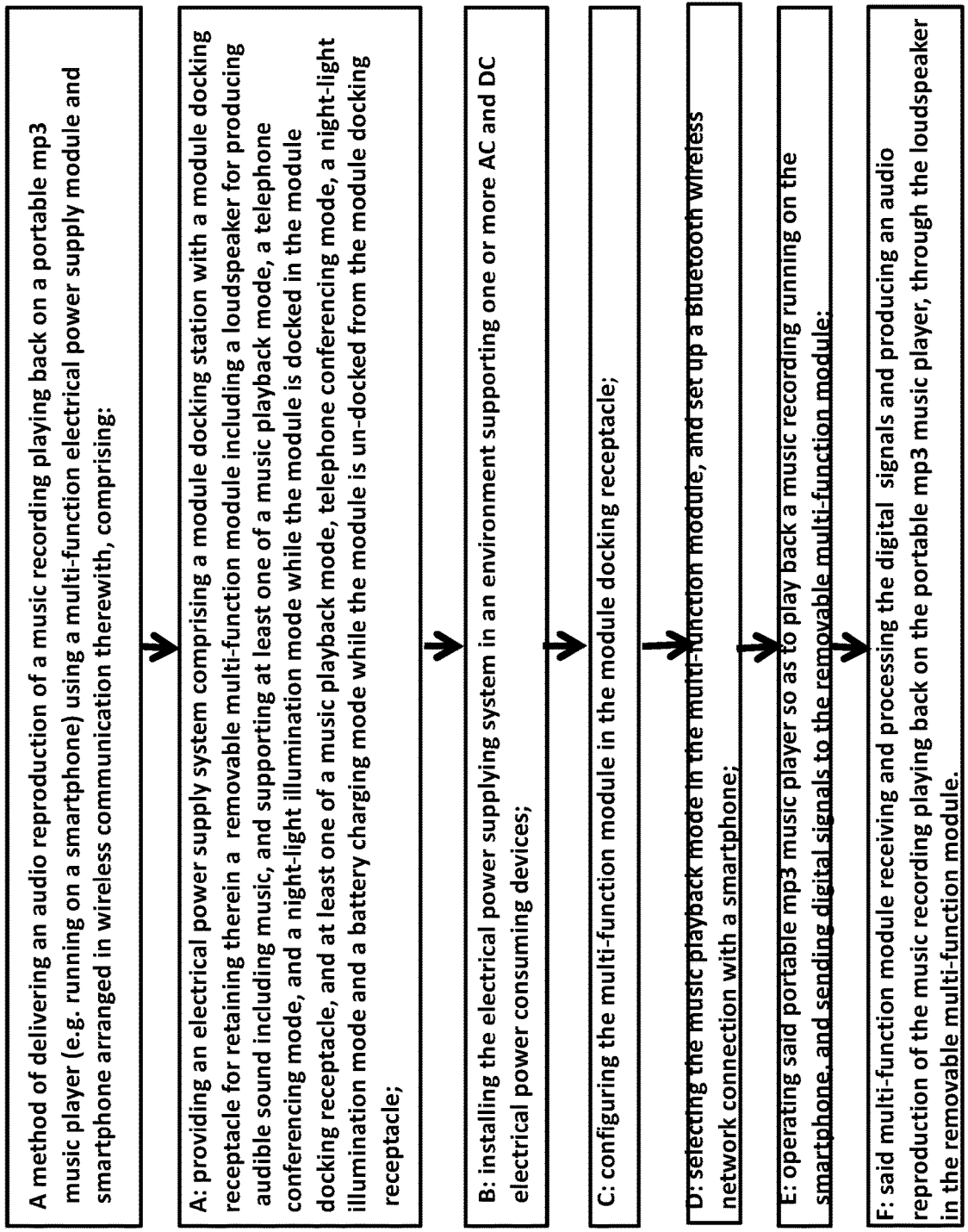
FIG. 37 is a flow chart describing the steps performed during the method of delivering an audio reproduction of a music recording playing back on a portable mp3 music player (e.g. running on a smartphone) using the multi-function module and smartphone arranged in wireless communication therewith and operated in accordance with the principles of the present invention.

FIG. 37 is a flow chart describing the steps performed during the method of delivering an audio reproduction of a music recording playing back on a portable mp3 music player (e.g. running on a smartphone 143) using a electrical power supplying system 145 and smartphone 143 arranged in wireless communication therewith and operated in accordance with the principles of the present invention, comprising: (a) providing an electrical power supplying system 145 comprising a module docking station 157 with a module docking receptacle 156 for retaining therein a multi-function module 160 including a loudspeaker 165 for producing audible sound including music, and supporting at least one of a music playback mode, a telephone conferencing mode, and a night-light illumination mode while the multi-function module 160 is docked in the module docking receptacle 156, and at least one of a music playback mode, telephone conferencing mode, a night-light illumination mode and a battery charging mode while the multi-function module 160 is un-docked from the module docking receptacle 156; (b) installing the portable electrical power supplying system 145 in an environment 140 supporting one or more AC and DC electrical power consuming devices; (c) configuring the multi-function module 160 outside the module docking receptacle 156; (d) selecting the music playback mode in the multi-function module 160, and setting up a wireless Bluetooth interface connection with the smartphone; (e) operating the portable mp3 music player 143 so as to play back a music recording running on the smartphone 143, and sending digital signals from the smartphone (over the wireless interface connection) to the multi-function module 160; and (f) the multi-function module 160 receiving and processing the digital signals and producing an audio reproduction of the music recording playing back on the portable mp3 music player, through the loudspeaker 165 mounted in the multi-function module 160.

Referring to FIG. 38, the portable electrical power supplying system 145 shown in FIGS. 21 through 27, has its multi-function module 160 operating in both its Remote Music Streaming Mode of Operation and Night-Lighting Mode of Operation during the night-time when ambient illumination conditions are low or dim, wherein the multi-function module 160 is removed from the module docking receptacle 156 of the module docking station 157, and located at a distance from a smartphone device 143 in wireless communication with the multi-function module 160 over a Bluetooth wireless communication interface 204, while the smartphone 143 streams music signals to the multi-function module 160 while its illumination subsystem generates night lighting under low illumination levels detected in the ambient environment. In this mode of operation, the multi-function module 160 is configured in its Remote Music Streaming/Night-Lighting Mode of Operation while the multi-function module 160 is removed from its module docking receptacle 156, as shown. The multi-function module 160 is activated into its Remote Music Streaming/Night-Lighting Mode of Operation by selecting this mode (e.g. indicated by a musical note and half moon symbol/icon) from the Mode Controls 168, while the smartphone device 143 is configured with module 160 as shown in FIG. 26. Once the multi-function module 160 is configured into this mode, the method of music delivery and night-lighting can be performed by its users as described in the flow chart of FIG. 39.

Figure 39:
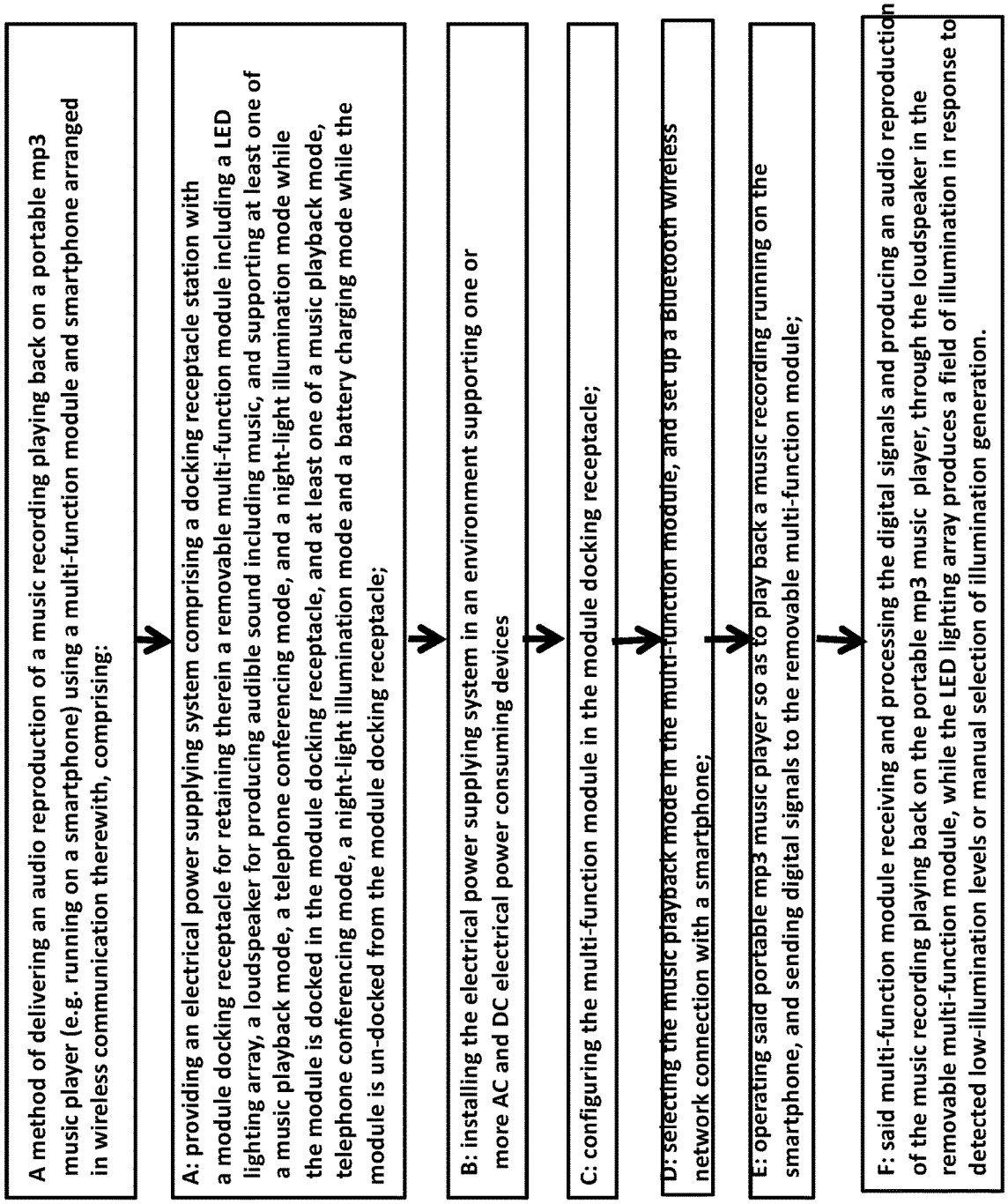
FIG. 39 is a flow chart describing the steps performed during the method of delivering an audio reproduction of a music recording playing back on a portable mp3 music player (e.g. running on a smartphone) while illuminating the ambient environment using a multi-function module and smartphone arranged in wireless communication therewith and operated in accordance with the principles of the present invention.

FIG. 39 is a flow chart describing the steps performed during the method of delivering an audio reproduction of a music recording playing back on a portable mp3 music player (e.g. running on a smartphone 143) while illuminating the ambient environment using an electrical power supplying system 145 and smartphone 143 arranged in wireless communication therewith and operated in accordance with the principles of the present invention, comprising: (a) providing a electrical power supplying system 145 comprising a module docking station 157 with a module docking receptacle 156 for retaining therein a multi-function module 160 including an LED lighting array 190, and a loudspeaker 165 for producing audible sounds including music, and supporting at least one of a music playback mode, a telephone conferencing mode, and a night-light illumination mode while the module is docked in the module-docking receptacle 156, and at least one of a music playback mode, telephone conferencing mode, a night-light illumination mode and a battery charging mode while the multi-function module 160 is un-docked from the module docking receptacle 156; (b) installing the multi-function module 145 in an environment 140 supporting one or more AC and DC electrical power consuming devices; (c) configuring the multi-function module 160 outside the module docking receptacle 156; (d) selecting the music playback mode and night-light illumination mode in the multi-function module 160, and setting up a wireless Bluetooth interface connection 204 with the smartphone 143; (e) operating said portable mp3 music player so as to playback a music recording running on the smartphone 143, and sending digital signals from the smartphone 143 (over the wireless interface connection 204) to said multi-function module 160; and (f) the multi-function module 160 receiving and processing the digital signals and producing an audio reproduction of the music recording playing back on the portable mp3 music player, through the loudspeaker 165 mounted in the multi-function module 160, while the LED light array 190 produces a field of illumination in response to detected low-illumination levels or manual selection of illumination generation.

Figure 40B:
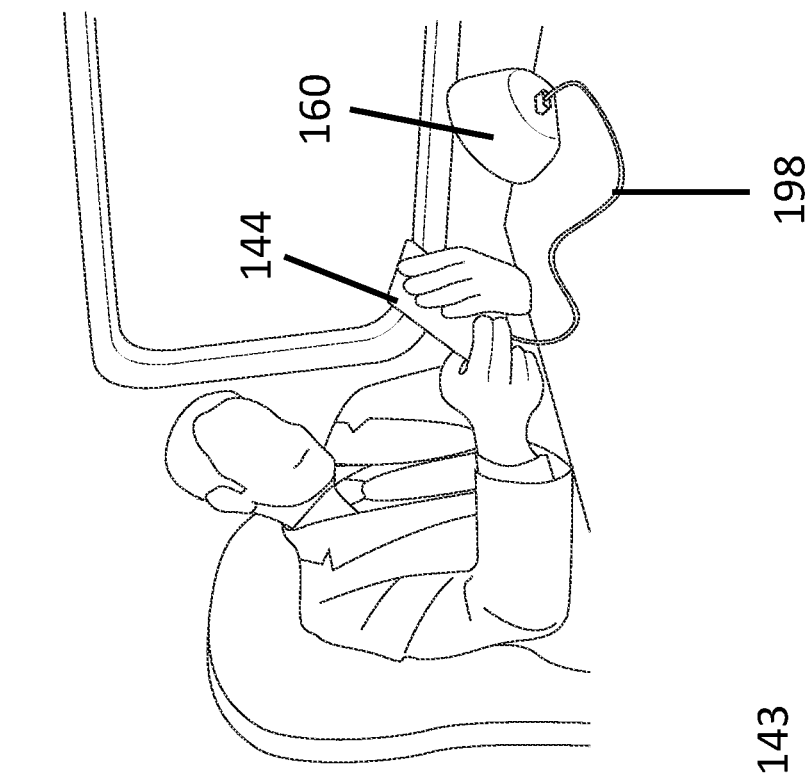
FIG. 40B is a perspective view of the multi-function module of the present invention shown in FIGS. 21 through 27, illustrating the multi-function module operating in both its Battery Power Supplying Mode of Operation, wherein the portable electrical power supplying system is removed from the docking receptacle of its module docking station, and the smartphone device is connected to the portable electrical power supplying system using USB cable, and recharged with electrical power supplied from the battery storage module within the electrical power supplying system.
Figure 40A:
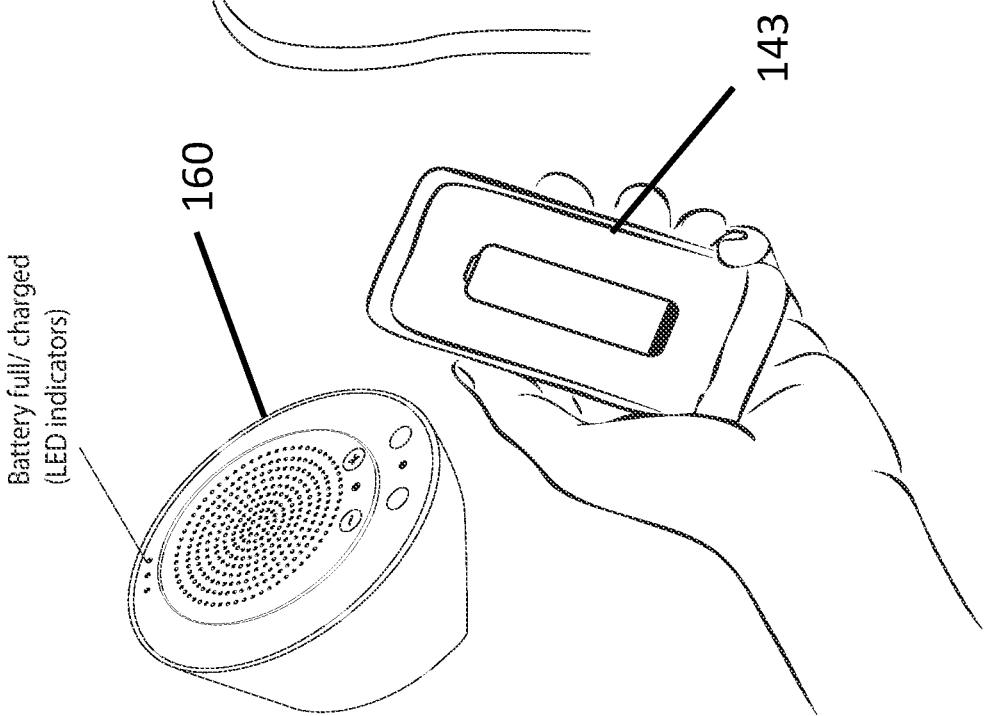
FIG. 40A is a perspective view of the portable electrical power supplying system of the present invention shown in FIGS. 21 through 27, wherein the multi-function module is removed from the module docking receptacle of the module docking station, and low battery level indications are displayed on the LCD screen of a smartphone device.

Referring to FIG. 40A, the portable electrical power supplying system 145 shown in FIGS. 21 through 27, has its multi-function module 160 operating in both its Battery Power Supplying Mode of Operation, wherein the multi-function module 160 is removed from the docking receptacle 156 of its base docking station 157, and in response to low battery level indications displayed on the LCD screen of a smartphone device 143, the smartphone device is connected to the portable electrical power supplying system 160 using USB cable 198, and recharged with electrical power supplied from the battery storage module 170 within the multi-function module 160. In this mode of operation, the device is configured in its Battery Power Recharging Mode of Operation while the multi-function module 160 is removed from its module docking receptacle 156, as shown in FIG. 40B. The multi-function module 160 is activated into its Battery Power Recharging Mode of Operation by the user selecting this mode (e.g. indicated by a battery charging symbol/icon) from the Mode Controls 168, typically in response to smartphone device 143 visually indicating that the battery power level has fallen below a certain threshold, as illustrated in FIG. 40A indicating that recharging is needed or required. Once the multi-function module 160 is configured into this Battery Recharging mode, the method of charging the batteries within the battery consuming device can be performed by its users as describe in the flow chart of FIG. 41.

FIG. 41 is a flow chart describing the steps performed during the method of charging a portable DC electrical energy consuming device (e.g. smartphone) using a multi-function module 160 and smartphone 143 arranged in wireless communication therewith and operated in accordance with the principles of the present invention, comprising: (a) providing an electrical power supplying system comprising a module docking station 157 with a module docking receptacle 156 for retaining therein a multi-function module 160 including an LED array 190 for producing a field of illumination in response to detected conditions, and supporting at least one of a music playback mode, a telephone conferencing mode, and a night-light illumination mode while the module is docked in the module docking receptacle 156, and at least one of a music playback mode, telephone conferencing mode, a night-light illumination mode and a battery charging mode while the module is un-docked from the module-docking receptacle 156; (b) installing the portable electrical power supplying system 145 in an environment supporting one or more AC and DC electrical power consuming devices; (c) configuring the multi-function module 160 in the module docking receptacle; (d) selecting the night-light illumination mode in the multi-function module 160; and (e) the multi-function module automatically detecting low-illumination levels in the ambient environment; and in response thereto, the LED array generating a field of illumination to provide night-lighting in the ambient environment.

Figure 42:
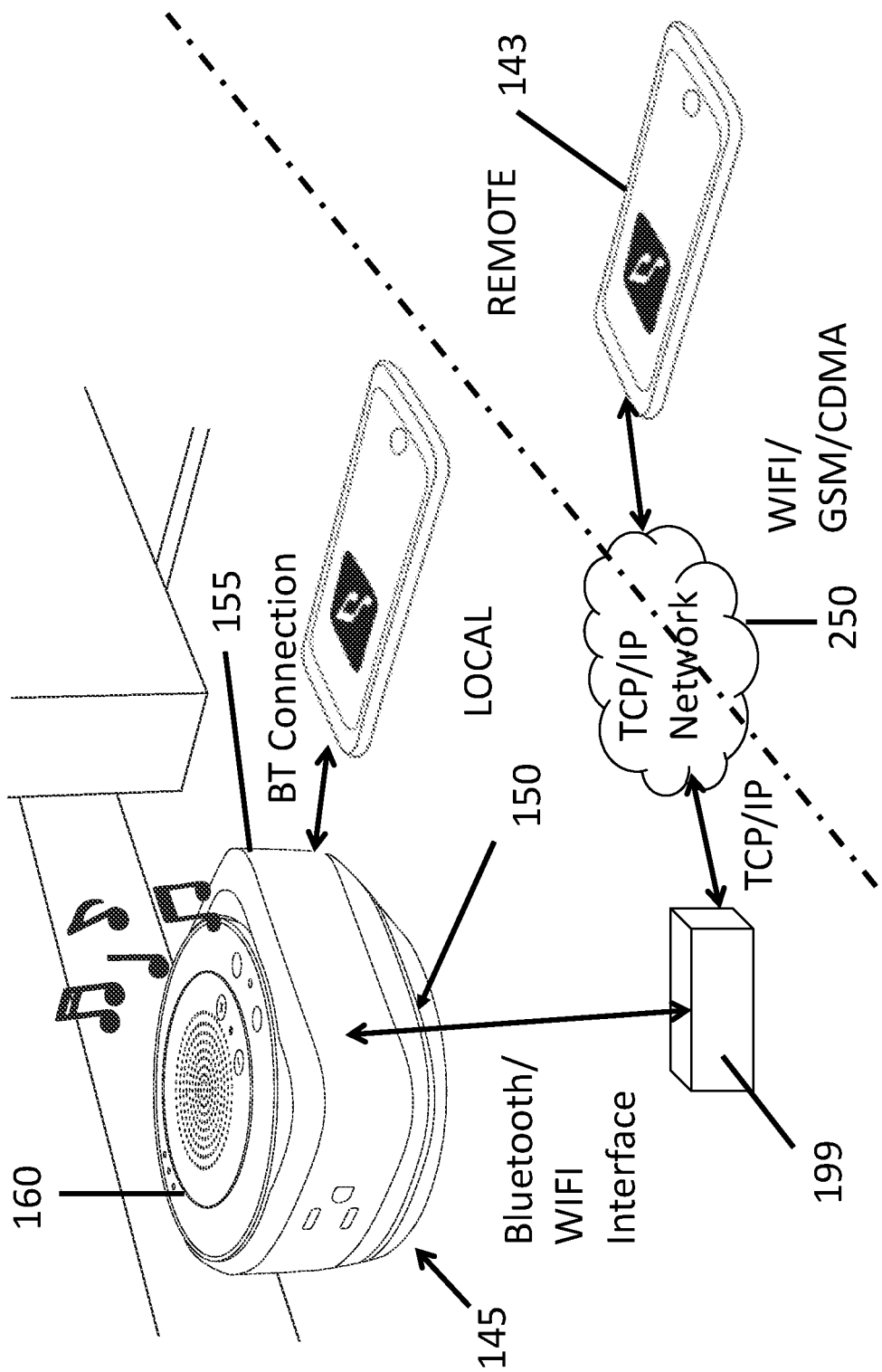
FIG. 42 is a perspective view of the portable electrical power supplying system of the present invention shown in FIGS. 21 through 27, illustrating the device operating in its Remote Control Mode of Operation with a smartphone device in wireless communication with the portable electrical power supplying system over a Bluetooth wireless communication interface.

FIG. 42 is a perspective view of the portable electrical power supplying system 145 of the present invention shown in FIGS. 21 through 27, illustrating the system operating in its Remote Control Mode of Operation with a smartphone device 143 in wireless communication with the portable electrical power supplying system 145 over a Bluetooth wireless communication interface. In this mode of operation, the device is configured in its Remote Control Mode of Operation while the multi-function module 160 is inserted within its module docking receptacle 156, as shown. The system 145 is activated into its Remote Control Mode of Operation by selecting this mode (e.g. indicated by a battery charging symbol/icon) from the mode controls 168, while the smartphone device 143 is configured with module 160 as shown in FIG. 26. Alternatively, the remote control Mode can be selected over a TCP/IP connection between the multi-function module 160 and an Internet-enabled computing device running a web-based or native application with GUIs for setting the mode of operation of the multi-function module 160, and its various settings. Once the system 145 is configured into this mode, the method of remotely controlling the portable electrical power supplying system 145, including its integrated music player, night/emergency lighting subsystem, and AC and DC electrical power supplying receptacles 114A, 114B and 114C and 115A and 115B, respectively, can be performed by its users as described in the flow chart of FIG. 43.

Figure 43:
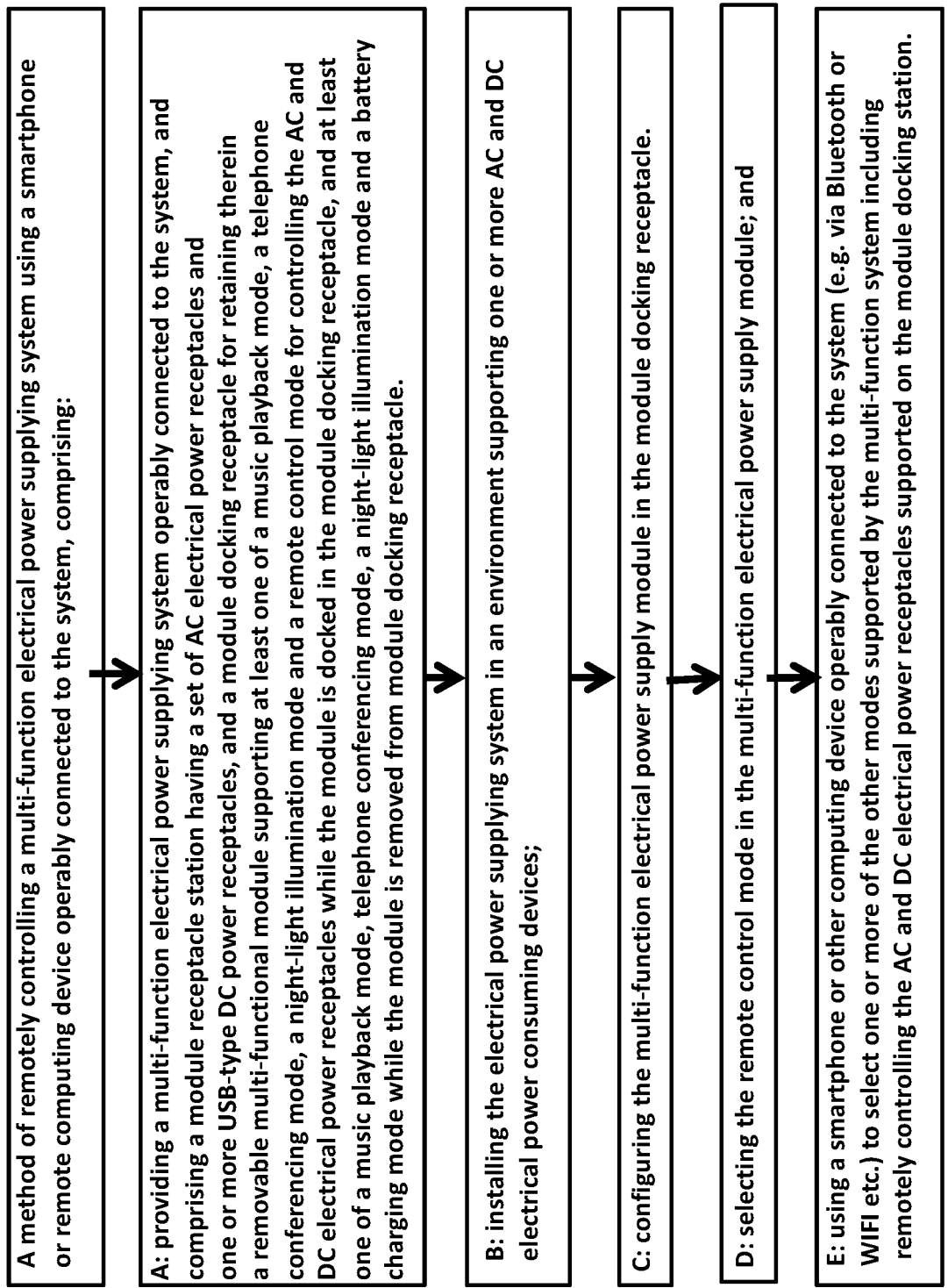
FIG. 43 is a flow chart describing the steps performed during the method of remotely controlling an electrical power supplying system of the present invention shown in FIGS. 21 through 27, using smartphone or remote computing device operably connected to the system, by way of a local wireless Bluetooth or other data connection or through the infrastructure of the Internet, and controlled in accordance with the principles of the present invention.

FIG. 43 describes the steps performed during the method of remotely controlling an electrical power supplying system 145 shown in FIGS. 21 through 27, using a smartphone 143 or remote computing device operably connected to the TCP/IP infrastructure of the Internet 250 and controlled in accordance with the principles of the present invention. As shown, the method comprises: (a) providing a multi-function module 145 operably connected to the TCP/IP infrastructure of the Internet 250 by way of a IP packet router 199, and comprising a base docking station 157 having a set of AC electrical power receptacles 114A through 114C and one or more USB-type DC power receptacles 115A and 115B, and a module docking receptacle 156 for retaining therein a multi-function module 160 supporting at least one of a music playback mode, a telephone conferencing mode, a night-light illumination mode and a remote control mode for controlling the AC and DC electrical power receptacles while the multi-function module 160 is docked in the module docking receptacle 156, and at least one of a music playback mode, telephone conferencing mode, a night-light illumination mode and a battery charging mode while the multi-function module 160 is un-docked (i.e. removed) from the module-docking receptacle 156; (b) installing the multi-function module 145 in an environment 140 supporting one or more AC and DC electrical power consuming devices 142, 143 and 144; (c) configuring the multi-function module 160 in the module docking receptacle 156; (d) selecting the remote control mode in the multi-function module 160; and (e) using a smartphone 143 or other computing device operably connected to the TCP/IP infrastructure of the Internet to select one or more of the other modes supported by the multi-function module including remotely controlling the AC and DC electrical power receptacles 114A-114C and 115A-115B supported on the base docking station 157.

The remote smartphone 143 will typically support a remote control application running on its computing subsystem for providing GUI screens that allow the user to select which modes and features of the portable electrical power supplying system 145 should be remotely controlled, such as activating certain AC electrical power receptacles to activate lights or other power consuming devices, while deactivating other AC electrical power receptacles to deactivate lights or other consuming devices. Using such a remote control application on the remotely situated smartphone, the user can simply select the particular electrical power supplying system 145 to the remote controlled by its IP address which is typically assigned by a DHCP server running on the local network where the multi-function device is installed and deployed.

Figure 44:
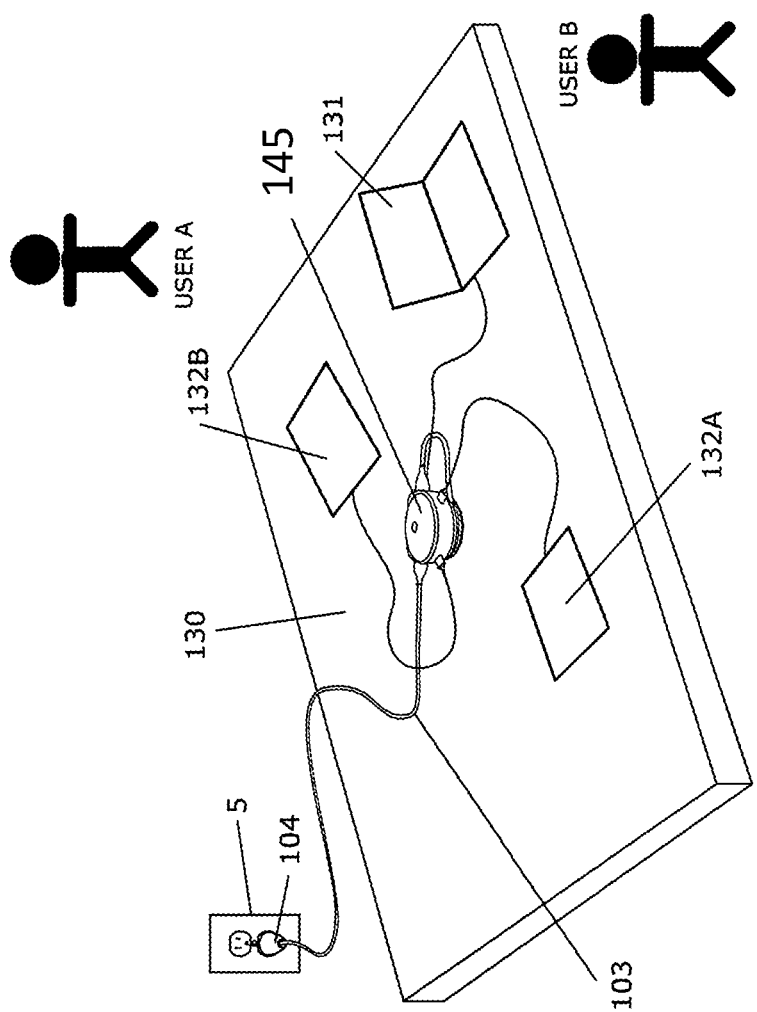
FIG. 44 is a perspective view showing two users sitting on the same side of a library tabletop surface, on which are supported a pair of laptop computers and a pair of USB-powered iPad appliances, each sharing electrical power from the portable electrical power supplying system shown in FIGS. 19 through 43, with power cords wound in a second configuration about the storage spools of the external power cord storage compartments of the device.

As shown in FIG. 44, the portable electrical power supplying system 145 is being used by several users using mobile computing devices 132A, 132B and 131. At any time, the multi-function module 160 can be used in its module docking station 157 to provide the various functions described above and illustrated in FIGS. 28 through 35. The multi-function module 160 may also be used to support the function illustrated in FIGS. 42 and 43 and described above. Alternatively, the multi-function module 160 can be removed from its module docking station 157 and then used in any of the functions illustrated in FIGS. 36 through 41. Other uses will become apparent hereinafter in view of the present invention disclosure.

Alternative Embodiments of the Portable Electrical Power Supplying System of the Present Invention While the illustrative embodiment of the portable multi-function disclosed herein supports multiple functions (i.e. teleconferencing, music streaming, nigh-lite/emergency illumination, DC power supplying, and various combinations thereof), it is understood that alternative embodiments of the present invention include the provision, docking and use of portable plug-in type function modules that may support as little as a single function, as will be discussed in greater detail below.

In the third illustrative embodiment described above, the multi-function module 160 was provided with a number of subsystems to support various kinds of subsystem functions once enabled or activated either automatically, or manually, as the case may be. Using a single plug-in type multi-function module 160, described in detail above, which is dockable (i.e. plugin-able) within its module docking receptacle 156, users are provided with WI-FI, Bluetooth and/or 3G/4G controlled portable AC and DC power ports and external power cord management at the docking station 157, and numerous other functions including: an auto night light & emergency back-up light during a power outage; a WI-FI or 4G controlled smart AC and DC power outlets; a Bluetooth (BT) speaker for streaming audio from music to news to podcasts; a Bluetooth speakerphone and microphone for hands-free or telephone conference calls; and a mobile back-up battery for charging ones mobile, phone or tablet computer, and the like.

An alternative embodiment of the present invention illustrated in FIGS. 19, 20, 21, 21A, 21B, 23A-23C, 24A-24B, and 28-44, in particular, will include the portable electrical power supplying system 145 slightly modified or readily adapted to provide a portable electrical power supplying system 145' comprising (i) a module docking station 157 as described above, and (ii) a set of two or more plug-in type portable function modules 160'. In such alternative embodiments of the present invention, each plug-in type portable function module 160' embodies one or more subsystems described above so as to support one or more of the following functions: WI-FI, Bluetooth and/or 3G/4G controlled portable AC and DC power ports, external power cord management, and numerous functions including: an auto night light & emergency back-up light during a power outage; a WI-FI or 4G controlled smart AC and DC power outlets; a Bluetooth (BT) speaker for streaming audio from music to news to podcasts; a Bluetooth speakerphone and microphone for hands-free or telephone conference calls; and a mobile back-up battery for charging ones mobile, phone or tablet computer, and the like.

In such alternative embodiments, each portable function module 160' may support only a single function, providing a single-function module 160', and users can choose which single-function modules 160' that wish to plug-into the module docking receptacle 157 of the system 145'. Further, some of the plug-in type function modules 160 may support two or more functions, providing multi-function modules 160" that can be used with the docketing station 157 of the system 145'. These and other variations and modification of the present invention will come to mind in view of the present invention disclosure.

Some Modifications that Readily Come to Mind

In the event that significant electromagnetic fields (EMFs) are generated by 60 HZ electrical currents flowing through appliance power cords during device operation, then EMF shielding measures or techniques known in the EMF shielding art can be practiced to reduce or eliminate the electromagnetic field strength outside the device during operation. Such EMF shielding measures might include applying metallic foil to the interior surfaces of the housing components, as well as other suitable measures known in the art.

Also, in general, the housing and other components of the portable electrical power supplying system of the present invention can be manufactured using injection molded plastics and/or other materials having suitable characteristics and properties which will be known to those skilled in the art.

While several modifications to the illustrative embodiments have been described above, it is understood that various other modifications to the illustrative embodiment of the present invention will readily occur to persons with ordinary skill in the art. All such modifications and variations are deemed to be within the scope and spirit of the present invention as defined by the appended Claims.

What is claimed is:

1. A multi-function electrical power supplying system having a portable module manually dockable within a module docking receptable during an emergency lighting mode of operation, and being supportable within the hand of a user during a portable lighting mode of operation and during a consumer device battery recharging mode of operation, said multi-function electrical power supplying system comprising:

a docking station supportable on a desktop, or a floor surface during an emergency lighting mode of operation, and having a module docking receptacle, within which a first module dock interface is mounted;

said docking station including (i) an electrical power cord with a power plug for receiving an AC line voltage supplied from a standard AC power receptacle, (ii) an AC electrical power conditioning circuit for conditioning the AC line voltage to produce AC electrical power for use in said multi-function electrical power supplying system, (iii) a voltage level sensing circuit for automatically detecting changes in the AC line voltage supplied from the standard AC power receptacle, and also (iv) an AC/DC power conversion circuit for converting said AC electrical power to DC electrical power for supplying said DC electrical power within said docking station;

said docking station supporting (i) a plurality of AC power receptacles for supplying said AC electrical power to AC electrical power consuming devices using AC electrical power cords, and (ii) one or more USB-type DC power receptacles for supplying said DC electrical power to DC electrical power consuming devices using DC electrical power cords;

wherein said docketing station comprises a first housing portion and a second housing portion, with said second housing portion being operably connected to said first housing portion, for supporting one or more external power cord storage compartments, permitting excess power cord to be (i) wound up about an internal power cord storage spool contained within each said external power cord storage compartment, and (ii) substantially concealed behind a pair of resilient power cord retention and concealment disc structures, while allowing any remaining power cord to exit through a perimeter access opening at any point about said second housing portion and be routed to said electrical power consuming devices; and a portable module provided with a subsystem controller, and adapted for docking within said module docking receptable, and supporting (ii) an emergency-light illumination mode of operation when said portable module is docked within said module docking receptacle, (ii) a portable lighting mode of operation when said portable module is manually removed from and located outside of said module docking receptacle, and (iii) a consumer device battery recharging mode of operation for recharging a battery in an external DC electrical power consuming device;

wherein during said emergency-light illumination mode of operation, said voltage level sensing circuit detects changes in the AC line voltage from the standard AC power receptacle, and in response to detected changes in the AC line voltage, said subsystem controller automatically controls the supply of DC electrical power from said battery power storage subsystem to said solid-state light emitting assembly so that said solid-state light emitting assembly produces visible illumination for emergency lighting in said ambient environment;

wherein during said portable lighting mode of operation, when said portable module is manually removed from said module docking receptacle and activated while in the hand of the user, said subsystem controller controls the supply of DC electrical power from said battery power storage subsystem to said solid-state light emitting assembly so that said solid-state light emitting assembly produces and projects visible illumination for portable lighting in said ambient environment; and wherein during said consumer device battery recharging mode of operation, said subsystem controller is configured to control the supply of DC electrical power from said rechargeable battery in said battery power storage subsystem to said external DC electrical power consuming device for recharging the battery in said external DC electrical power consuming device.

2. The multi-function electrical power supplying system of claim 1, wherein said portable module further includes
(i) a battery power storage subsystem, including a rechargeable battery, for storing said DC electrical power supplied by said AC/DC power conversion circuit in said docking station,
(ii) a solid-state light emitting assembly energizable by said DC electrical power supplied by said battery power storage subsystem,
(iii) a lens structure for shaping and projecting the light beam emitting from said solid-state light emitting assembly, and
(iv) a second module dock interface for interfacing with said first module dock interface when said portable module is docked within said module docking receptacle so that said first and second module dock interfaces interconnect, and DC electrical power is supplied from said AC/DC power conversion circuit in said docking station to said battery power storage subsystem in said portable module, as needed to recharge said rechargeable battery in said battery power storage subsystem.

3. The multi-function electrical power supplying system of claim 1, wherein said portable module is manually removed from said module docking receptacle by manually lifting up said portable module with one's fingers, and disengaging the physical connection between said first and second module dock interfaces.

4. The multi-function electrical power supplying system of claim 2, wherein said rechargeable battery comprises one or more solid-state batteries.

5. The multi-function electrical power supplying system of claim 2, wherein said first and second module dock interfaces comprises a pair of mated, male and female, USB-type connectors.

6. The multi-function electrical power supplying system of claim 2, wherein said lens structure employs refractive, diffractive and/or reflective principles, for shaping and projecting the light beam emitted from said solid-state light emitting assembly.

7. The multi-function electrical power supplying system of claim 1, wherein each said external power cord storage compartment supports a number of turns of excess power cord wrapped about said internal power cord storage spool, while said resilient power cord retention and concealment disc structures retain the wound power cord in place about said internal power cord storage spool and prevent the excess power cord from unwinding and spilling out through said perimeter access opening and unwinding off said internal power cord storage spool; and wherein, when wound-up excess power cord concealed behind said resilient power cord retention and concealment disc structures is pulled out from said perimeter access opening with sufficient force, said resilient power cord retention and concealment disc structures elastically deform and allow the pulled excess power cord to be removed from said external power cord storage compartment and used in supplying electrical power to said electrical appliance or electronic device at some preselected distance located from said multi-function electrical power supplying system.

8. The multi-function electrical power supplying system of claim 1, wherein said resilient power cord retention and concealment disc structures are configured to press against and exert forces against each said resilient power cord retention and concealment disc structure so as to substantially close off said perimeter access opening and substantially conceal excess power cord wound about said internal power cord storage spool.

9. The multi-function electrical power supplying system of claim 1, wherein said resilient power cord retention and concealment disc structures are configured to not press against and exert forces against each said resilient power cord retention and concealment disc structure, but otherwise substantially close off said perimeter access opening and substantially conceal excess power cord wound about said internal power cord storage spool.

10. A multi-function electrical power supplying system having a portable module manually dockable within a module docking receptacle during an emergency lighting mode of operation, and being supportable within the hand of a user during a portable lighting mode of operation and during a consumer device battery recharging mode of operation, said multi-function electrical power supplying system comprising:

a docking station supportable on a desktop, or a floor surface during an emergency lighting mode of operation, and having a module docking receptacle, within which a first module dock interface is mounted;

said docking station including (i) an electrical power cord with a power plug for receiving an AC line voltage supplied from a standard AC power receptacle, (ii) a sensing circuit for automatically detecting changes in the AC line voltage supplied from the standard AC power receptacle, and also (iii) a power conversion circuit for converting said AC electrical power to DC electrical power for supplying said DC electrical power within said docking station;

said docking station supporting (i) a plurality of AC power receptacles for supplying said AC electrical power to AC electrical power consuming devices using AC electrical power cords, and (ii) one or more USB-type DC power receptacles for supplying said DC electrical power to DC electrical power consuming devices using DC electrical power cords;

wherein said docketing station comprises a first housing portion and a second housing portion, with said second housing portion being operably connected to said first housing portion; and a portable module provided with a subsystem controller, and adapted for docking within said module docking receptable, and supporting (ii) an emergency-light illumination mode of operation when said portable module is docked within said module docking receptacle, (ii) a portable lighting mode of operation when said portable module is manually removed from and located outside of said module docking receptacle, and (iii) a consumer device battery recharging mode of operation for recharging a battery in an external DC electrical power consuming device;

wherein during said emergency-light illumination mode of operation, said sensing circuit detects changes in the AC line voltage from the standard AC power receptacle, and in response to detected changes in the AC line voltage, said subsystem controller automatically controls the supply of DC electrical power from said battery power storage subsystem to said solid-state light emitting assembly so that said solid-state light emitting assembly produces visible illumination for emergency lighting in said ambient environment;

wherein during said portable lighting mode of operation, when said portable module is manually removed from said module docking receptacle and activated while in the hand of the user, said subsystem controller controls the supply of DC electrical power from said battery power storage subsystem to said solid-state light emitting assembly so that said solid-state light emitting assembly produces and projects visible illumination for portable lighting in said ambient environment; and wherein during said consumer device battery recharging mode of operation, said subsystem controller is configured to control the supply of DC electrical power from said rechargeable battery in said battery power storage subsystem to said external DC electrical power consuming device for recharging the battery in said external DC electrical power consuming device.

11. The multi-function electrical power supplying system of claim 10, wherein said portable module further includes
  (i) a battery power storage subsystem, including a rechargeable battery, for storing said DC electrical power supplied by said power conversion circuit in said docking station,
  (ii) a solid-state light emitting assembly energizable by said DC electrical power supplied by said battery power storage subsystem,
  (iii) a lens structure for shaping and projecting the light beam emitting from said solid-state light emitting assembly, and
  (iv) a second module dock interface for interfacing with said first module dock interface when said portable module is docked within said module docking receptacle so that said first and second module dock interfaces interconnect, and DC electrical power is supplied from said power conversion circuit in said docking station to said battery power storage subsystem in said portable module, as needed to recharge said rechargeable battery in said battery power storage subsystem.

12. The multi-function electrical power supplying system of claim 10, wherein said portable module is manually removed from said module docking receptacle by manually lifting up said portable module with one's fingers, and disengaging the physical connection between said first and second module dock interfaces.

13. The multi-function electrical power supplying system of claim 11, wherein said rechargeable battery comprises one or more solid-state batteries.

14. The multi-function electrical power supplying system of claim 11, wherein said first and second module dock interfaces comprises a pair of mated, male and female, USB-type connectors.

15. The multi-function electrical power supplying system of claim 11, wherein said lens structure employs refractive, diffractive and/or reflective principles, for shaping and projecting the light beam emitted from said solid-state light emitting assembly.

* * * * *